United States Patent
Iwane et al.

(10) Patent No.: US 12,019,225 B2
(45) Date of Patent: Jun. 25, 2024

(54) OPTICAL SYSTEM, OPTICAL APPARATUS, IMAGING APPARATUS, AND METHOD FOR MANUFACTURING OPTICAL SYSTEM AND IMAGING APPARATUS

(71) Applicant: Nikon Corporation, Tokyo (JP)

(72) Inventors: Toru Iwane, Yokohama (JP); Kyoya Tokunaga, Yokohama (JP); Tomoki Ito, Kawasaki (JP); Kyoichi Suwa, Yokohama (JP)

(73) Assignee: Nikon Corporation, Tokyo (JP)

( * ) Notice: Subject to any disclaimer, the term of this patent is extended or adjusted under 35 U.S.C. 154(b) by 304 days.

(21) Appl. No.: 17/424,469

(22) PCT Filed: Jan. 21, 2020

(86) PCT No.: PCT/JP2020/001950
§ 371 (c)(1),
(2) Date: Jul. 20, 2021

(87) PCT Pub. No.: WO2020/153355
PCT Pub. Date: Jul. 30, 2020

(65) Prior Publication Data
US 2022/0099949 A1    Mar. 31, 2022

(30) Foreign Application Priority Data

Jan. 23, 2019  (JP) .................. 2019-009674
Jan. 23, 2019  (JP) .................. 2019-009675
Jan. 23, 2019  (JP) .................. 2019-009678

(51) Int. Cl.
*H04N 23/45*  (2023.01)
*G02B 13/18*  (2006.01)
(Continued)

(52) U.S. Cl.
CPC ........... *G02B 13/18* (2013.01); *G02B 17/082* (2013.01); *H04N 23/45* (2023.01); *H04N 23/54* (2023.01); *H04N 23/55* (2023.01)

(58) Field of Classification Search
None
See application file for complete search history.

(56) References Cited

U.S. PATENT DOCUMENTS

| 2,378,301 A | 6/1945 | Kaprelian |
| 5,159,495 A | 10/1992 | Hamblen |

(Continued)

FOREIGN PATENT DOCUMENTS

| CN | 101688969 A | 3/2010 |
| CN | 108254859 A | 7/2018 |

(Continued)

OTHER PUBLICATIONS

Office Action issued Nov. 22, 2022, in Japanese Patent Application No. 2020-568158.

(Continued)

*Primary Examiner* — Cynthia Segura
(74) *Attorney, Agent, or Firm* — Potomac Law Group, PLLC

(57) ABSTRACT

There are provided an optical system having high resolution and high optical performance and reduced in size, an optical apparatus including the optical system, an imaging apparatus, and a method for manufacturing the optical system and imaging apparatus. An optical system UL of a camera module 10, which is incorporated in an optical apparatus, such as a camera 60, is an optical system that forms an image of an object, includes a correction member having a correction surface 11a, a first reflection surface 12a, which reflects light having passed through the correction surface 11a, and a second reflection surface 13a, which reflects the light (Continued)

reflected off the first reflection surface 12*a*, and satisfies predetermined conditions.

34 Claims, 35 Drawing Sheets

(51) Int. Cl.
 *G02B 17/08* (2006.01)
 *H04N 23/54* (2023.01)
 *H04N 23/55* (2023.01)

(56) References Cited

U.S. PATENT DOCUMENTS

| | | | | |
|---|---|---|---|---|
| 6,169,637 | B1 | 2/2001 | Tsunashima | |
| 7,486,438 | B2* | 2/2009 | Bergeron | G02B 26/0858 |
| | | | | 359/399 |
| 7,764,440 | B2* | 7/2010 | Border | G02B 17/0896 |
| | | | | 359/721 |
| 9,207,433 | B2* | 12/2015 | Blayvas | G02B 13/007 |
| 11,226,470 | B2* | 1/2022 | Ono | G02B 23/06 |
| 2008/0252964 | A1* | 10/2008 | Koenig | G02B 7/004 |
| | | | | 359/399 |
| 2009/0067830 | A1 | 3/2009 | Tamaki et al. | |
| 2010/0110565 | A1 | 5/2010 | Togino | |
| 2013/0010180 | A1* | 1/2013 | Hatakeyama | G02B 17/0856 |
| | | | | 348/360 |
| 2013/0321668 | A1* | 12/2013 | Kamath | H04N 23/50 |
| | | | | 348/E5.053 |
| 2015/0168699 | A1* | 6/2015 | Lee | G02B 17/0856 |
| | | | | 359/726 |
| 2015/0177496 | A1* | 6/2015 | Marks | G02B 17/0856 |
| | | | | 348/335 |
| 2016/0170185 | A1 | 6/2016 | Kim | |
| 2016/0191774 | A1* | 6/2016 | Zhou | G03B 41/00 |
| | | | | 348/262 |
| 2017/0082823 | A1* | 3/2017 | Hwang | H04N 23/75 |
| 2017/0104929 | A1* | 4/2017 | Ono | H04N 25/134 |
| 2018/0373039 | A1* | 12/2018 | Amitai | G02B 6/003 |
| 2019/0265449 | A1* | 8/2019 | Cho | G02B 27/0025 |
| 2020/0160012 | A1* | 5/2020 | Nunnink | G06K 7/10722 |
| 2021/0096337 | A1* | 4/2021 | Yang | G02B 13/0065 |
| 2022/0082745 | A1* | 3/2022 | Iwane | G02B 27/286 |
| 2022/0137276 | A1* | 5/2022 | Iwane | G02B 13/0055 |
| | | | | 359/485.01 |
| 2023/0087877 | A1* | 3/2023 | Zhao | G02B 17/086 |
| | | | | 359/717 |
| 2023/0251475 | A1* | 8/2023 | Kim | G02B 13/00 |
| | | | | 359/716 |

FOREIGN PATENT DOCUMENTS

| | | |
|---|---|---|
| JP | S49-066339 A | 6/1974 |
| JP | H05-502523 A | 4/1993 |
| JP | H11-316343 A | 11/1999 |
| JP | 2004-085725 A | 3/2004 |
| JP | 2004-212639 A | 7/2004 |
| JP | 2016-114939 A | 6/2016 |
| JP | 2018-109673 A | 7/2018 |
| WO | WO 2007/123064 A1 | 11/2007 |

OTHER PUBLICATIONS

Office Action dated May 18, 2022, in Japanese Patent Application No. 2020-568158.
Office Action issued Sep. 5, 2022, in Chinese Patent Application No. 202080009052.9.
Office Action issued Mar. 31. 2023, in Japanese Patent Application No. 2020-568158.
Decision of Rejection issued Jun. 11, 2023, in Chinese Patent Application No. 202080009052.9.
Office Action issued Jan. 18, 2023, in Chinese Patent Application No. 202080009052.9.
English translation of International Preliminary Report on Patentability from International Patent Application No. PCT/JP2020/001950, Jul. 27, 2021.
International Search Report from International Patent Application No. PCT/JP2020/001950, Apr. 21, 2020.
Office Action issued Jan. 12, 2024, in Chinese Patent Application No. 202080009052.9.

* cited by examiner

[Fig.1]
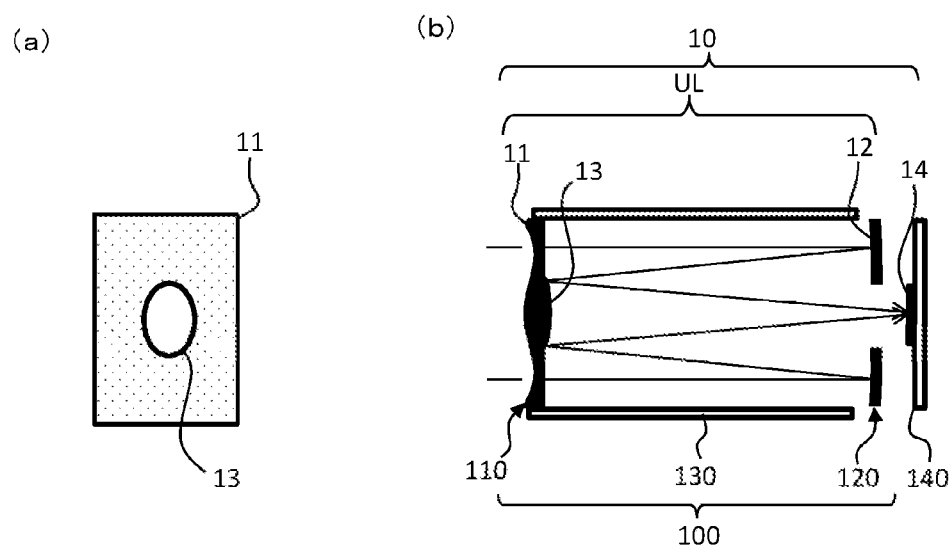

[Fig.2]
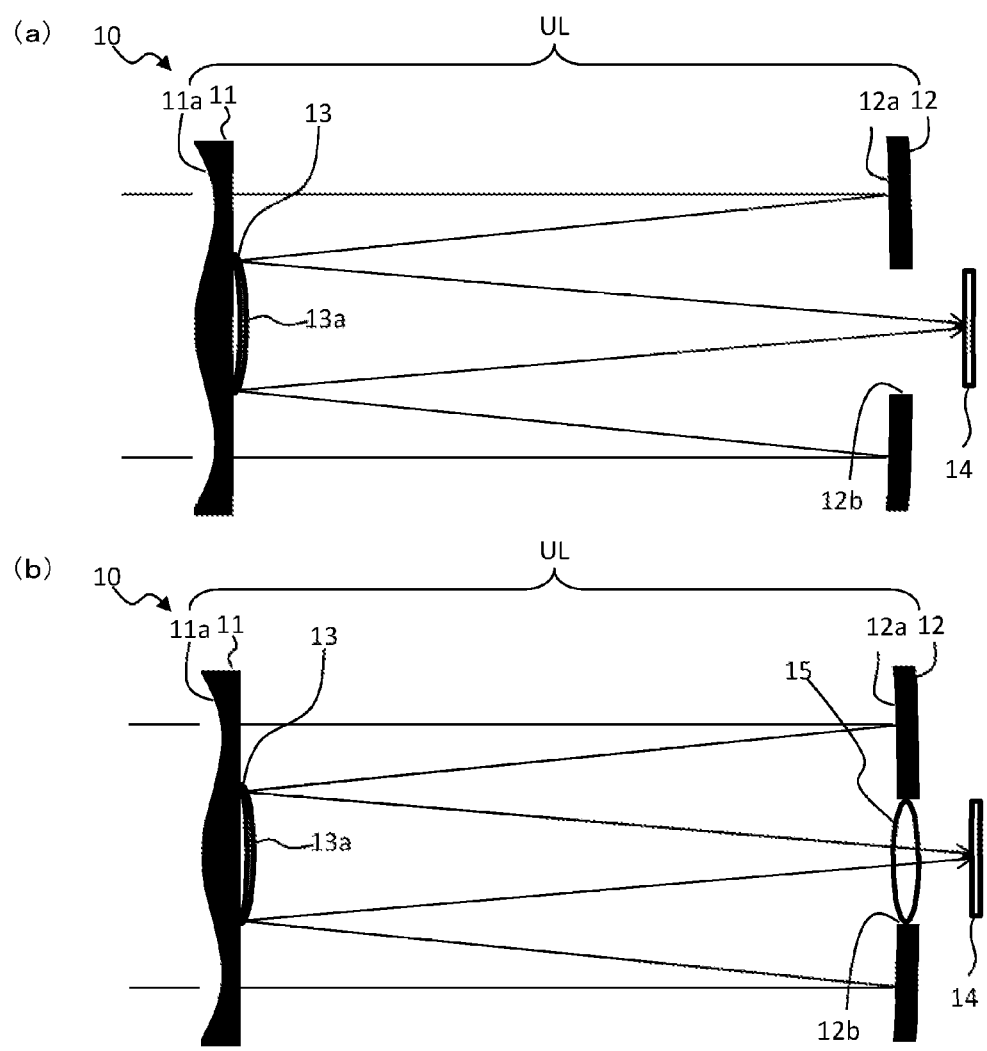

[Fig.3]
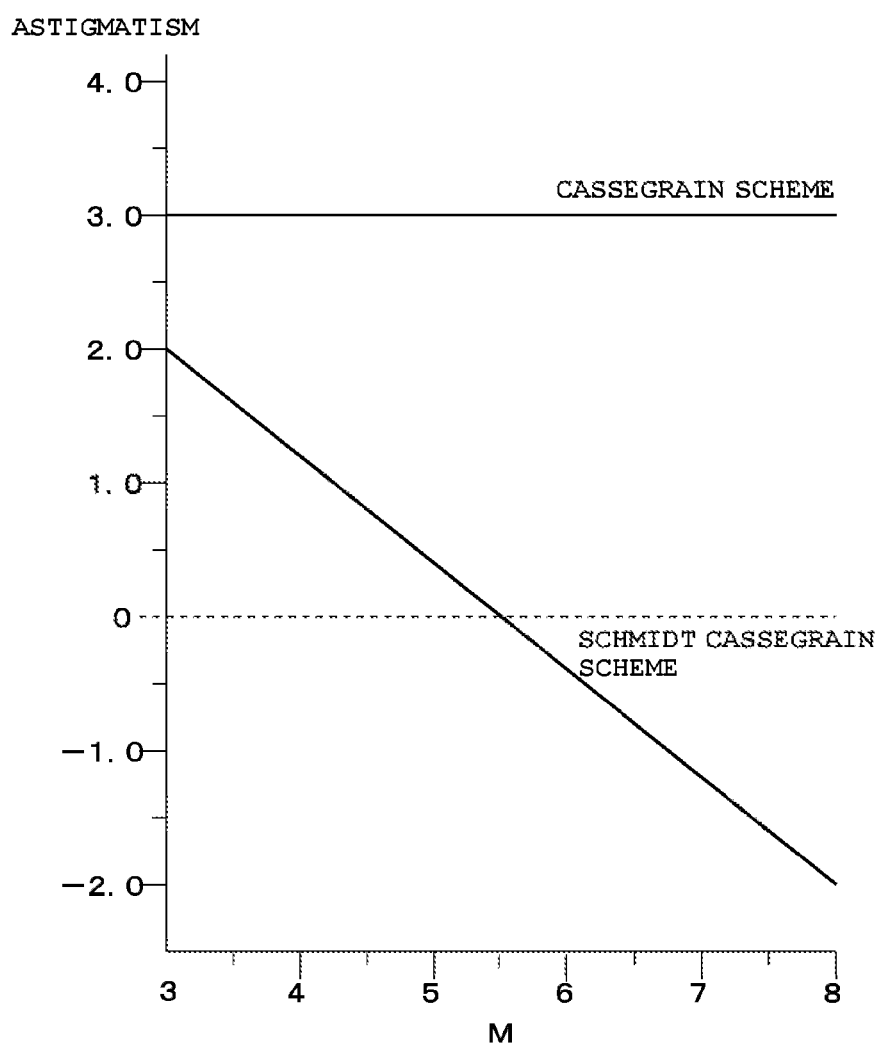

[Fig.4]
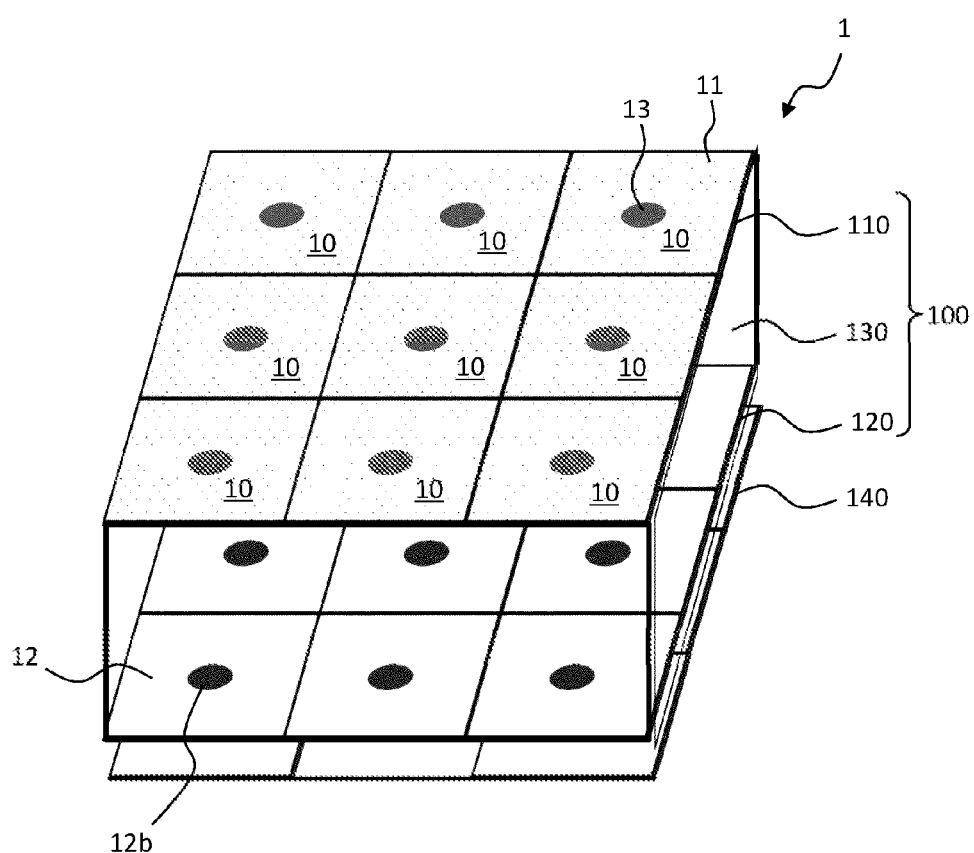

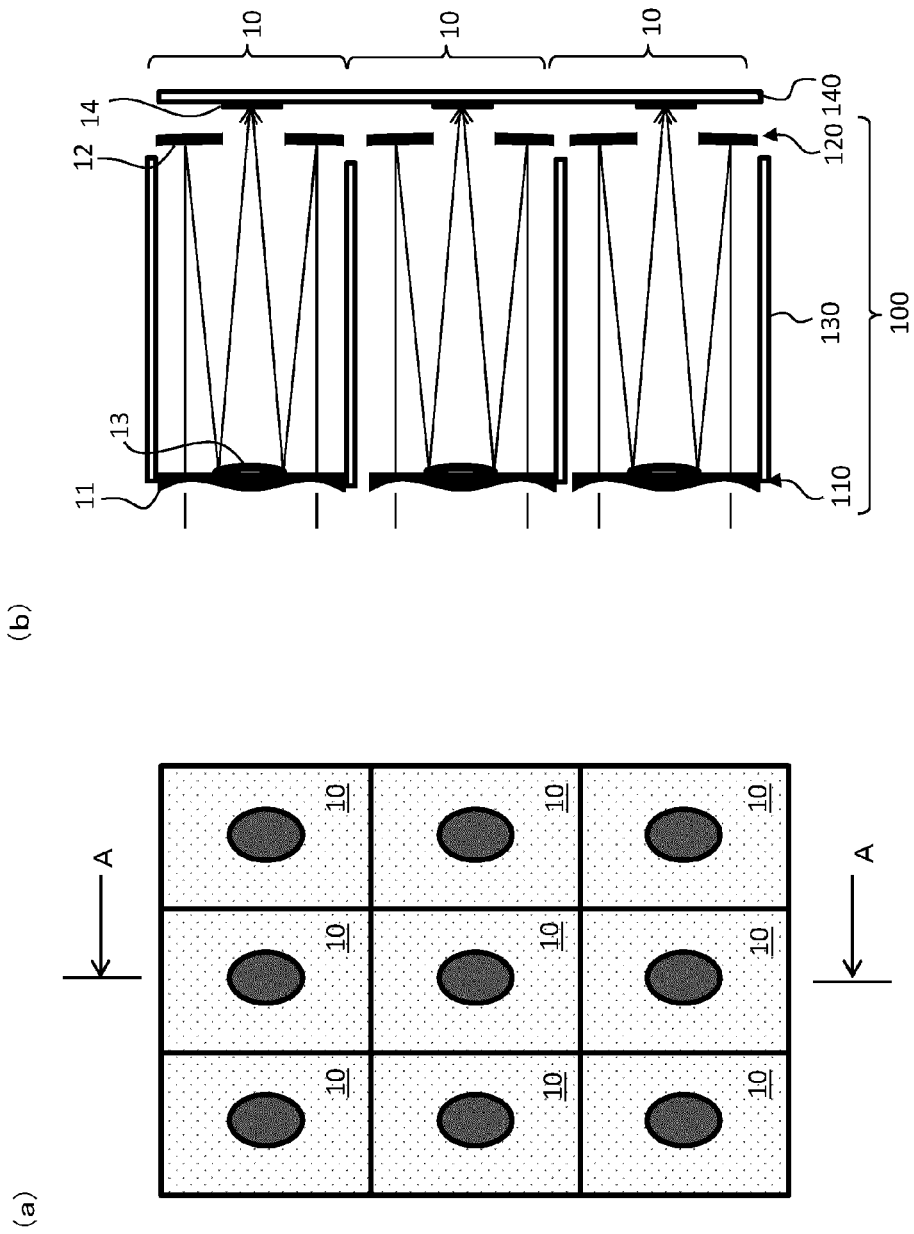
[Fig. 5]

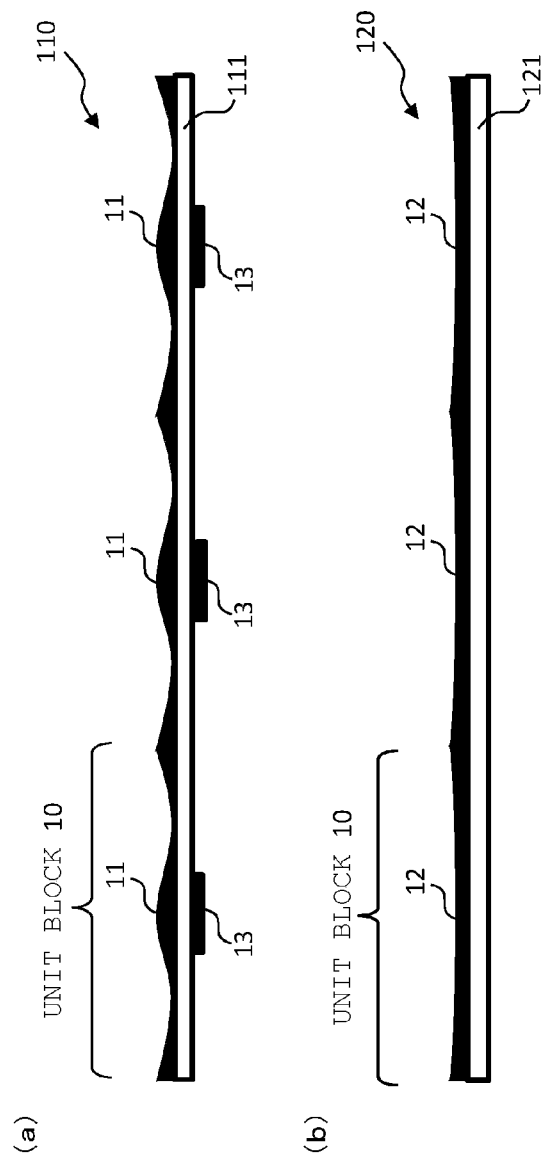
[Fig. 6]

[Fig.7]
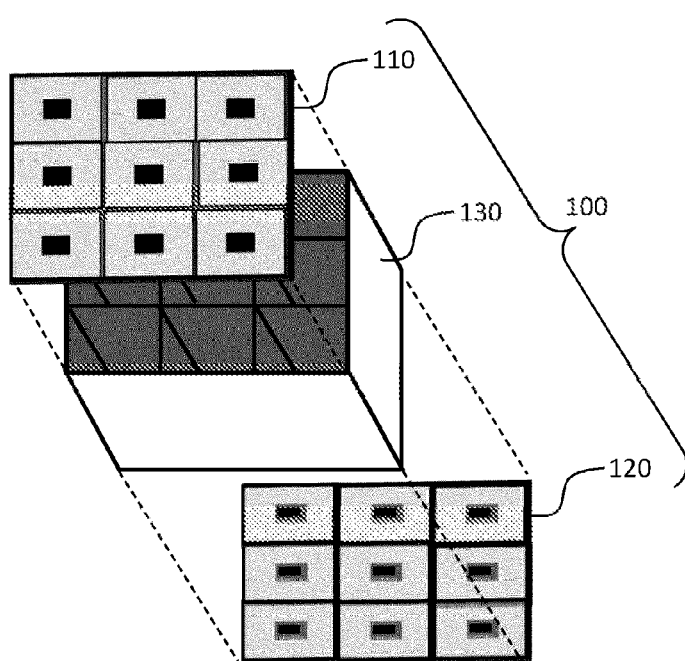

[Fig.8]
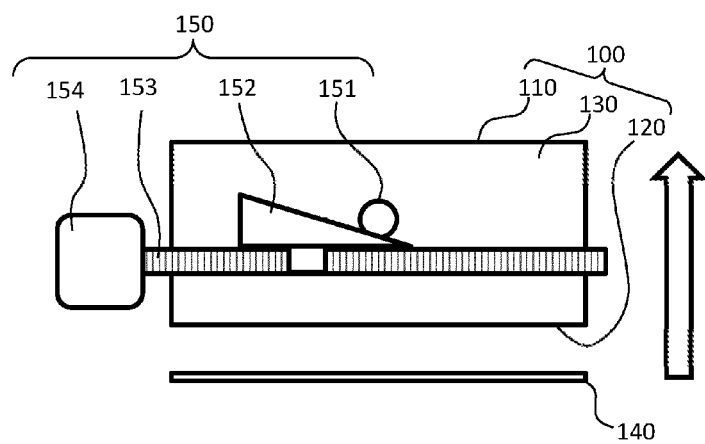

[Fig.9]
(a)
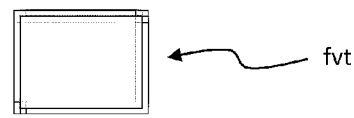
(b)
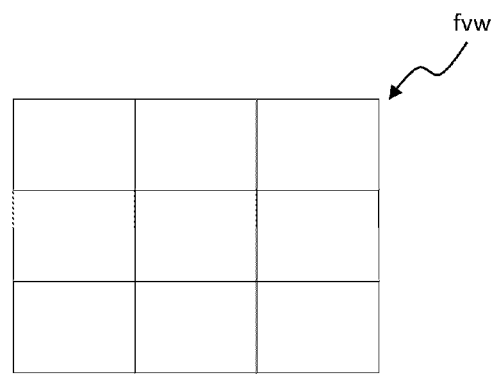

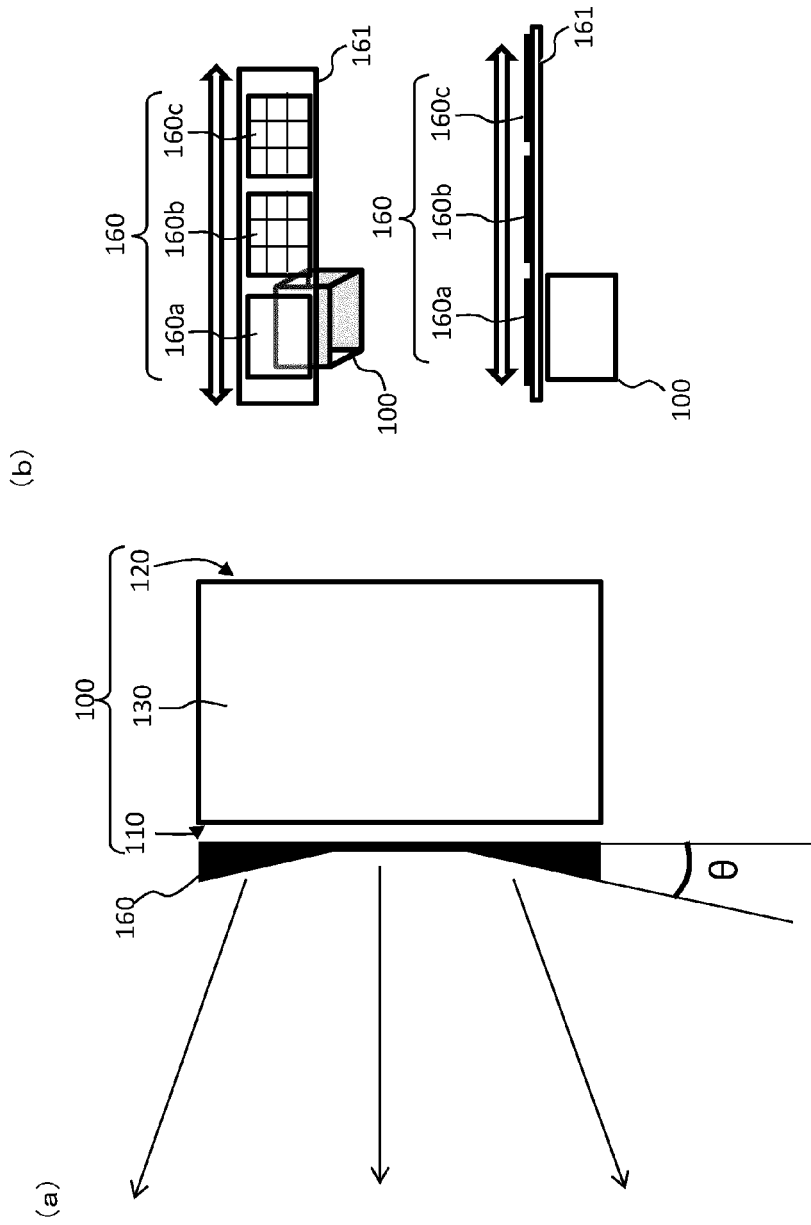
[Fig. 10]

[Fig.11]
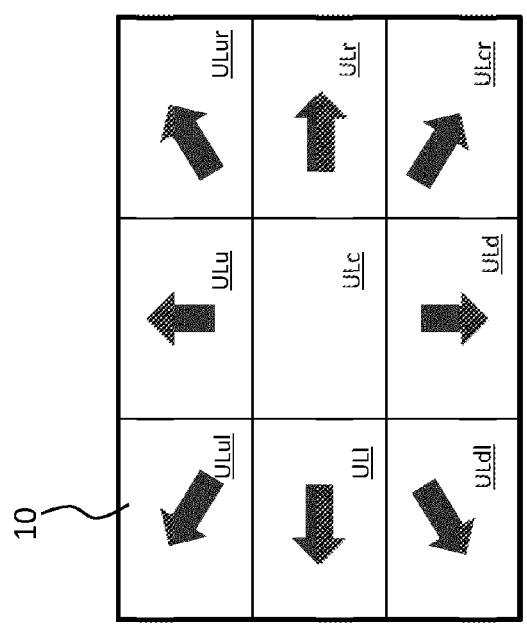

[Fig.12]
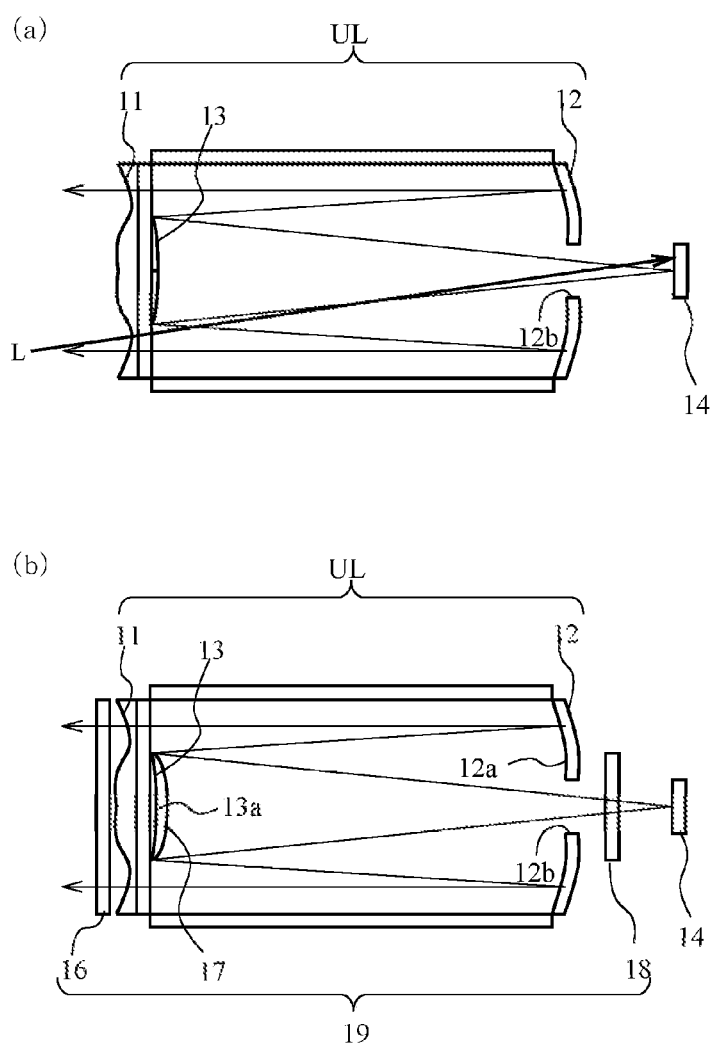

[Fig.13]
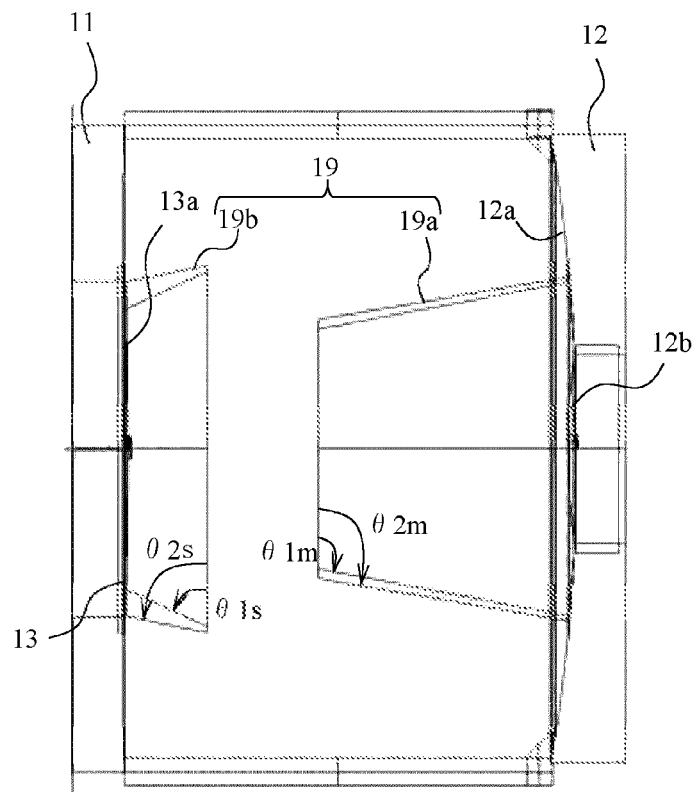

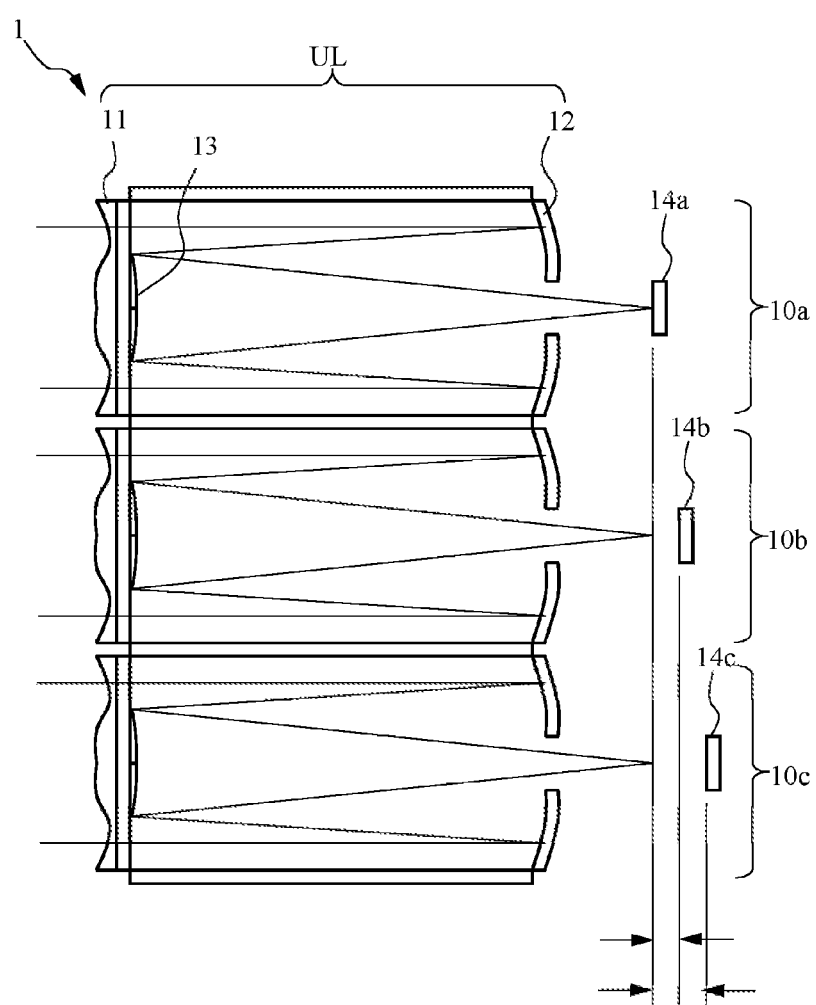
[Fig.14]

[Fig.15]
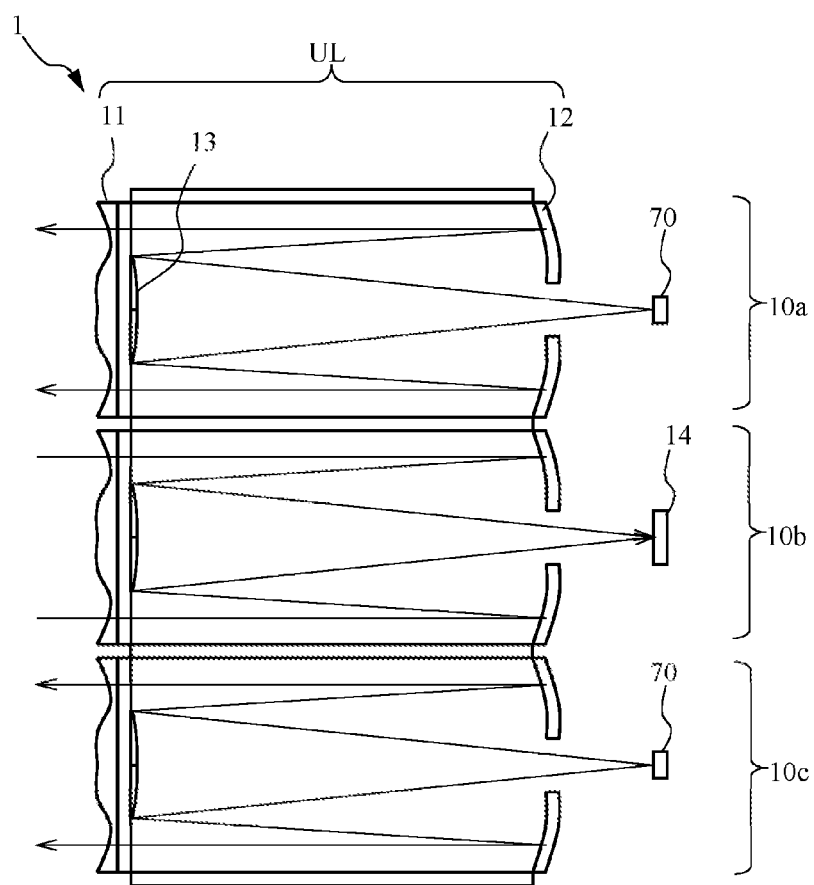

[Fig.16]
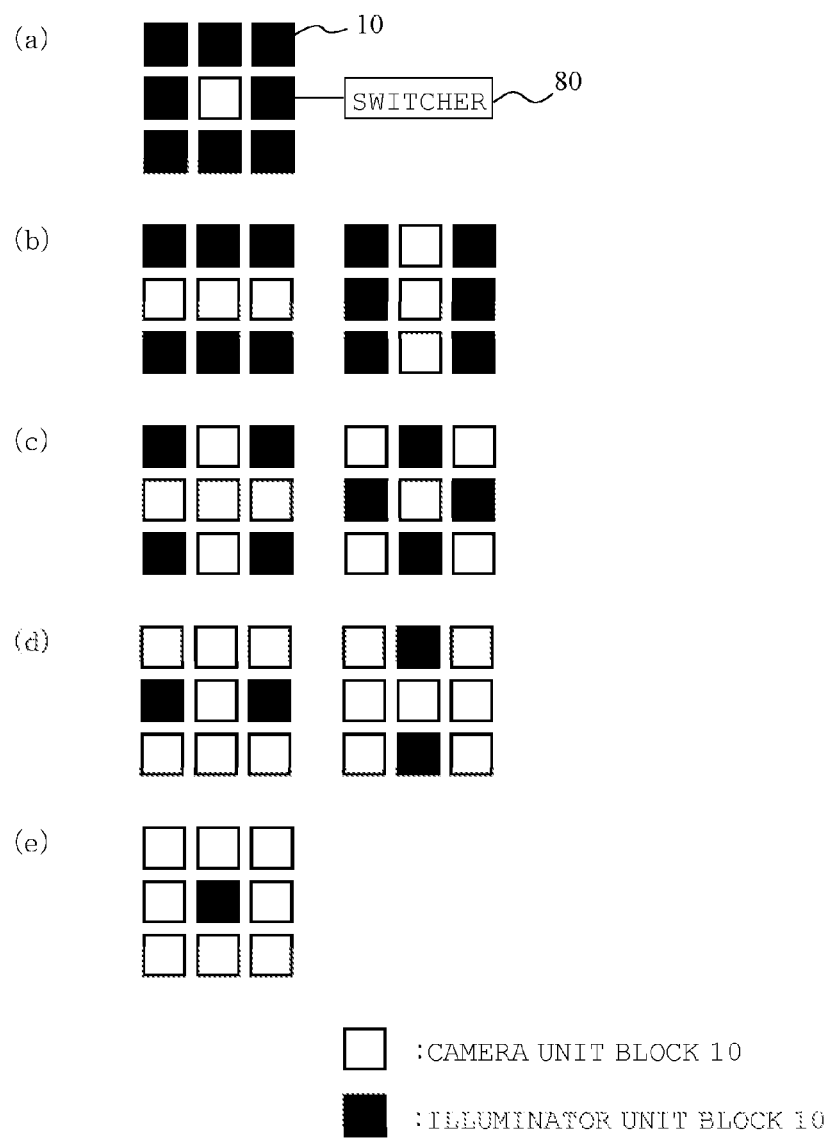

[Fig.17]
(a) 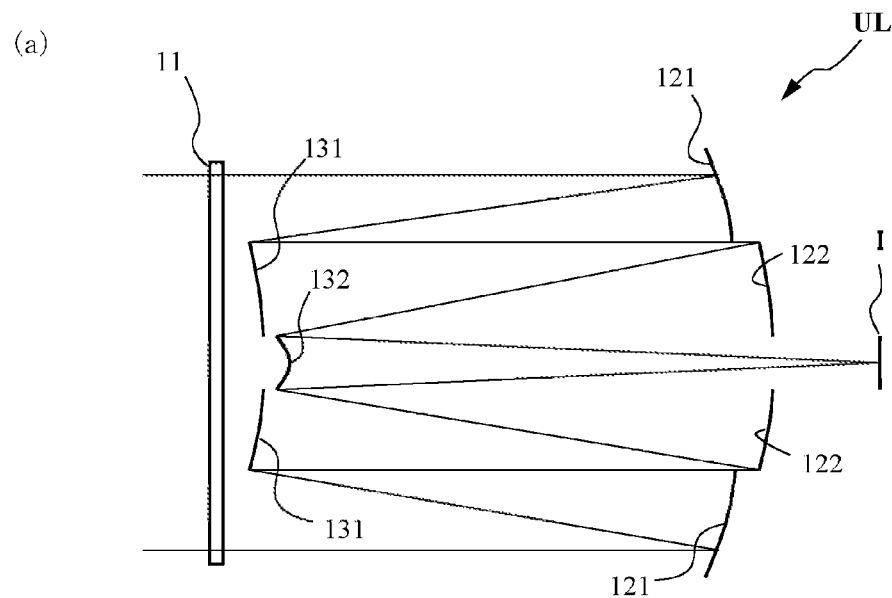
(b) 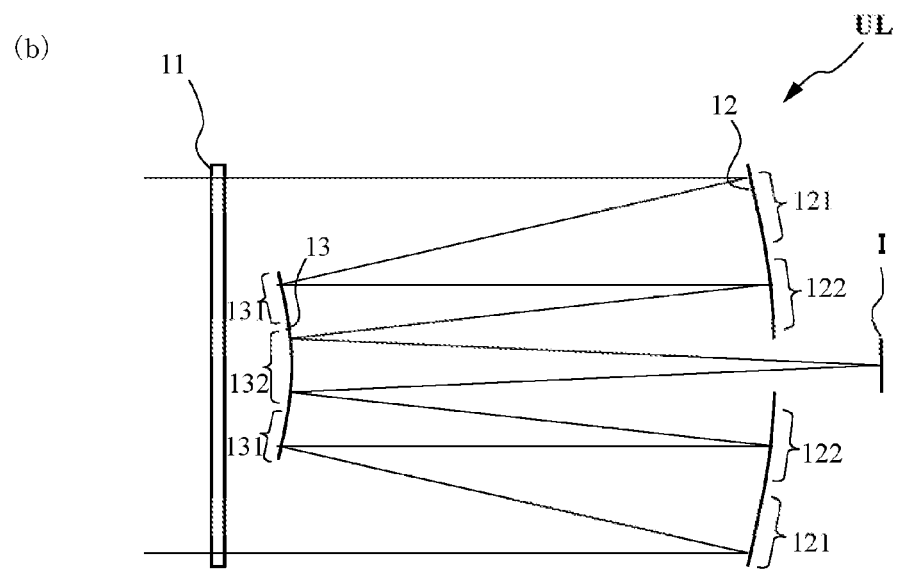

[Fig.18]
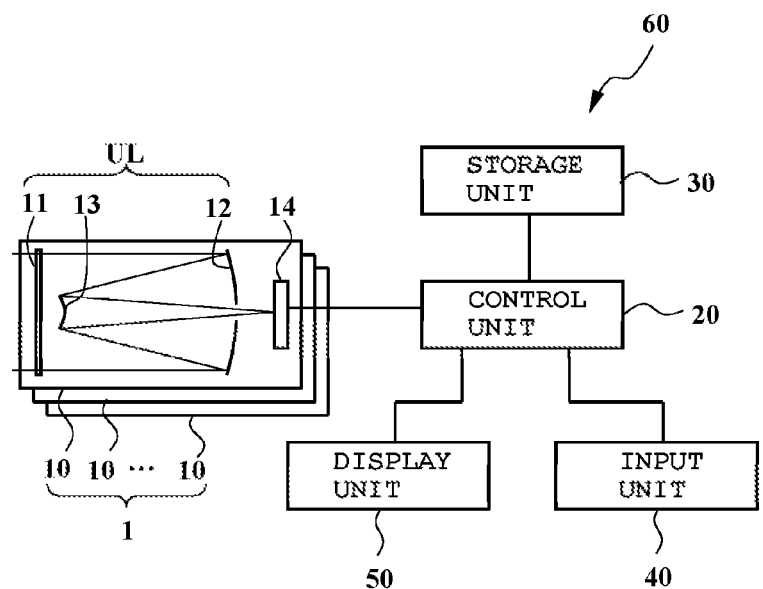

[Fig.19]
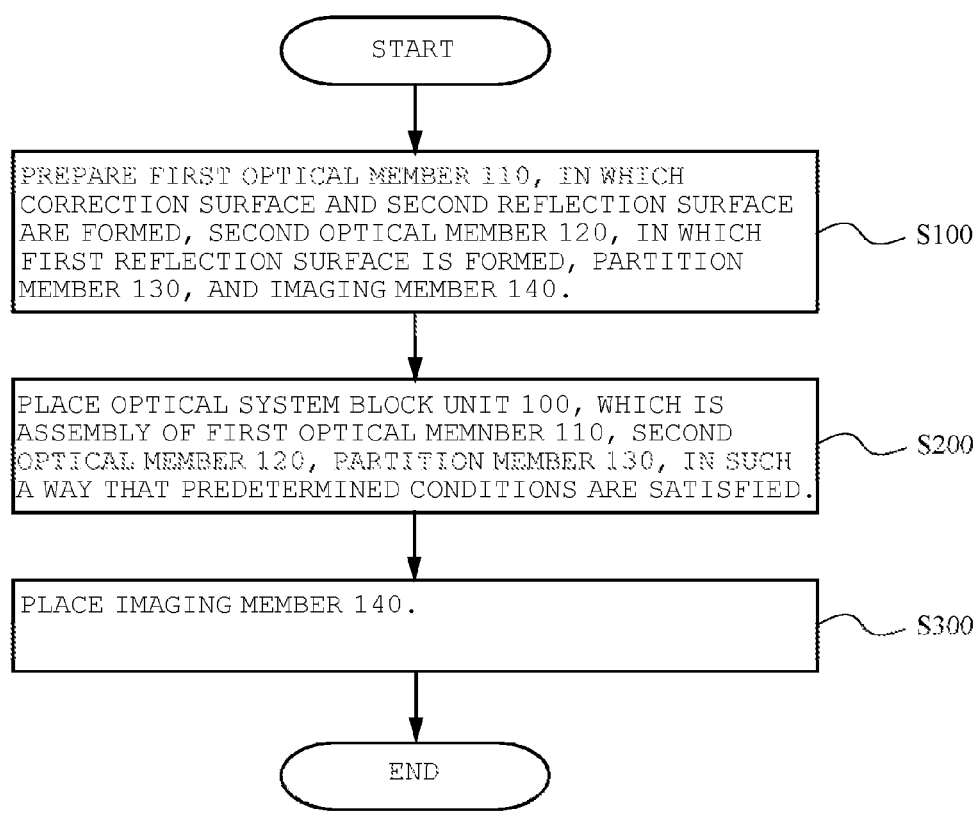

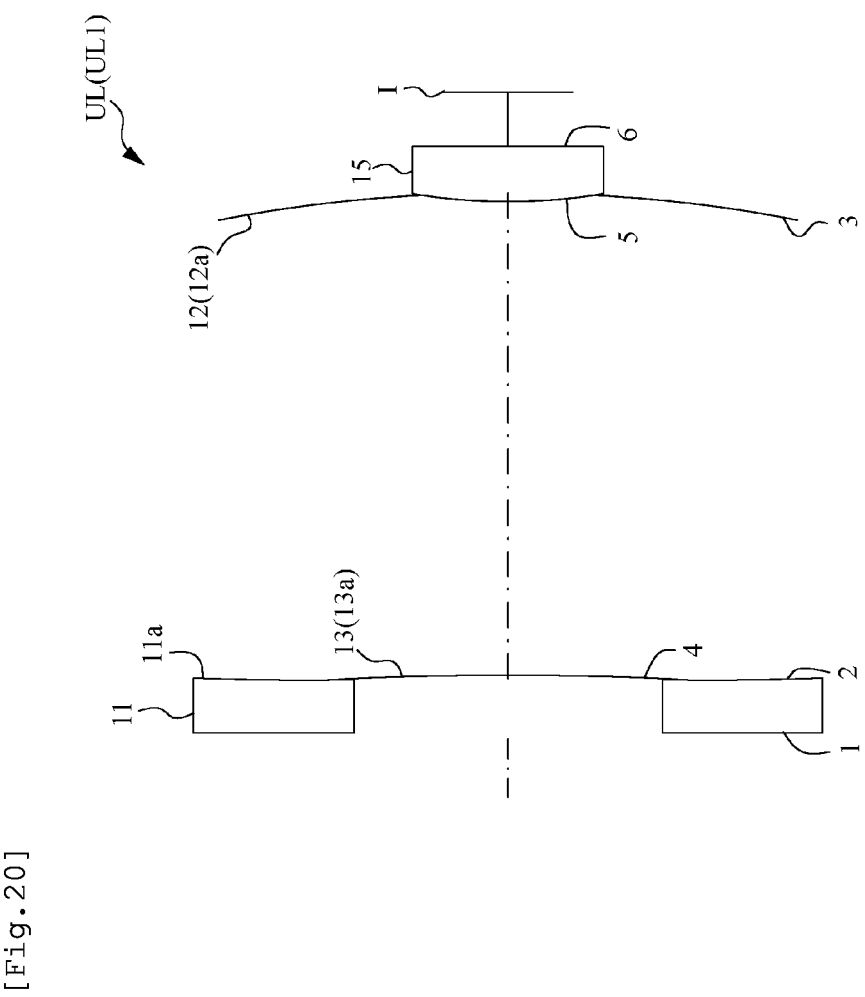
[Fig. 20]

[Fig.21]
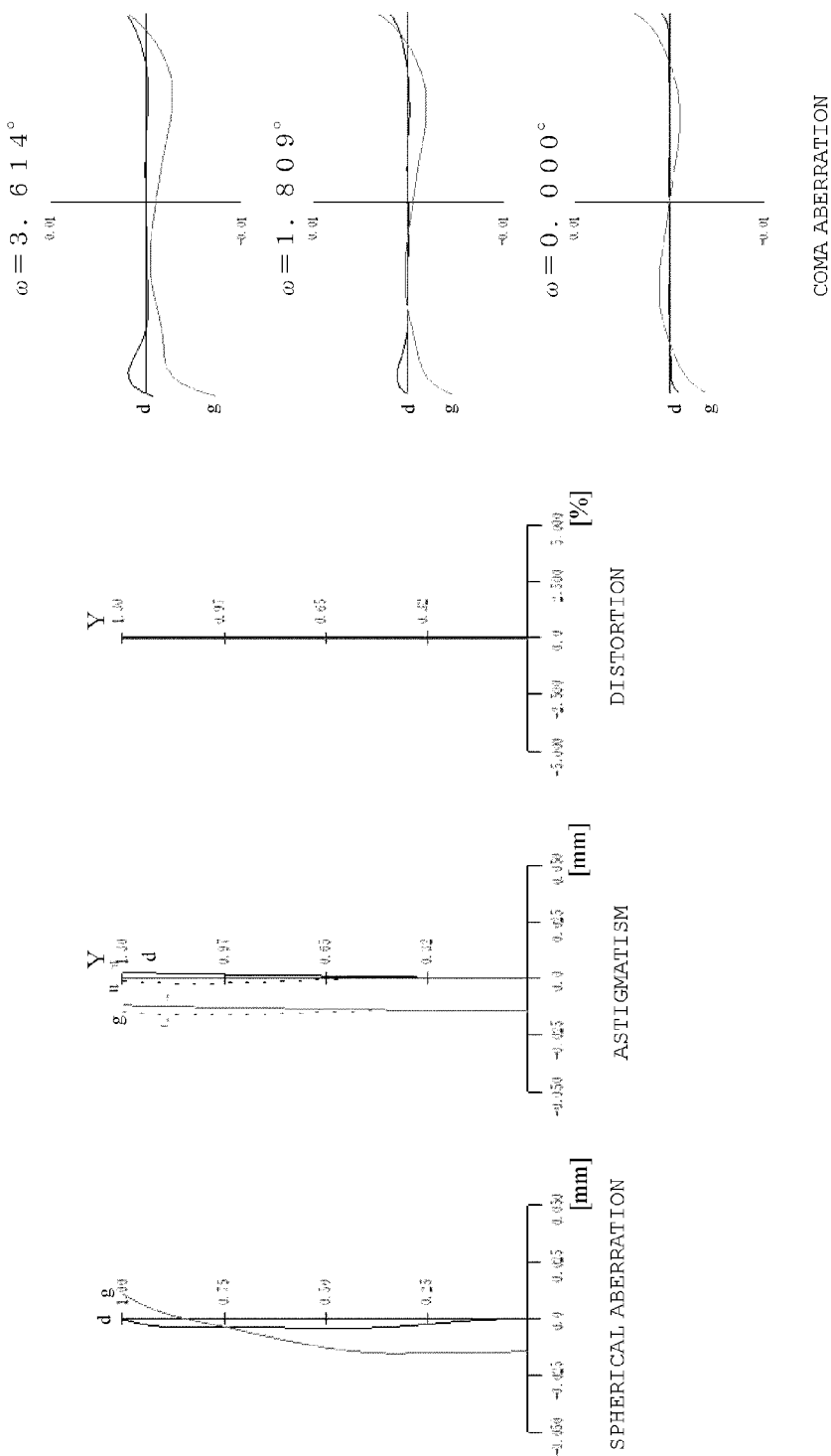

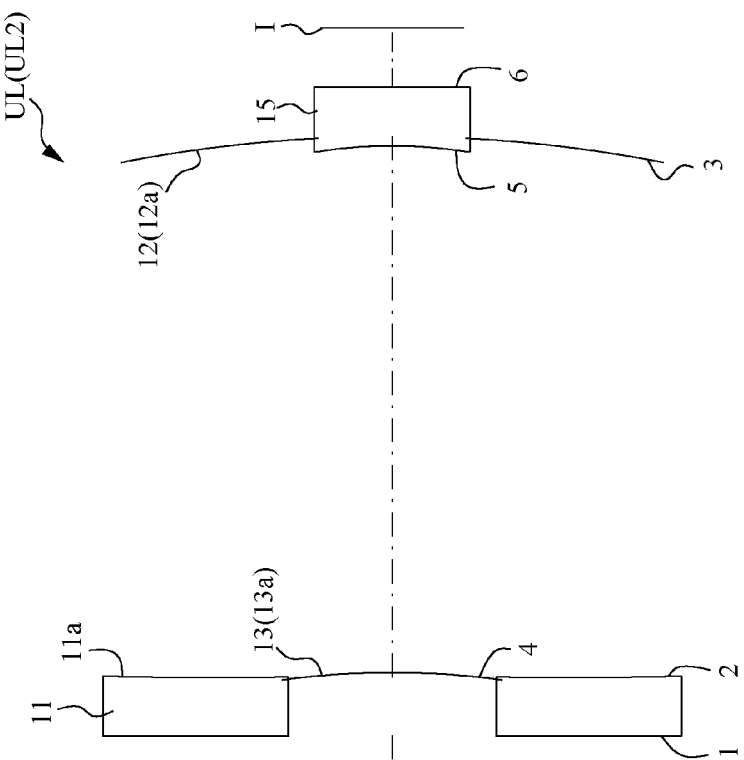
[Fig. 22]

[Fig.23]
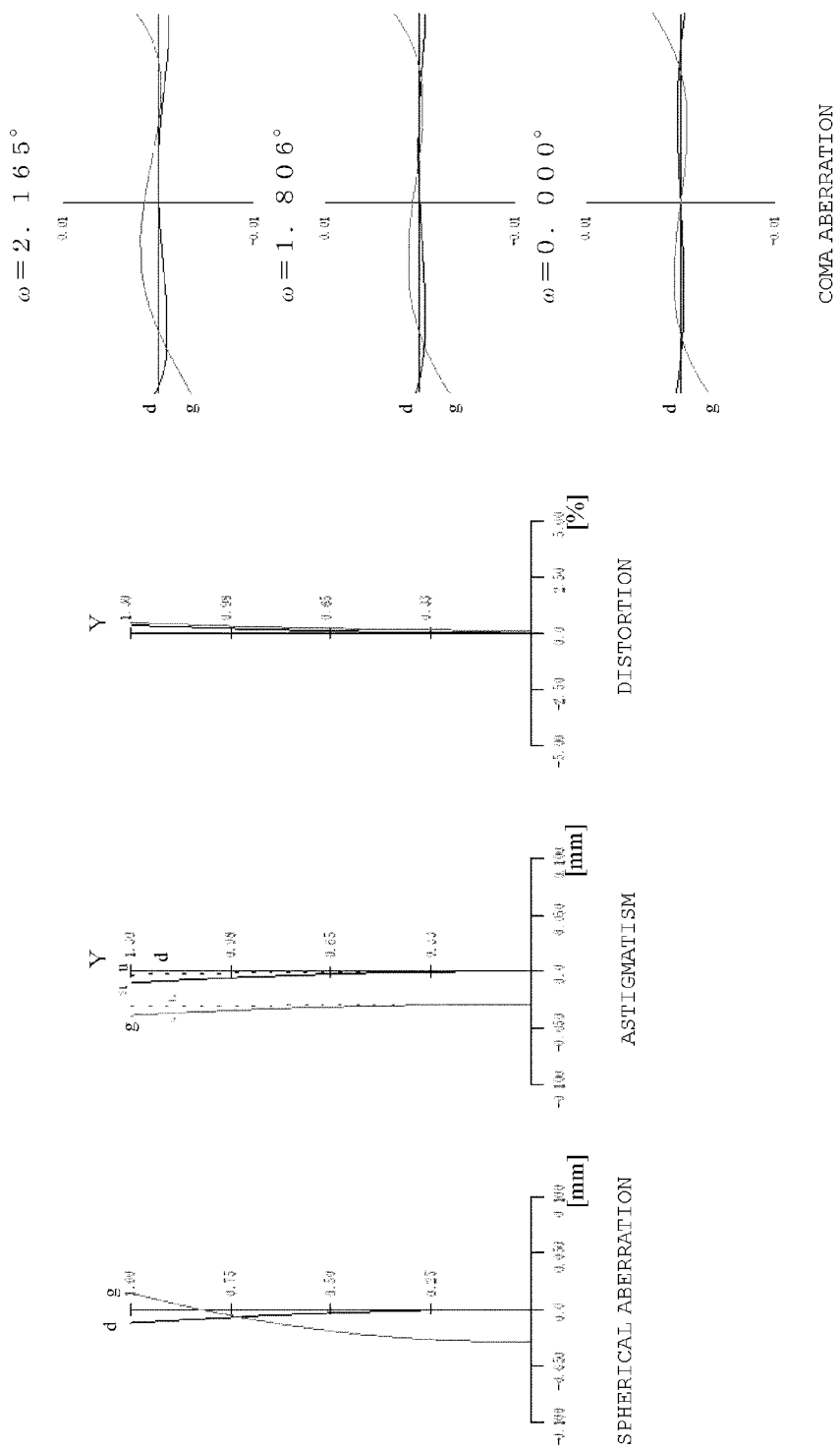

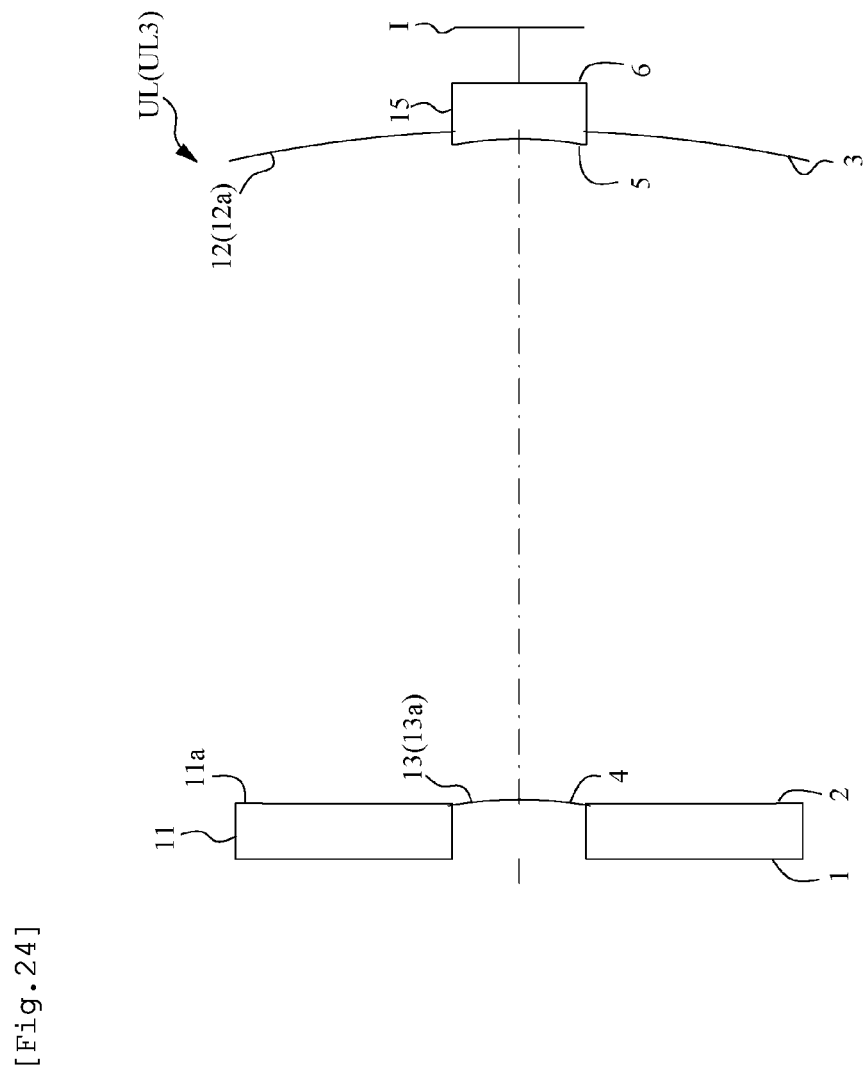
[Fig. 24]

[Fig.25]
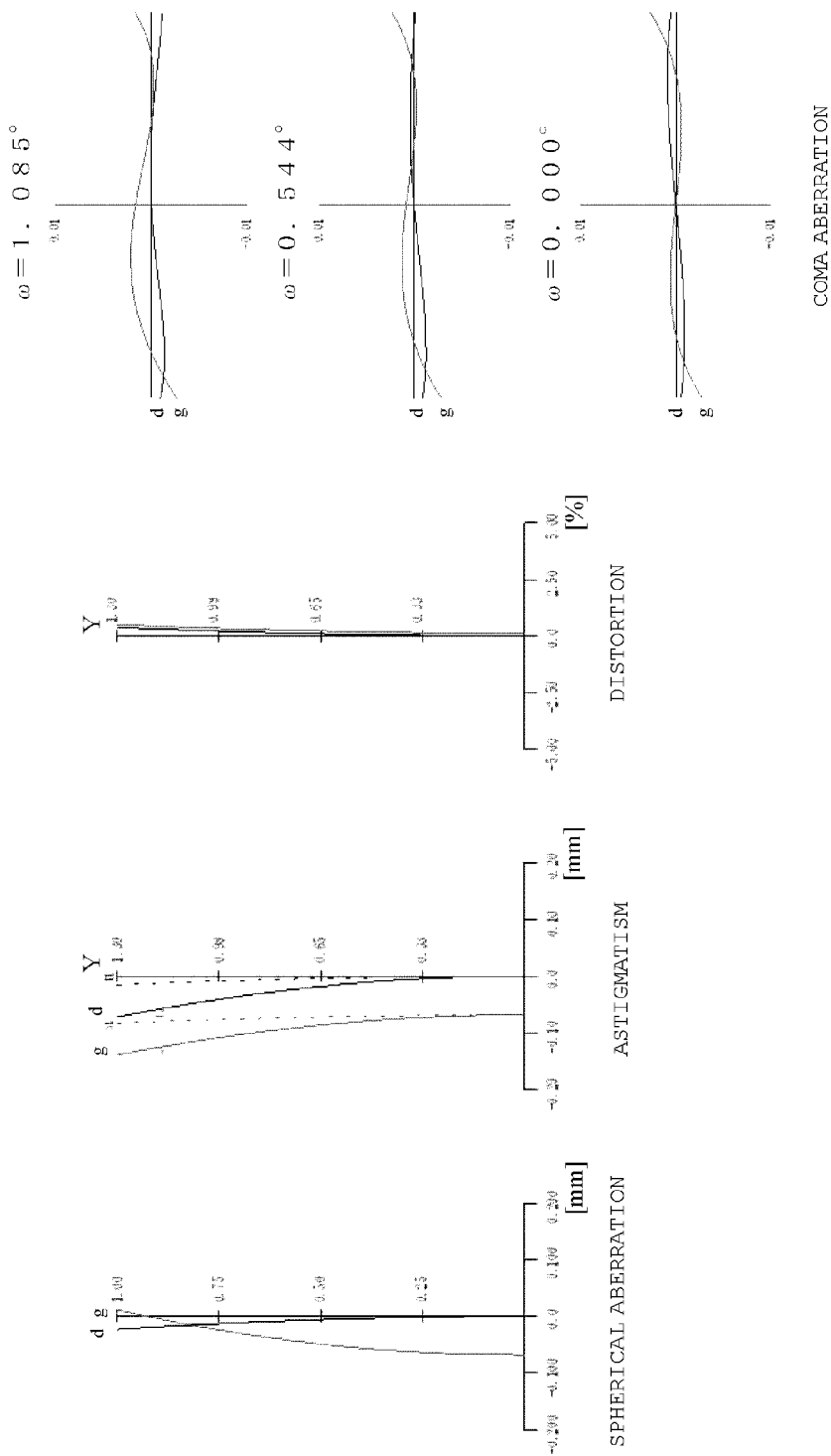

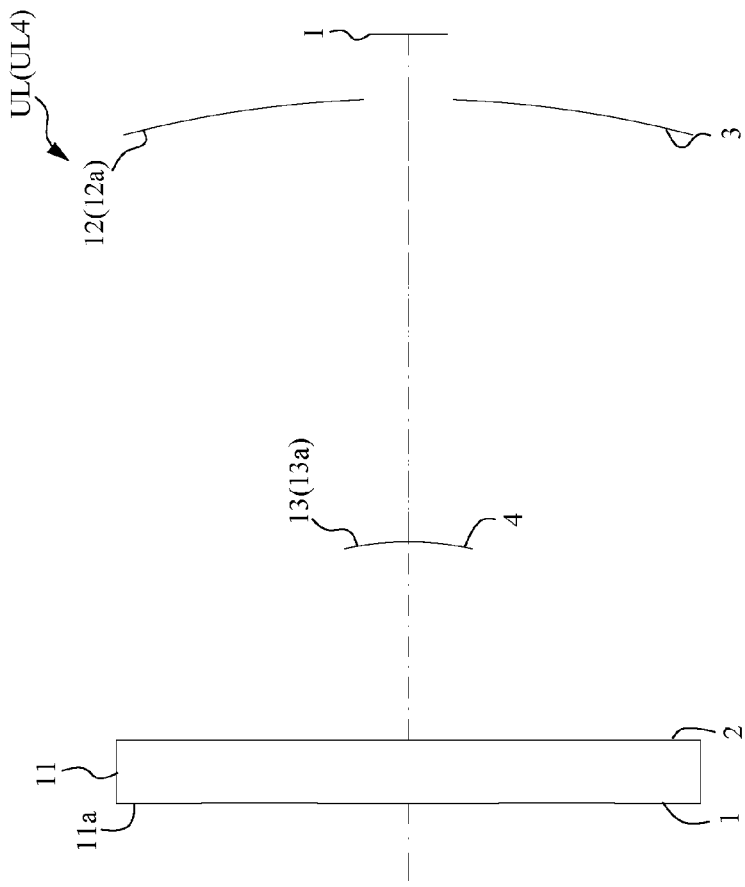

[Fig.27]
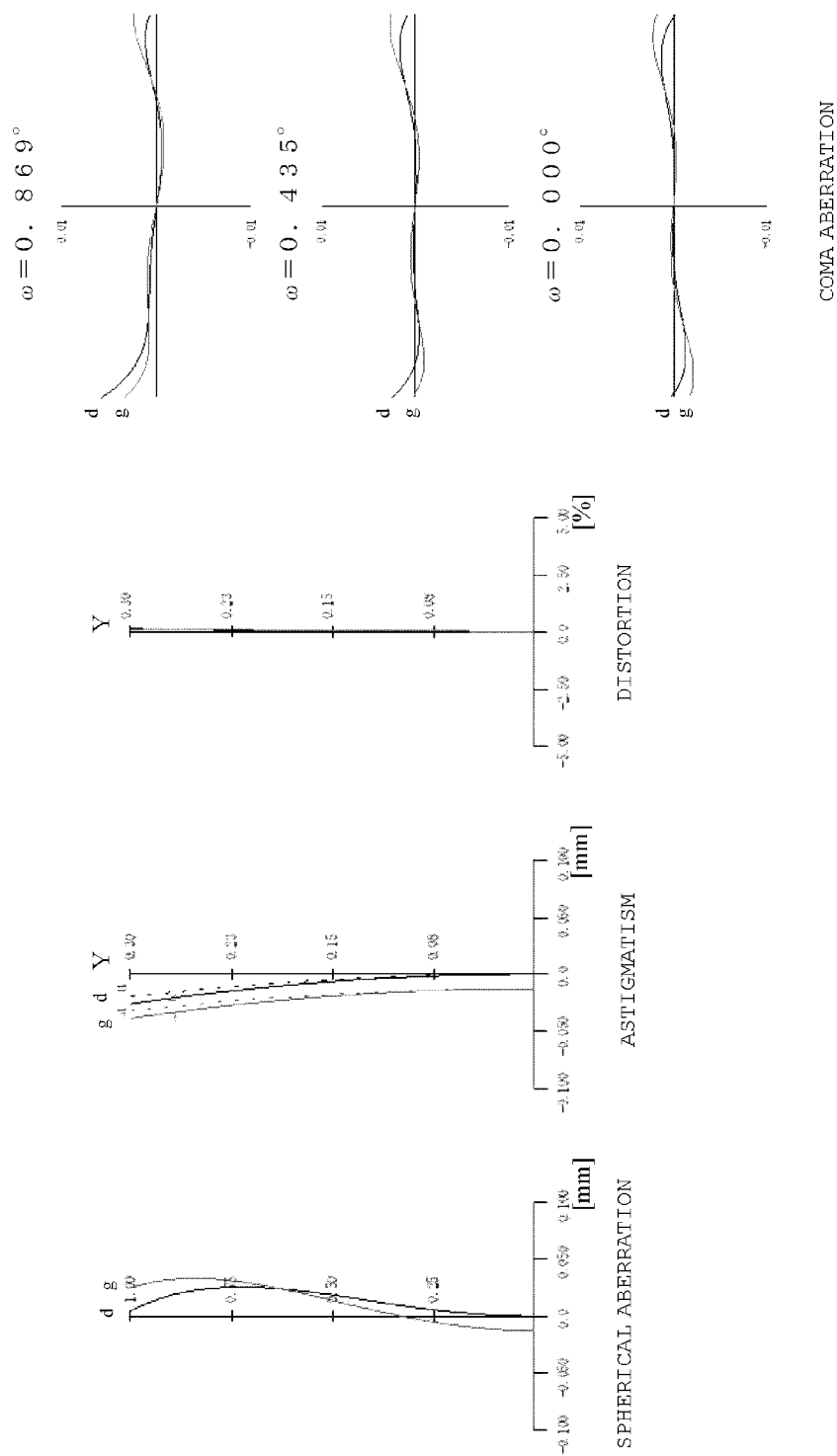

[Fig.28]
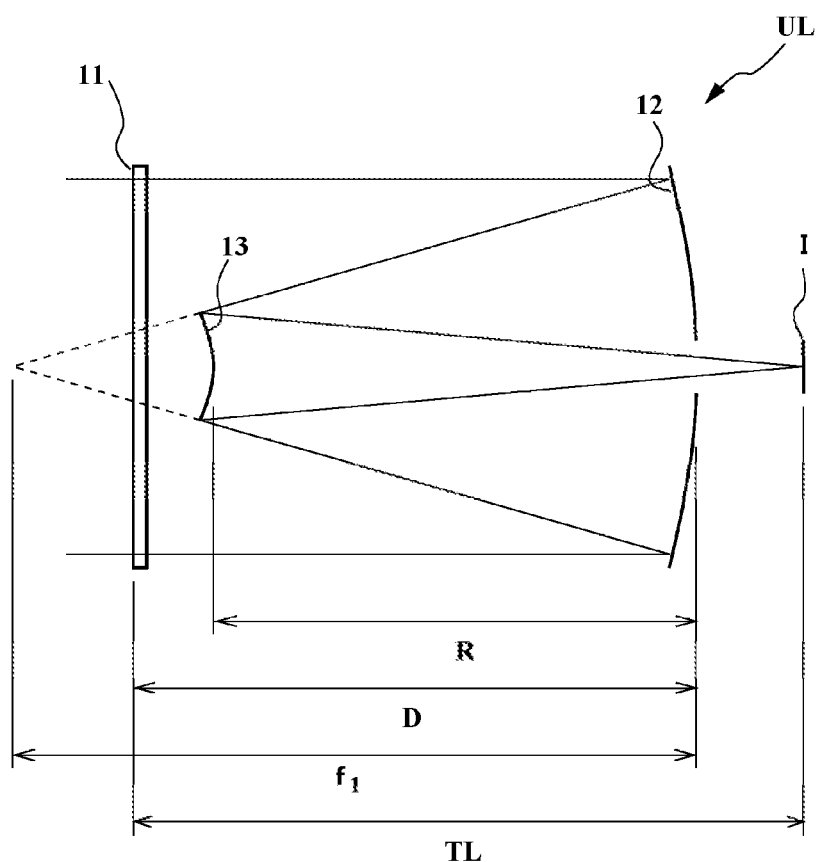

[Fig.29]
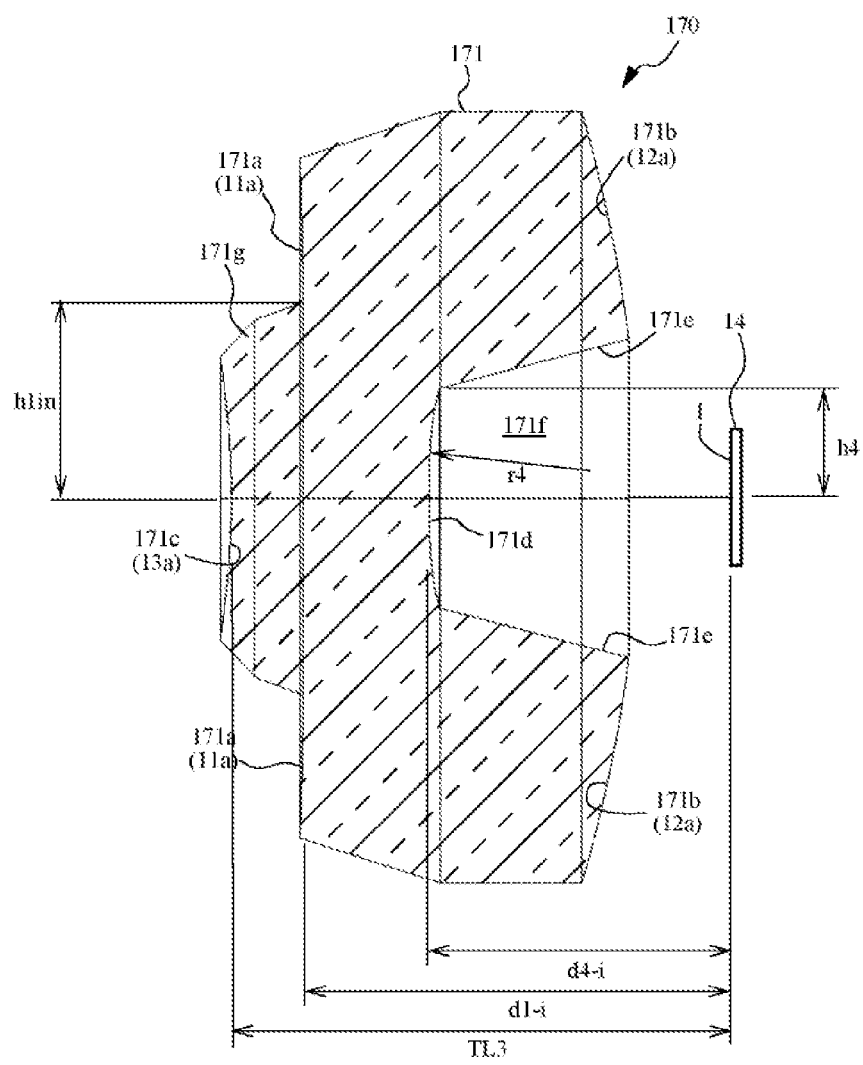

[Fig.30]
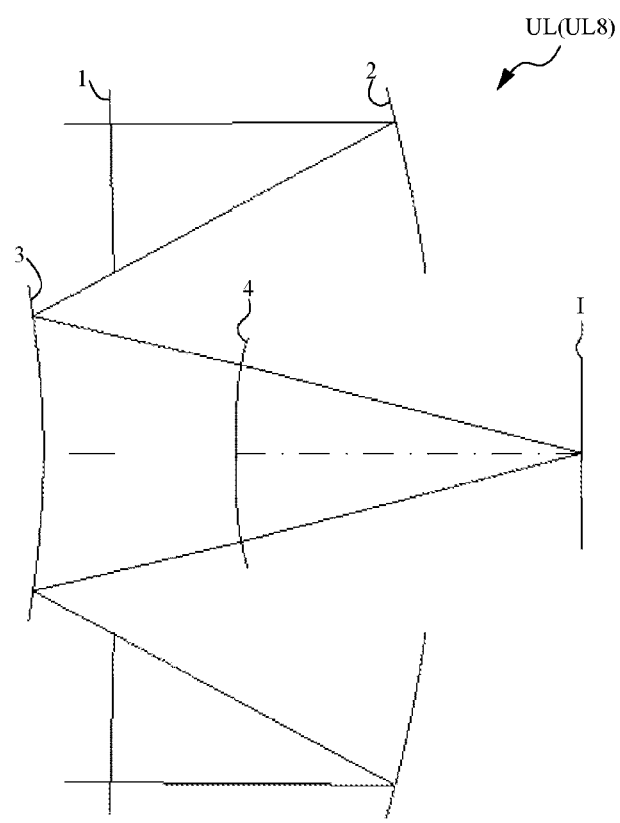

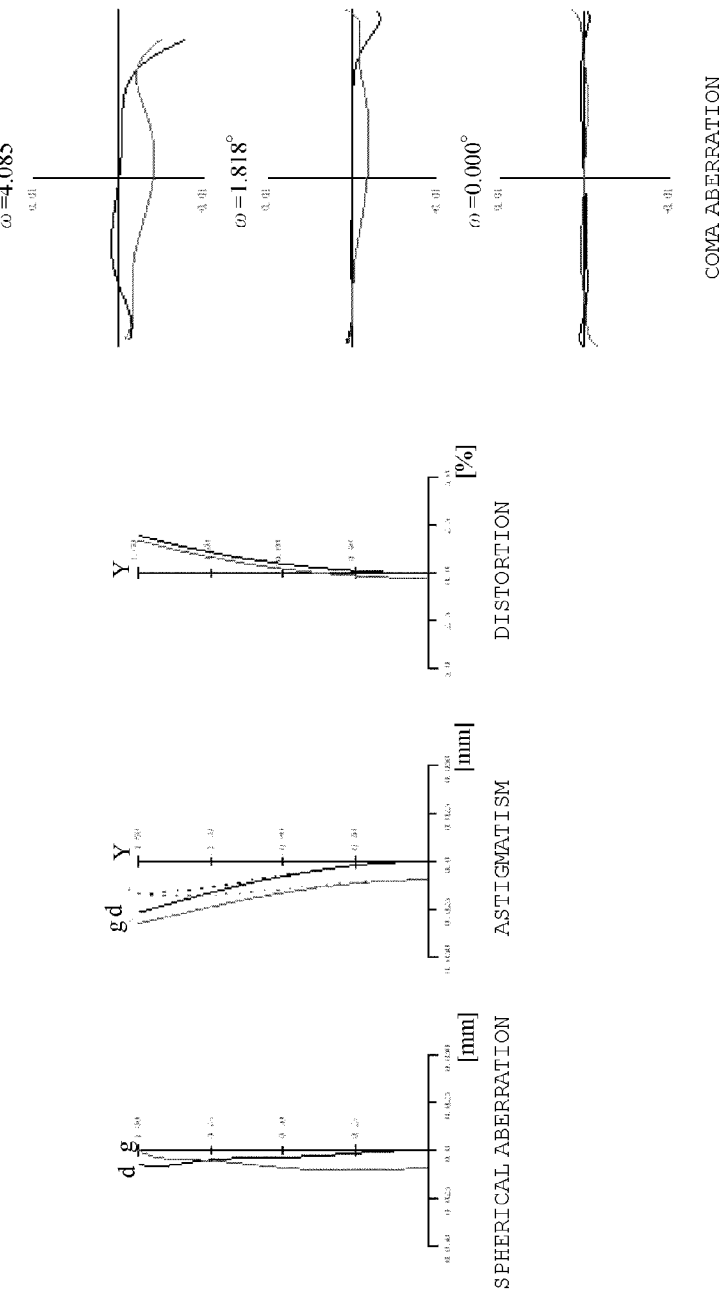
[Fig. 31]

[Fig.32]
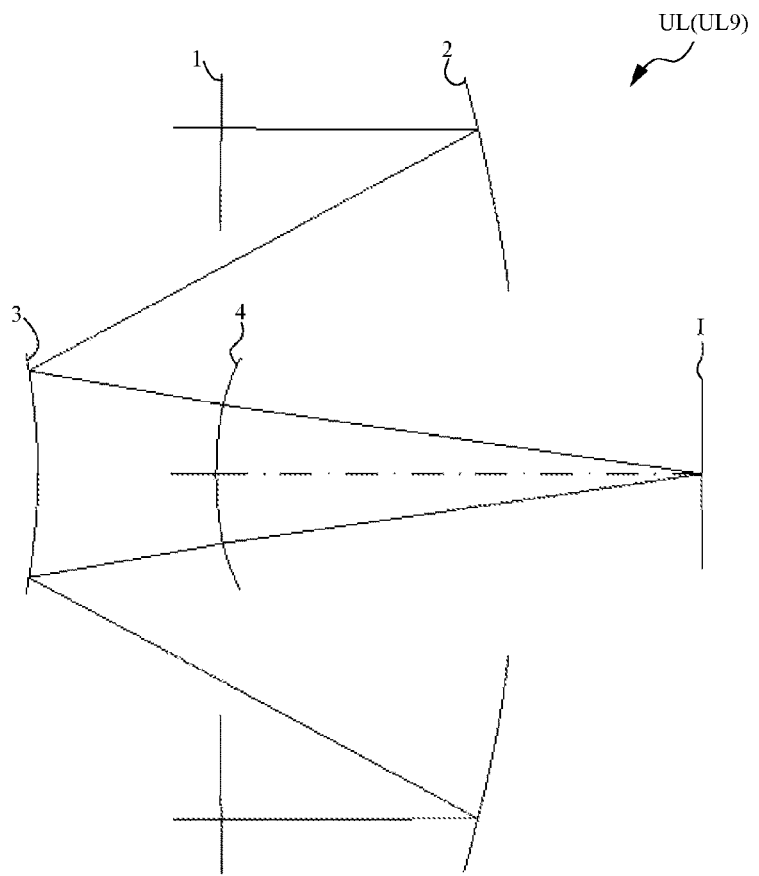

[Fig.33]
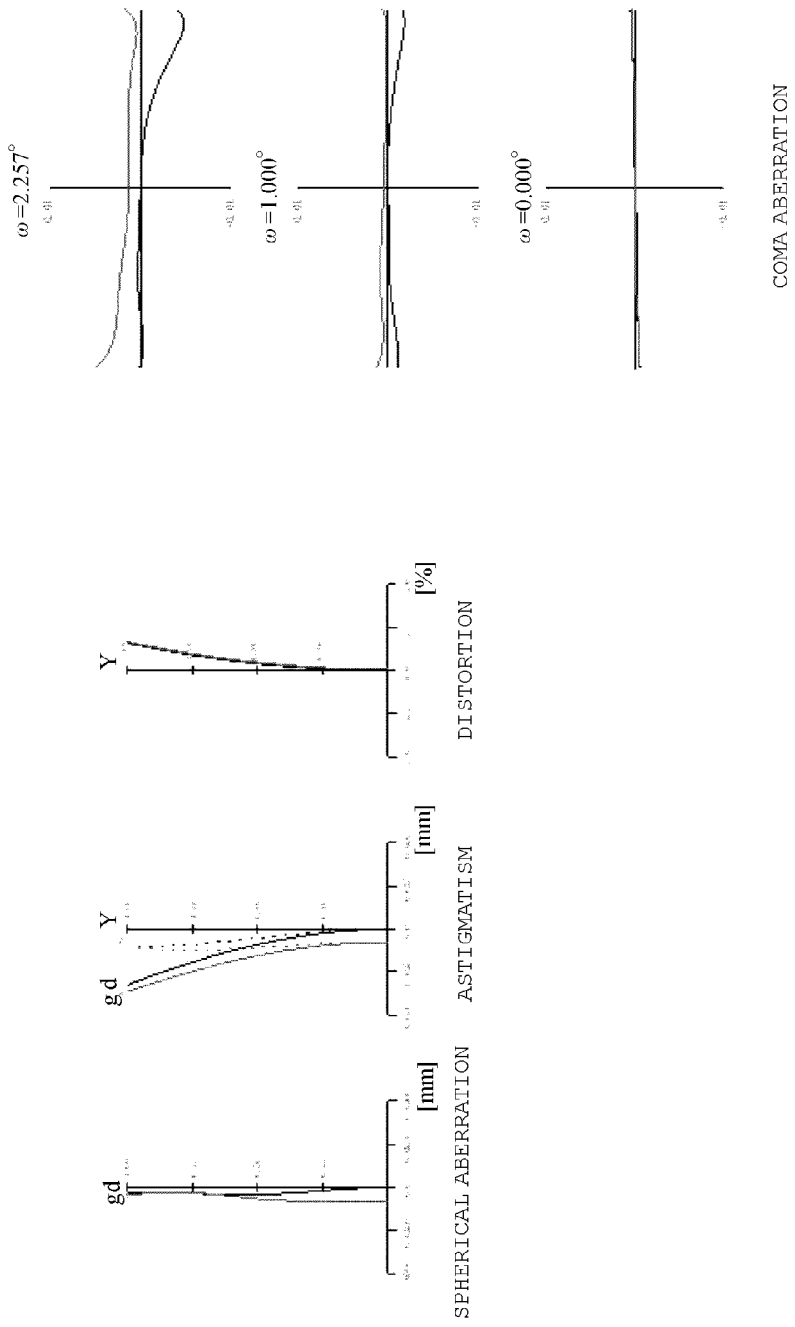

[Fig.34]
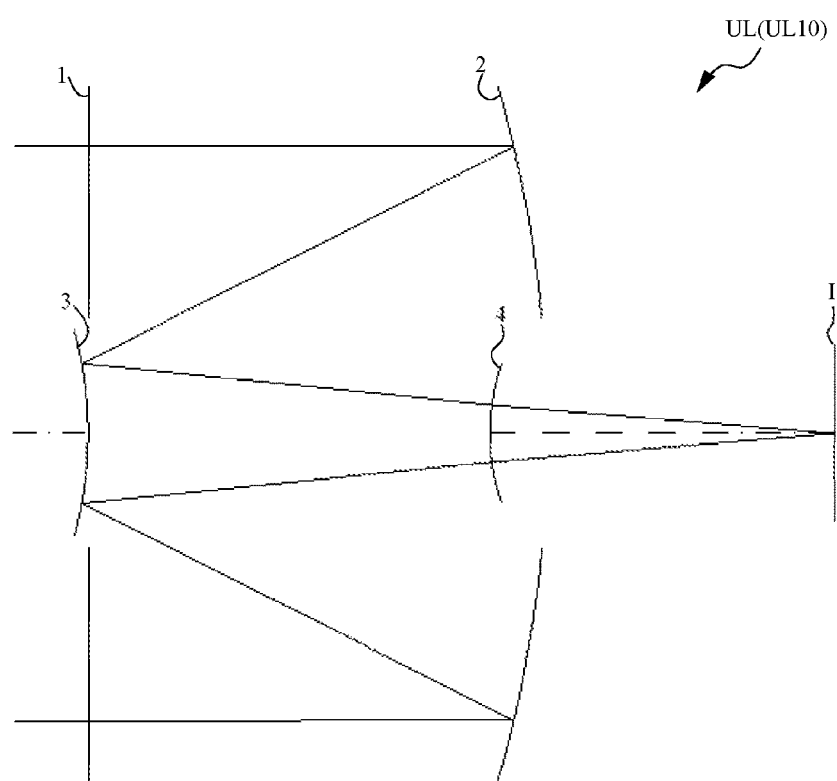

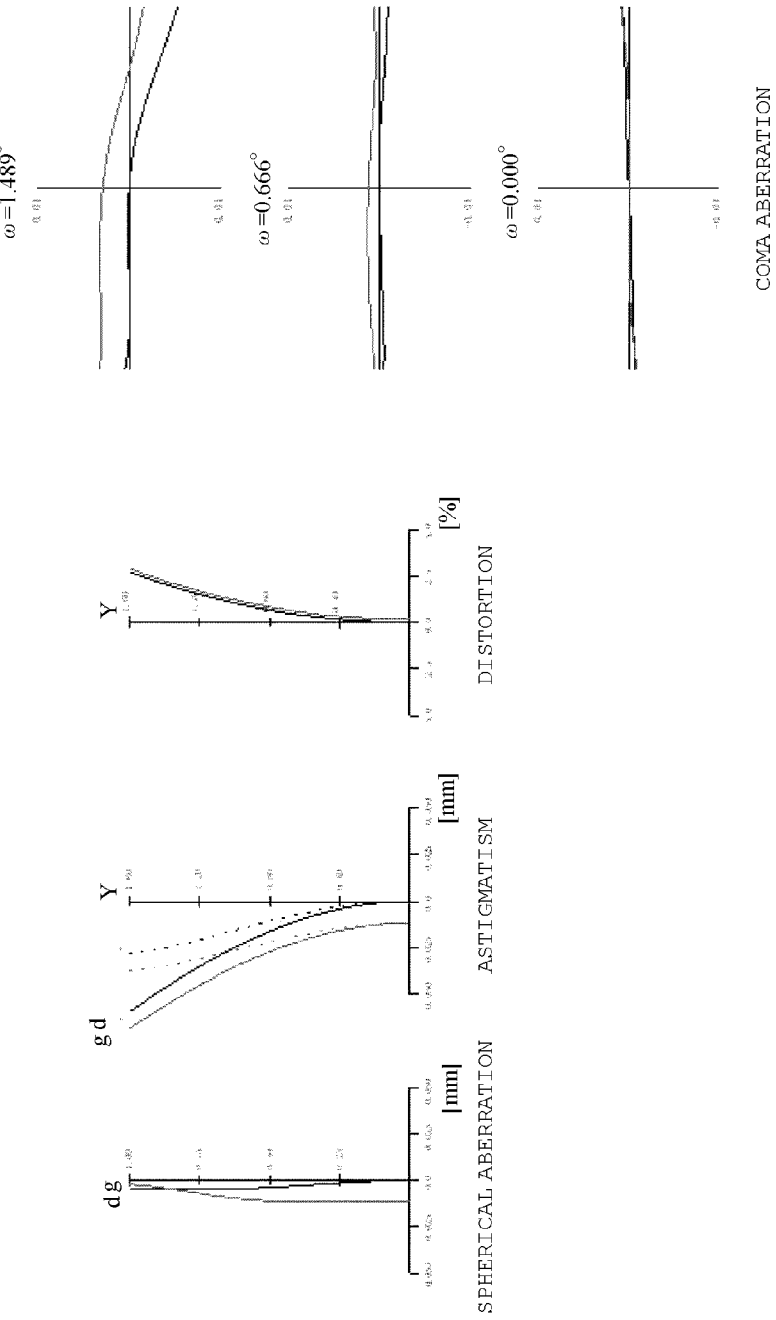
[Fig.35]

OPTICAL SYSTEM, OPTICAL APPARATUS, IMAGING APPARATUS, AND METHOD FOR MANUFACTURING OPTICAL SYSTEM AND IMAGING APPARATUS

TECHNICAL FIELD

The present invention relates to an optical system, an optical apparatus, an imaging apparatus, and a method for manufacturing the optical system and the imaging apparatus.

BACKGROUND ART

An imaging apparatus reduced in size by using a reflection optical system has been proposed (see Patent Literature 1, for example). Further size reduction, however, is required.

CITATION LIST

Patent Literature

Patent Literature 1: Japanese Patent Laid-Open No. 2018-109673

SUMMARY OF INVENTION

An optical system according to a first aspect of the present invention is an optical system that forms an image of an object, the optical system including a light incident surface on which light from an object side is incident, a first reflector that reflects the light having passed through the light incident surface, and a second reflector that reflects the light reflected off the first reflector, and a conditional expression below is satisfied, $$TL < 15.0 \text{ mm}$$

where TL: distance from a surface closest to the object side in the optical system to an image plane in a direction of an optical axis that intersects the image plane.

An optical system according to a second aspect of the present invention is an optical system that forms an image of an object, the optical system including a light incident surface on which light from an object side is incident, a first reflector that reflects the light having passed through the light incident surface, and a second reflector that reflects the light reflected off the first reflector, wherein a conditional expression below is satisfied, $$10.00° < \omega$$

where $\omega$: half angle of view of the optical system.

An optical system according to a third aspect of the present invention is an optical system that forms an image of an object, the optical system including a light incident surface on which light from an object side is incident, a first reflector that reflects the light having passed through the light incident surface, and a second reflector that reflects the light reflected off the first reflector. A medium in an optical path between the first reflector and the second reflector is a light transmissive member having a refractive index. The light incident surface is formed at an object-side, light incident surface of the light transmissive member. A reflection surface as the first reflector is formed at an image-side surface of the light transmissive member that is a surface on which the light having passed through the light incident surface is incident. A reflection surface as the second reflector is formed at the object-side surface of the light transmissive member that is a surface on which the light reflected off the first reflector is incident. A light exiting surface which is the image-side surface of the light transmissive member, on which the light reflected off the second reflector is incident, and via which the light exits out of the light transmissive member is formed. The reflection surface of the second reflector is disposed in a position closer to the object side than the light incident surface when viewed in a direction perpendicular to an optical axis of the optical system.

An optical system according to a fourth aspect of the present invention is an optical system including a first reflector that reflects light incident thereon and a second reflector that reflects the light reflected off the first reflector. Light from an object is incident on and reflected off the first reflector. The light reflected off the first reflector is incident on and reflected off the second reflector and is then reflected again off the first reflector. The light reflected off the first reflector is then incident again on the second reflector, then exits out of the optical system, and forms an image of the object.

An imaging apparatus according to the first aspect of the present invention includes a plurality of image units each including an optical system that has a first reflection surface and a second reflection surface sequentially arranged from an object side along an optical path and forms an image of an object and an image sensor that captures the image formed by the optical system, and at least two of the image sensors are disposed in different relative positions in an optical axis direction with respect to the optical systems.

A method for manufacturing an optical system according to the first aspect of the present invention is a method for manufacturing an optical system that forms an image of an object, the optical system including a light incident surface on which light from an object side is incident, a first reflector that reflects the light having passed through the light incident surface, and a second reflector that reflects the light reflected off the first reflector, and the optical system is so disposed that a conditional expression below is satisfied, $$TL < 15.0 \text{ mm}$$

where TL: distance from a surface closest to the object side in the optical system to an image plane in a direction of an optical axis that intersects the image plane.

A method for manufacturing an optical system according to the second aspect of the present invention is a method for manufacturing an optical system that forms an image of an object, the optical system including a light incident surface on which light from an object side is incident, a first reflector that reflects the light having passed through the light incident surface, and a second reflector that reflects the light reflected off the first reflector, and the optical system is so disposed that a conditional expression below is satisfied, $$10.00° < \omega$$

where $\omega$: half angle of view of the optical system.

A method for manufacturing an optical system according to the third aspect of the present invention is a method for manufacturing an optical system that forms an image of an object, the optical system including a light incident surface on which light from an object side is incident, a first reflector that reflects the light having passed through the light incident surface, and a second reflector that reflects the light reflected off the first reflector. A medium in an optical path between the first reflector and the second reflector is a light transmissive member having a refractive index. The light incident surface is formed at an object-side, light incident surface of the light transmissive member. A reflection surface as the first reflector is formed at an image-side surface of the light transmissive member that is a surface on which the light having passed through the light incident surface is incident. A reflection surface as the second reflector is formed at the object-side surface of the light transmissive member that is a surface on which the light reflected off the first reflector is incident. A light exiting surface which is the image-side surface of the light transmissive member, on which the light reflected off the second reflector is incident, and via which the light exits out of the light transmissive member is formed. The reflection surface of the second reflector is disposed in a position closer to the object side than the light incident surface when viewed in a direction perpendicular to an optical axis of the optical system.

A method for manufacturing an optical system according to the fourth aspect of the present invention is a method for manufacturing an optical system including a first reflector that reflects light incident thereon and a second reflector that reflects the light reflected off the first reflector. Light from an object is incident on and reflected off the first reflector. The light reflected off the first reflector is incident on and reflected off the second reflector and is then reflected again off the first reflector. The light reflected off the first reflector is then incident again on the second reflector, then exits out of the optical system, and forms an image of the object.

A method for manufacturing an imaging apparatus according to the first aspect of the present invention is a method for manufacturing an imaging apparatus including a plurality of image units each including an optical system that has a first reflection surface and a second reflection surface sequentially arranged from an object side along an optical path and forms an image of an object and an image sensor that captures the image formed by the optical system, and at least two of the image sensors are disposed in different relative positions in an optical axis direction with respect to the optical systems.

BRIEF DESCRIPTION OF DRAWINGS

FIG. 1 is a descriptive diagram showing a camera module; FIG. 1(a) is a front view, and FIG. 1(b) is a cross-sectional view.

FIG. 2 is a cross-sectional view of an optical system that forms the camera module; FIG. 2(a) shows a basic configuration of a Schmidt-Cassegrain-type optical system, and FIG. 2(b) shows the configuration shown in FIG. 2(a) to which a lens is added.

FIG. 3 shows graphs illustrating the relationship between a secondary magnification ratio and astigmatism in Schmidt-Cassegrain-type and Cassegrain-type optical systems.

FIG. 4 is a perspective view showing the external appearance of a camera module having a multi-view configuration.

FIG. 5 is a descriptive diagram showing the camera module having a multi-view configuration; FIG. 5(a) is a front view, and FIG. 5(b) is a cross-sectional view taken along the line A-A in FIG. 5(a).

FIG. 6 is a descriptive diagram showing the configurations of a first optical member and a second optical member.

FIG. 7 is a descriptive diagram showing the configuration of an optical system block unit.

FIG. 8 is a descriptive diagram for describing a focusing mechanism.

FIG. 9 is a descriptive diagram for describing the field of view of the camera module; FIG. 9(a) shows the state of the field of view at the telephoto end, and FIG. 9(b) shows the state of the field of view at the wide-angle end.

FIG. 10 is a descriptive diagram for describing a magnification changing mechanism; FIG. 10(a) shows a side view, and FIG. 10(b) shows a magnification changing method.

FIG. 11 is a descriptive diagram showing the direction in which the field of view of each optical system moves when the magnification factor is changed from the value corresponding to a telephoto end state to the value corresponding to a wide-angle end state.

FIG. 12 is a descriptive diagram for describing removal of stray light; FIG. 12(a) shows an example of the stray light, and FIG. 12(b) shows a first configuration.

FIG. 13 is a descriptive diagram showing a second configuration for stray the light removal.

FIG. 14 is a descriptive diagram for describing setting the position of an image sensor in the optical axis direction on a unit block basis.

FIG. 15 is a descriptive diagram for describing the combination with an illuminator.

FIG. 16 is a descriptive diagram showing patterns in accordance with which cameras and illuminators are arranged.

FIG. 17 is a descriptive diagram of multi-stage folding; FIG. 17(a) shows a case where reflection mirrors are formed of separate members, and FIG. 17(b) shows a case where primary reflection mirrors are formed of a single member and secondary reflection mirrors are formed of a single member.

FIG. 18 is a diagrammatic view of a camera including the camera module.

FIG. 19 is a flowchart showing a method for manufacturing the camera module.

FIG. 20 is a cross-sectional view showing the lens configuration of an optical system according to a first example.

FIG. 21 is a diagram of a variety of aberrations of the optical system according to the first example.

FIG. 22 is a cross-sectional view showing the lens configuration of an optical system according to a second example.

FIG. 23 is a diagram of a variety of aberrations of the optical system according to the second example.

FIG. 24 is a cross-sectional view showing the lens configuration of an optical system according to a third example.

FIG. 25 is a diagram of a variety of aberrations of the optical system according to the third example.

FIG. 26 is a cross-sectional view showing the lens configuration of an optical system according to a fourth example.

FIG. 27 is a diagram of a variety of aberrations of the optical system according to the fourth example.

FIG. 28 is a descriptive diagram showing the configuration of an optical system according to fifth to seventh examples.

FIG. 29 is a cross-sectional view of the optical system formed of an integrated lens.

FIG. 30 is a descriptive diagram showing the configuration of an optical system according to an eighth embodiment.

FIG. 31 is a diagram of a variety of aberrations of the optical system according to the eighth example.

FIG. 32 is a descriptive diagram showing the configuration of an optical system according to a ninth embodiment.

FIG. 33 is a diagram of a variety of aberrations of the optical system according to the ninth example.

FIG. 34 is a descriptive diagram showing the configuration of an optical system according to a tenth embodiment.

FIG. 35 is a diagram of a variety of aberrations of the optical system according to the tenth example.

DESCRIPTION OF EMBODIMENT

A preferable embodiment will be described below with reference to the drawings.
(Configuration of Camera Module 10)

A camera module 10, which is an imaging apparatus according to the present embodiment, is formed of an optical system UL and an image sensor 14, as shown in FIG. 1. The optical system UL brings light from the object side into focus, and the image sensor 14 captures an image of a subject.

The optical system UL is what is called a Schmidt-Cassegrain-type (or compact Schmidt-Cassegrain-type) optical system and includes the following sections arranged along the optical axis sequentially from an object (subject) side: a correction plate 11, which has a correction surface 11a, which is a higher-order aspheric surface, and serves as a correction member and transmits the light from an object, a primary reflection mirror 12, which has a concave reflection surface (first reflection surface 12a) facing the object side and serves as a first reflector that reflects the light having passed through the correction plate 11, and a secondary reflection mirror 13, which is so disposed on the object side as to face the primary reflection mirror 12, has a convex reflection surface (second reflection surface 13a) that faces the image side (the side facing the primary reflection mirror 12), and serves as a second reflector that reflects the light reflected off the primary reflection mirror 12, as shown in FIG. 2(a). The optical axis of the light incident on the first reflection surface 12a coincides with the optical axis of the light reflected off the first reflection surface 12a. Further, the optical axis of the light incident on the second reflection surface 13a coincides with the optical axis of the light reflected off the second reflection surface 13a. An aperture part 12b is so formed in a central portion of the primary reflection mirror 12 as to contain the optical axis of the optical system UL, and the light reflected off the secondary reflection mirror 13 passes through the aperture part 12b. That is, the first reflection surface 12a has the aperture part 12b so provided as to contain the optical axis of the light incident on the first reflection surface 12a, and the second reflection surface 13a reflects the light toward the aperture part 12b. The image sensor 14 is so disposed on the image side of the primary reflection mirror 12 as to face the aperture part 12b. The primary reflection mirror 12 and the secondary reflection mirror 13 are configured to collect the light from the object, and the optical system UL is so configured that the image sensor 14 is located at the focal points of the primary reflection mirror 12 and the secondary reflection mirror 13 (the focal point of the optical system UL) (the image surface of the image sensor 14 is so disposed as to roughly coincide with the image plane I of the optical system UL). As described above, the optical axis of the optical system UL passes through the correction plate 11, is bent by reflection by the primary reflection mirror 12, and is bent again by reflection by the secondary reflection mirror 13 sequentially from the object side. The primary reflection mirror 12 (first reflection surface 12a), which is the first reflector 12, may have an annular shape around the optical axis or a rectangular shape formed around the optical axis and provided with a rectangular or circular aperture part 12b. The secondary reflection mirror 13 (second reflection surface 13a), which is the second reflector 13, may have a circular or rectangular shape formed around the optical axis.

The optical system UL shown in FIG. 2(a) shows a case where the object-side surface of the correction plate 11 is the correction surface 11a, and an image-side surface of the correction plate 11 may instead be the correction surface 11a. The correction surface 11a preferably corrects aberrations that may deteriorate at the reflection surfaces (first reflection surface 12a and second reflection surface 13a) or may correct a certain type of aberration that cannot be fully corrected at the reflection surfaces or higher-order aberrations that cannot be fully corrected at the reflection surfaces. The correction surface 11a is preferably a higher-order aspheric surface or may be a spherical or aspheric surface that is not a flat surface. The other surface of the correction plate 11 or the surface where the correction surface 11a is not formed is a flat surface in the present embodiment and may instead be a spherical surface or a free form surface.

(Optical System UL)

The optical system UL is formed of a reflection optical system, as described above. Even when at least one or both of the first reflection surface 12a of the primary reflection mirror 12 and the second reflection surface 13a of the secondary reflection mirror 13 are each formed of a spherical surface, aberrations produced at the primary reflection mirror 12 and the secondary reflection mirror 13 are corrected at a higher-order aspheric surface (quaternary curved surface, for example) that is the object-side surface of the correction plate 11, whereby an image having no coma aberration, astigmatism, or distortion as a whole can be produced. It is therefore desirable that at least one of the first reflection surface 12a of the primary reflection mirror 12 and the second reflection surface 13a of the secondary reflection mirror 13 is a spherical surface, and it is more desirable that the first reflection surface 12a and the second reflection surface 13a are each a spherical surface. When at least one of the first reflection surface 12a and the second reflection surface 13a is a spherical surface, the optical system UL is readily manufactured.

The optical system UL may be provided with a refractive optical system (lens, for example) 15, which refracts the light passing through the aperture part 12b of the primary reflection mirror 12, as shown in FIG. 2(b). The optical system UL may instead be a Cassegrain-type optical system including no correction plate 11. It is preferable that all the optical axes of the optical elements provided in the optical system UL coincide with one another. It is at least preferable that the optical axis of the primary reflection mirror 12 and the optical axis of the secondary reflection mirror 13 coincide with each other except that the rays travel in opposite directions along the two optical axes.

In the camera module 10 according to the present embodiment, the optical system UL, which is a folding optical system (Cassegrain type, Schmidt-Cassegrain type, or compact Schmidt-Cassegrain-type reflection optical system) using the reflection surfaces described above, can reduce the length of the optical system (the physical distance from the surface closest to the object side (the object-side surface of the correction plate 11 (correction surface 11a) in the case of FIG. 2(a)) to the image plane (the image surface of the image sensor 14)) by a factor of 2 to 3 as compared with a case where the optical system UL is formed of an optical system having no reflection surface.

In the optical system UL according to the present embodiment, air is the medium between the first reflection surface 12a of the primary reflection mirror 12 and the second reflection surface 13a of the secondary reflection mirror 13. The configuration described above allows the camera module 10 including the optical system UL to be readily manufactured. When no image is captured, the correction plate 11 and the secondary reflection mirror 13 can be moved toward the primary reflection mirror 12 (what is called "retracted")

and stored there, whereby the size of the camera module 10 can be reduced, and at least part of the camera module 10 can be stored in an optical apparatus, such as a camera.

The optical system UL according to the present embodiment desirably satisfies Conditional Expression (1) below, $$TL<15.0 \text{ mm} \quad (1)$$

where TL is the distance from the surface closest to the object side in the optical system UL to the image plane I in the direction of the optical axis that intersects the image plane I.

Conditional Expression (1) shows an appropriate range of the length of the optical system UL in the optical axis direction in the case where the optical system UL is formed of a Schmidt-Cassegrain-type (or compact Schmidt-Cassegrain-type) reflection optical system. To ensure the effect of Conditional Expression (1), the upper limit of Conditional Expression (1) is 14.0 mm or 13.0 mm, more desirably, 12.0 mm. Further, to ensure the effect of Conditional Expression (1), the lower limit of Conditional Expression (1) is desirably 6 mm. When the correction plate 11 shown in FIG. 2 is provided, the surface closest to the object side in the optical system UL is the correction surface 11a.

The optical system UL according to the present embodiment desirably satisfies Conditional Expression (2) below, $$10.00°<\omega \quad (2)$$

where $\omega$ is half angle of view of the optical system UL.

Conditional Expression (2) shows an appropriate range of the half angle of view of the optical system UL in the case where the optical system UL is formed of a Schmidt-Cassegrain-type (or compact Schmidt-Cassegrain-type) reflection optical system. To ensure the effect of Conditional Expression (2), the lower limit of Conditional Expression (2) is 8.00°, 6.00°, 5.00°, 4.00°, 3.50°, 3.00°, 2.50°, 2.00°, more desirably, 1.50°.

When the optical system UL according to the present embodiment is a compact Schmidt-Cassegrain-type optical system, a thickness ΔL of the correction plate 11 is expressed by Expression (a) below. Expression (a) is disclosed in "APPLIED OPTICS, Vol. 13, No. 8, August 1974".

$$\Delta L=[(h/r)^4-1.5(h/r)^2]/\{256(n-1)P^{i3}\}+k \quad (a)$$

where
$P^t=P_1/G^{1/3}$,
$P_1$: f-number of the primary reflection mirror 12,
G: Proportion of a calculated depth of the correction plate 11,
h: Height in the direction perpendicular to the optical axis,
r: Corrected radius (radius of curvature) of the correction plate 11,
n: Refractive index of the medium that forms the correction plate 11, and
k: Center thickness of the correction plate 11.

In the optical system UL according to the present embodiment, a light transmissive member that transmits the light from the object may be provided as appropriate in a position on the optical path. Providing the light transmissive member and forming an aspheric surface on the light transmissive member or otherwise shaping the light transmissive member allows correction of the aberrations. The aspheric surface of the light transmissive member (including the correction surface 11a of the correction plate 11), which extends from the optical axis toward the periphery, preferably has at least one inflection point in a position.

The optical system UL according to the present embodiment desirably satisfies Conditional Expression (3) below, $$-0.1<f/fa<0.1 \quad (3)$$

where
fa: Focal length of the correction surface 11a, and
f: Overall focal length of the optical system UL.

Conditional Expression (3) shows an appropriate range of the ratio of the overall focal length of the optical system UL to the focal length of the correction surface 11a in the case where the optical system UL is formed of a Schmidt-Cassegrain-type (or compact Schmidt-Cassegrain-type) reflection optical system. To ensure the effect of Conditional Expression (3), the lower limit of Conditional Expression (3) is −0.05 or −0.02, more desirably, 0.00. Further, to ensure the effect of Conditional Expression (3), the upper limit of Conditional Expression (3) is 0.09, 0.08, 0.07, or 0.06, more desirably, 0.05.

The optical system UL according to the present embodiment desirably satisfies Conditional Expression (4) below, $$-0.1<f/fb<0.1 \quad (4)$$

where
fb: Focal length of the correction plate 11, and
f: Overall focal length of the optical system UL.

Conditional Expression (4) shows an appropriate range of the ratio of the overall focal length of the optical system UL to the focal length of the correction plate 11 in the case where the optical system UL is formed of a Schmidt-Cassegrain-type (or compact Schmidt-Cassegrain-type) reflection optical system. To ensure the effect of Conditional Expression (4), the lower limit of Conditional Expression (4) is −0.05 or −0.02, more desirably, 0.00. Further, to ensure the effect of Conditional Expression (4), the upper limit of Conditional Expression (4) is 0.09, 0.08, 0.07, or 0.06, more desirably, 0.05.

The optical system UL according to the present embodiment desirably satisfies Conditional Expression (5) below, $$3.0<M<8.0 \quad (5)$$

where
M=f/f1
f: Overall focal length of the optical system UL, and
f1: Focal length of the primary reflection mirror 12.

Conditional Expression (5) shows an appropriate range of a secondary magnification ratio M of the optical system UL in the case where the optical system UL is formed of a Schmidt-Cassegrain-type (or compact Schmidt-Cassegrain-type) reflection optical system.

FIG. 3 shows astigmatism versus the secondary magnification ratio M in Cassegrain-type and Schmidt-Cassegrain-type reflection optical systems. When the optical system UL is formed of a Schmidt-Cassegrain-type (or compact Schmidt-Cassegrain-type) reflection optical system, astigmatism can be reduced to zero by setting the secondary magnification ratio M at 5.6, as can be seen from FIG. 3. Therefore, when the optical system UL satisfies Conditional Expression (5), occurrence of astigmatism can be suppressed, whereby a satisfactory image can be acquired. To ensure the effect of Conditional Expression (5), the lower limit of Conditional Expression (5) is 3.5, more desirably, 4.0 4.5, or 5.0. Further, to ensure the effect of Conditional Expression (5), the upper limit of Conditional Expression (5) is 7.5, more desirably, 7.0, 6.5, or 6.0.

The optical system UL according to the present embodiment desirably satisfies Conditional Expression (6) below, $$f<500 \text{ mm} \quad (6)$$

where f: Overall focal length of the optical system UL.

Conditional Expression (6) shows an appropriate range of the overall focal length of the optical system UL in the case where the optical system UL is formed of a Schmidt-Cassegrain-type (or compact Schmidt-Cassegrain-type) reflection optical system. To ensure the effect of Conditional Expression (6), the lower limit of Conditional Expression (6) is 0.1 mm, more desirably, 1 mm, 5 mm, 10 mm, or 20 mm. Further, to ensure the effect of Conditional Expression (6), the upper limit of Conditional Expression (6) is 380 mm, more desirably, 280 mm, 230 mm, 190 mm, 140 mm, 90 mm, 70 mm, 55 mm, or 45 mm.

The optical system UL according to the present embodiment desirably satisfies Conditional Expression (7) below, $$0.4 < RL/TL < 1.2 \tag{7}$$

where

RL: On-axis distance between the first reflector and the second reflector in the direction of the optical axis of the optical system UL, and TL: Distance from the surface closest to the object side in the optical system to the image plane in the direction of the optical axis that intersects the image plane.

Conditional expression (7) shows an appropriate range of the ratio between the distance from the surface closest to the object side in the optical system UL to the image plane and the distance between the reflection surfaces. To ensure the effect of Conditional Expression (7), the upper limit of Conditional Expression (7) is 1.0 or 0.9, more desirably, 0.85. Further, to ensure the effect of Conditional Expression (7), the lower limit of Conditional Expression (7) is desirably 0.6 or 0.7.

The optical system UL according to the present embodiment desirably satisfies Conditional Expression (8) below, $$0.5 < D1/RL < 2.0 \tag{8}$$

where

D1: Outer diameter of the first reflection surface, and

RL: On-axis distance between the first reflector and the second reflector in the direction of the optical axis of the optical system UL.

Conditional expression (8) shows an appropriate range of the ratio between the length in the optical axis direction of the optical system UL and the length in the direction perpendicular to the optical axis. The outer diameter of the first reflection surface is the diameter in a case where the first reflection surface has a circular shape and is the maximum outer diameter in a case where the first reflection surface has a rectangular shape. To ensure the effect of Conditional Expression (8), the upper limit of Conditional Expression (8) is 1.7 or 1.5, more desirably, 1.3. Further, to ensure the effect of Conditional Expression (8), the lower limit of Conditional Expression (8) is 0.7 or 0.8, more desirably, 0.85.

The optical system UL according to the present embodiment desirably satisfies Conditional Expression (9) below, $$1.0 < D1/D2 < 6.0 \tag{9}$$

where

D1: Outer diameter of the first reflection surface, and
D2: Outer diameter of the second reflection surface.

Conditional expression (9) shows an appropriate range of the ratio between the outer diameters of the reflection surfaces. The outer diameter of the first reflection surface or the outer diameter of the second reflection surface is the diameter in a case where the reflection surface has a circular shape and is the maximum outer diameter in a case where the reflection surface has a rectangular shape. To ensure the effect of Conditional Expression (9), the upper limit of Conditional Expression (9) is 5.0 or 5.5, more desirably, 3.0. Further, to ensure the effect of Conditional Expression (9), the lower limit of Conditional Expression (9) is 1.3 or 1.5, more desirably, 3.5.

The optical system UL according to the present embodiment desirably satisfies Conditional Expression (10) below, $$5.0 < D0/Y < 15.0 \tag{10}$$

where

D0: Outer diameter of the light incident surface closest to the object side in the optical system UL, and Y: Maximum image height on the image sensor 14.

Conditional expression (10) shows an appropriate range of the ratio between the outer diameter of the light incident surface and the maximum image height on the image sensor 14. The outer diameter of the light incident surface is the diameter in a case where the light incident surface has a circular shape and is the maximum outer diameter in a case where the light incident surface has a rectangular shape. To ensure the effect of Conditional Expression (10), the upper limit of Conditional Expression (10) is 14.5 or 14.0, more desirably, 9.0. Further, to ensure the effect of Conditional Expression (10), the lower limit of Conditional Expression (10) is 6.0 or 7.0, more desirably, 10.0.

(Multi-View Configuration of Camera Module 10)

In FIG. 1, the description has been made of the case where the camera module 10 is formed of the optical system UL and the image sensor 14, which form a set of image unit. Instead, a plurality of camera modules 10, each of which has been described above, may be two-dimensionally arranged to form a camera module 1, which is a multi-view imaging apparatus, as shown in FIGS. 4 and 5. In the following description, the camera module 10 described above in the multi-view configuration is referred to as a "unit block 10". Further, the following description of the multi-view configuration will be made of a case where the camera module 1 is formed of a total of 9 (hereinafter referred to as "3×3") unit blocks 10 in 3 rows and 3 columns, as shown in FIG. 4 and other figures. It is, however, noted that the same effects can be provided by a configuration formed of two or more unit blocks 10. The number of unit blocks 10 contained in one row and the number of unit blocks 10 contained in one column may not be equal to each other. However, as will be described later, when images acquired from the image sensors 14, which each form the corresponding unit block 10, are combined with one another, the configuration in which the number of unit blocks 10 contained in one row is equal to the number of unit blocks 10 contained in one column allows generation of an image having the same resolution in the lengthwise direction and the widthwise direction. The optical systems UL of each of the plurality of unit blocks 10 that form the camera module 1 are so arranged that the optical axes of the optical systems UL are roughly parallel to one another. Further, the image sensors 14 of the plurality of unit blocks 10 are each disposed in a plane perpendicular to the optical axis and are two-dimensionally juxtaposed in the direction of an axis X perpendicular to the optical axis and the direction of an axis Y perpendicular to the axis X and the optical axis.

In the camera module 1 according to the present embodiment, the optical system UL of each of the unit blocks 10, which is a folding optical system (Cassegrain-type, Schmidt-Cassegrain-type, or compact Schmidt-Cassegrain-type reflection optical system) described above, can reduce the length of the optical system (the physical distance from the surface closest to the object side to the image plane) by a factor of 2 to 3 as compared with a case where the optical systems UL are each formed of a refractive optical system. Further, the camera module 1 according to the present embodiment includes a plurality of unit blocks 10, and images acquired by the image sensors 14 of the unit blocks 10 can be combined with one another to acquire a high-resolution image having resolution higher than that of each of the image sensors 14, whereby the size of each of the image sensors 14 can be reduced (the combination of images captured with the image sensors 14 each having a smaller size and hence lower resolution still allows acquisition of a high-resolution image). The reduction in size of the image sensors 14 can shorten the focal length of the optical system UL of each of the unit blocks 10. Therefore, employing the folding optical system and providing the effect of combination of images acquired by the plurality of unit blocks 10 allow the camera module 1 according to the present embodiment to have a total length reduced by at least a factor of 4 as compared with a camera module formed of a single unit block 10 using a refractive optical system having the same resolution.

(Assembly Structure of Camera Module 1)

The assembly structure of the camera module 1 according to the present embodiment will next be described. The assembly structure of the camera module 1 having a multi-view configuration will be described below (FIGS. 4 and 5), and the same description applies to the camera module 10 having a single-view configuration (FIG. 1).

The camera module 1 according to the present embodiment includes a first optical member 110, in which the correction plates 11 (correction members) and the secondary reflection mirrors 13 (second reflectors) are formed, a second optical member 120, in which the primary reflection mirrors 12 (first reflectors) are formed, partition members 130, which are disposed between the first optical member 110 and the second optical member 120, are provided at the boundaries between the unit blocks 10, and prevents rays from entering adjacent unit blocks 10, and an imaging member 140, on which the image sensors 14 are arranged, as shown in FIGS. 4 and 5.

The plurality of correction plates 11 of the first optical member 110 are formed by imprinting a polymer that is a medium that transmits light on the upper surface of a parallel plane glass plate 111 (an object-side surface in optical system UL) made of a medium that transmits light (3×3=9 correction plates 11 are formed in the example of FIG. 4), as shown in FIG. 6(*a*). The first optical member 110 may instead be produced by cutting a substrate on which the correction plates 11 are formed, for example, by imprinting. The lower surface of the parallel plane glass plate 111 (an image-side surface in the optical system UL) is coated by using a mask with a reflection member that reflects light to form a plurality of secondary reflection mirrors 13 (3×3=9 secondary reflection mirrors 13 are formed in the example of FIG. 4). Forming the plurality of correction plates 11 and the secondary reflection mirrors 13 on opposite sides of the single parallel plane glass plate 111 as described above allows, for example, the correction plate 11 and the secondary reflection mirror 13 in each of the 3×3=9 unit blocks 10 shown in FIG. 4 to be manufactured in a single step.

FIG. 6(*a*) shows a case where the correction surfaces are formed on the object-side surfaces of the correction plates 11, and the correction surfaces may instead be formed on the image-side surfaces of the correction plates 11. When the correction surfaces are formed on the image-side surfaces of the correction plates 11, the correction surfaces can be formed along with the secondary reflection mirrors 13 formed on the image-side surfaces of the correction plates 11, whereby the manufacturing process can be further simplified.

The plurality of primary reflection mirrors 12 of the second optical member 120 are formed by coating the upper surface of a parallel plane glass plate 121 made of a medium that transmits light by using a mask with a reflection member that reflects light (3×3=9 primary reflection mirrors 12 are formed in the example of FIG. 4) as shown in FIG. 6(*b*). Forming the parallel plane glass plate 121 with a medium that transmits light allows formation of the aperture part 12*b* by forming a portion not coated by using a mask on primary reflection mirror 12 in each of the unit blocks 10. Forming the primary reflection mirrors 12 on one surface of the single parallel plane glass plate 121 (an object-side surface in the optical system UL) as described above allows, for example, the primary reflection mirror 12 in each of the 3×3=9 unit blocks 10 shown in FIG. 4 to be manufactured in a single step.

To provide the optical system UL with a refractive optical system 15, such as a lens, as shown in FIG. 2(*b*), a lens surface capable of refracting rays may be formed on the parallel plane glass plate 121.

The partition members 130 are formed of an optical partition lattice that separates the optical systems UL of the unit blocks 10 from each other, as shown in FIG. 7. The first optical member 110 is disposed on the object side of the partition members 130, and the second optical member 120 is disposed on the image side of the partition members 130. Fixing the first optical member 110 to the object side of the partition members 130 and fixing the second optical member 120 to the image side of the partition members 130 allows the partition members 130 to not only prevent rays in the optical system UL of each of the unit blocks 10 from entering the adjacent unit block 10 but position the first optical member 110 and the second optical member 120 in the optical axis direction. In the following description, the first optical member 110, the second optical member 120, and the partition members 130 integrated with each other are referred to as an optical system block unit 100. The optical system block unit 100 is formed of a plurality of unit blocks 10. The partition of each of the partition members 130 is made of a material providing the effect of blocking light, such as metal or polymer, and has a thickness ranging from about 0.5 to 1.0 mm. To optically shield the unit blocks 10 from the outside environment and prevent optical reflection, it is desirable that the inside of the partition is coated with antireflection paint (painted black, for example). The partitions may each be hollow (filled with air) or filled with a medium that transmits light.

On the imaging member 140, a plurality of image sensors 14 are arranged in the positions corresponding to the optical systems UL, as shown in FIGS. 4 and 5(*b*). As will be described later, the position of the optical system block unit 100 relative to the imaging member 140 in the direction along the optical axis may be fixed or variable.

The first optical member 110, the second optical member 120, the partition members 130, and the imaging member 140 may first each be manufactured and then integrated with each other with the positions of the members adjusted. Instead, at least part of the first optical member 110, the second optical member 120, the partition members 130, and the imaging member 140 may be continuously manufactured. For example, a plurality of image sensors 14 may be placed on a single plate member, and the second optical member 120, the partition members 130, and the first optical member 110 may be sequentially formed on the plate member. Still instead, the second optical member 120, the partition members 130, and the first optical member 110 may be sequentially formed to manufacture the optical system block unit 100, and the resultant unit may then be combined with the imaging member 140.

The partition members 130 can be omitted, or instead of the partition members 130, a member that positions the first optical member 110 and the second optical member 120 in the optical axis direction may be used.

The optical block unit 100 may instead be formed of a light transmissive member made of a medium that transmits light. In this case, two light transmissive members may be used to form the correction surfaces 11a and the second reflection surfaces 13a on a first light transmissive member, and the first reflection surfaces 12a may be formed on a second light transmissive member so placed as to be separate from the first light transmissive member with an air gap therebetween. Still instead, when an integrated light transmissive member is used, the correction surfaces 11a and the second reflection surfaces 13a are formed on the object-side surface of the light transmissive member, and the first reflection surfaces 12a are formed on the image-side surface of the light transmissive member. The light transmissive member may contain one medium or a plurality of media. Different types of media mean that at least one of the refractive index and the Abbe number differs among the different types. When a plurality of types of media are used, the light transmissive member is formed of a portion made of a first medium and a portion made of a second medium. The boundary between the portion made of the first medium and the portion made of the second medium extends along a plane perpendicular to the optical axis and forms a flat or spherical plane.

(Focusing)

The shortest distance of the camera module 10 having a single-view configuration according to the present embodiment (the camera module 10 having a single-view configuration will be described below, but the same description applies to the camera module 1 having a multi-view configuration) can be determined with respect to the distance that allows a magnification factor ranging from about 50 to 100. In other words, the shortest distance of the camera module 10 according to the present embodiment varies in accordance with the focal length thereof. Table 1 below shows the relationship between the magnification factor and the amount of travel of the optical system UL drawn out from the point at infinity to the shortest distance point on the assumption that the camera module 10 according to the present embodiment is equivalent, in terms of focal length of a 35-mm camera, to a telephoto optical system having a focal length of 300, 500, and 1000 mm. Since the optical system UL is integrally configured in the form of the optical system block unit 100 as described above, the first optical member 110, the partition members 130, and the second optical member 120 are integrally moved away from the image sensor 14 toward the object. Also in the case of the camera module 1 having a multi-view configuration, the plurality of (nine in the present embodiment) correction plates 11 and the plurality (nine in the present embodiment) of secondary reflection mirrors 13 are integrated with each other with the plurality of (9 in the present embodiment) primary reflection mirrors 12 integrated thereto and the partition members that isolate the unit blocks 10 from each other also integrated thereto, so that the plurality of (nine in the present embodiment) optical systems UL can be moved as a one-piece unit.

TABLE 1

Relationship between magnification and the extending amount from the point at infinity to the shortest distance point

| | Focal length in terms of 35-mm camera | | |
|---|---|---|---|
| Magnification factor | 300 | 500 | 1000 |
| 100 | 0.20[mm] | 0.33[mm] | 0.67[mm] |
| 50 | 0.40[mm] | 0.67[mm] | 1.30[mm] |

Table 2 below shows the relationship between the magnification factor and the shortest distance on the assumption that the camera module 10 according to the present embodiment is equivalent, in terms of focal length of a 35-mm camera, to a telephoto optical system having a focal length of 300, 500, and 1000 mm.

TABLE 2

Relationship between magnification factor and shortest distance

| | Focal length in terms of 35-mm camera | | |
|---|---|---|---|
| Magnification factor | 300 | 500 | 1000 |
| 100 | 2.0[m] | 3.4[m] | 6.6[m] |
| 50 | 1.0[m] | 1.7[m] | 3.3[m] |

In the case of the camera module 1 having a multi-view configuration formed of a plurality of optical systems UL, the amount of defocus can be calculated by using images acquired from the image sensors 14 of the unit blocks 10 each including the optical system UL. The camera module 1 having a multi-view configuration according to the present embodiment has 3×3=9 unit blocks 10. Therefore, when the interval between the unit blocks 10 is 6 mm, an effective baseline length in terms of S/N ratio is the interval multiplied by the square root of 9, that is, about 20 mm.

The camera module 10 according to the present embodiment therefore performs focusing based on a whole extension scheme, and the optical system block unit 100 (the first optical member 110, the second optical member 120, and the partition members 130) is moved as a one-piece unit toward the object side. That is, the distance from the optical system block unit 100 to the imaging member 140 is changed at the time of focusing. For example, in a focusing mechanism 150 as shown in FIG. 8, a pin 151 is attached to the outer circumferential surface of one of the partition members 130; and a drive unit 154, such as a motor, drives a ball screw 153 to cause an wedge member 152 attached to the ball screw 153 to push up the pin 151, so that the optical system block unit 100 of the camera module 1, that is, the entire optical system UL can be moved toward the object side (in the direction labeled with the arrow in FIG. 8), thereby to perform focusing. The total amount of movement (extending amount) of the optical system UL of the camera module 10 is equal to the extending amount to each of the shortest distances shown in Table 1. Therefore, in the case of the camera module 1 having a magnification factor of 50 and a focal length of 300 mm in terms of 35-mm camera, the maximum extending amount is 0.4 mm (distance of 1.0 m, as shown in Table 2), and in the case of the camera module 1 having the magnification factor of 50 and a focal length of 1000 mm in terms of 35-mm camera, the maximum extending amount is 1.3 mm (distance of 3.3 m). The focusing operation may instead be performed by moving at least part of the image sensor 14 and the optical system UL in the optical axis direction.

(Change in Magnification Factor)

The camera module 1 having a multi-view configuration according to the present embodiment is formed of a plurality of unit blocks 10, and the optical systems UL that form the unit blocks 10 are so arranged that the optical axes of the optical systems UL are roughly parallel to each other. The fields of view of the plurality of optical systems UL therefore roughly coincide with one another (field of view fvt shown in FIG. 9(a)). On the other hand, since the camera module 1 having a multi-view configuration according to the present embodiment is formed of a plurality of unit blocks 10, the field of view of the entire camera module 1 can be expanded by bending the optical axes of the optical systems UL that form the unit blocks 10 in such a way that the fields of view of the optical systems UL do not overlap with one another. For example, out of the 3×3 optical systems UL that form the 3×3 unit blocks 10, the optical axis of the optical system UL of the central unit block 10 is not changed, and the optical axes of the optical systems UL of the eight peripheral unit blocks 10 are deflected in directions that do not cause the fields of view to overlap with one another, whereby a wide field of view as a whole can be achieved, as shown in FIG. 9(b). For example, when 3×3 unit blocks 10 are provided, the field of view fvt can be tripled, as shown by the field of view fvw in FIG. 9 (b).

As a specific method for changing the magnification factor, a field-lens-shaped prism block (a deflective optical system that is a field prism) 160 is disposed on the object side of the optical system block unit 100, as shown in FIG. 10(a). The prism block 160 is configured as a parallel-surface plate for a central optical system ULc (that is, the optical axis of the central optical system ULc is not deflected), and the optical axes of the optical systems arranged around the central optical system ULc are deflected outward and then intersect the object, as shown in FIG. 11. Specifically, the optical axes of optical systems ULu and ULd located in the upward/downward direction (vertically adjacent to each other) are deflected in the vertical direction, the optical axes of optical systems ULr and ULl located in the rightward/leftward direction (horizontally adjacent to each other) are deflected in the horizontal direction, and the optical axes of optical systems ULur, Ulul, ULdr, and ULdl located in oblique directions are deflected in the oblique directions (diagonal directions of a rectangular field of view). In FIG. 11, the deflection direction is indicated by an arrow for each of the optical systems UL.

Table 3 below shows, on the assumption that the base material (medium) of the prism block 160 has a refractive index of 1.5, the relationship of the angles θ of the surface of the prism block 160 for the peripheral optical systems UL with the surface of the prism block 160 for the central optical system UL (FIG. 10 (a)). Table 3 shows the angle θ between the optical axis of the central optical system and the optical axes of the horizontally adjacent optical systems and the vertically adjacent optical systems in the case where the fields of view of the optical systems UL do not overlap one another and there are no gaps therebetween (that is, the nine fields of view are in intimate contact with one another, as shown in FIG. 9(b), when the camera module 1 having a multi-view configuration according to the present embodiment has focal lengths corresponding to 300, 500, and 1000 mm in terms of 35-mm camera.

TABLE 3

| | Angle of prism block | | |
|---|---|---|---|
| | Focal length in terms of 35-mm camera | | |
| | 300 | 500 | 1000 |
| Horizontally adjacent optical systems | 13.3° | 8.0° | 4.0° |
| Vertically adjacent optical systems | 9.1° | 5.5° | 2.8° |

As can be seen from Table 3, for example, when the camera module 1 having a multi-view configuration according to the present embodiment has the focal length of 300 mm in terms of 35-mm camera, attaching the prism block 160 so configured that the angle θ of the prism for the horizontally adjacent optical systems UL is set at 13.3° and the angle θ of the prism vertically adjacent optical systems UL is set at 9.1° with respect to the prism for the central optical system UL to the prism of the central optical system UL triples the field of view, so that the focal length is reduced by a factor of 3, whereby the magnification factor can be changed to 100 mm in terms of focal length. Similarly, attaching the prism block 160 so configured that the angles of the horizontally and vertically adjacent prisms are 6.7° and 4.6°, respectively, which are half of the angles described above, allows the magnification factor to be changed to 200 mm in terms of focal length.

For example, the following areas are formed on a parallel plane glass plate 161 made of a medium that transmits light: a region 160a, where the prism block 160 described above is not formed; a region 160b, where the prism block 160 having the angles θ of the horizontally and vertically adjacent prisms of 6.7° and 4.6° is formed; and a region 160c, where the prism block 160 having the angles θ of the horizontally and vertically adjacent prisms of 13.3° and 9.1° is formed, and sliding the parallel plane glass plate 161 relative to the optical system block unit 100 in such a way that the region 160a described above is selected allows the camera module 1 to have the focal length of 300 mm in terms of 35-mm camera, as shown in FIG. 10(b). When the region 160b is selected, the focal length of the camera module 1 becomes 200 mm in terms of 35-mm camera, and when the region 160c is selected, the focal length of the camera module 1 becomes 100 mm in terms of 35-mm camera. Stepwise changes in the magnification factor can thus be achieved.

When a liquid crystal element is used as the prism block 160, the angle at which each of the optical axes is deflected can be continuously changed, whereby continuous change in the magnification factor can be achieved. Specifically, a liquid crystal element is so disposed for each of the unit blocks 10 (optical systems UL) that the light is deflected in the directions shown in FIG. 11, and the amount of prism effect is changed by changing the voltage applied to each of the liquid crystal elements. Since the liquid crystal elements each handle only one polarization direction, it is necessary to stack liquid crystal elements of the same type having different orientations or stack liquid crystal elements of the same type with a ½ wave plate interposed therebetween.

(Removal of Stray Light)

Rays that enter the correction plate 11 of the optical system UL at oblique angles, such as a ray L shown in FIG. 12(a), pass through the aperture part 12b of the primary reflection mirror 12 and directly enter the image sensor 14, resulting in stray light in some cases. Two configurations will be described below as a method for removing such stray light.

First Configuration

The first configuration for removing the stray light uses a prevention unit 19, which is the combination of a first polarizer 16, which is a first polarization member, a second polarizer 18, which is a second polarization member, and a wavelength film 17, which is a polarization direction rotating member, as shown in FIG. 12(*b*). The first polarizer 16 is disposed on the object side of the correction plate 11 and is so configured that only the light having passed through the first polarizer 16 enters the correction plate 11. Since the first polarizer 16 has the function of transmitting light polarized in a predetermined direction, the light that passes through the first polarizer 16 and enters the correction plate 11 is light polarized in the predetermined direction.

The wavelength film 17 is formed on the second reflection surface 13*a* of the secondary reflection mirror 13. The wavelength film 17 has the function of rotating the polarization direction of the light passing therethrough by 45°. That is, the wavelength film 17 has the function of a wave plate (λ/4 plate). Therefore, the light having passed through the correction plate 11 and reflected off the first reflection surface 12*a* of the primary reflection mirror 12 passes through the wavelength film 17, which rotates the polarization direction of the light by 45°, and the resultant light is reflected off the second reflection surface 13*a* of the secondary reflection mirror 13. The light reflected off the second reflection surface 13*a* then passes through the wavelength film 17 again, which rotates the polarization direction of the light by 45°. The light having exited out of the wavelength film 17 therefore has a polarization direction rotated by 90° with respect to the polarization direction of the light before incident on the wavelength film 17. The wavelength film 17 may be any film that rotates the polarization direction of the light incident thereon so that the polarization direction of the light that exits out of the film differs from the polarization direction of the light incident thereon.

The second polarizer 18 is disposed between the aperture part 12*b* of the primary reflection mirror 12 and the image sensor 14. The second polarizer 18 also has the function of transmitting light polarized in a predetermined direction, as the first polarizer 16 does, and the second polarizer 18 is so disposed that the polarization direction of the light that passes the second polarizer 18 is perpendicular to (rotated by 90° from) the polarization direction of the light having passed through the first polarizer 16. The second polarizer 18 may be attached to the aperture part 12*b* of the primary reflection mirror 12, or the second polarizer 18 may be formed on the surface of the optical member (second optical member 120) that forms the aperture part 12*b*.

As described above, the polarization direction of the light having passed through the first polarizer 16 is rotated by 90° by the wavelength film 17 before the light enters the second polarizer 18, so that the polarization direction of the light coincides with the polarization direction of the light that can pass through the second wavelength plate 18. That is, the light having traveled sequentially via the first polarizer 16, the correction plate 11, the primary reflection mirror 12, the wavelength film 17, the secondary reflection mirror 13, and the wavelength film 17 can pass through the second wavelength plate 18 and enter the image sensor 14. On the other hand, the light that has passed through the first polarizer 16 and the correction plate 11 and will pass through the aperture part 12*b* without being reflected off the primary reflection mirror 12 (ray L in FIG. 12(*a*), for example) is the light having the same polarization direction as that of the light having passed through the first polarizer 16, the polarization direction of the light differs by 90° from the polarization direction of the light allowed to pass through the second polarizer 18, so that the light cannot pass through the second polarizer 18 and cannot enter the image sensor 14. Therefore, according to the first configuration, the prevention unit 19 prevents light reflected off the first reflector (primary reflection mirror 12) and the second reflector (secondary reflection mirror 13) by a number of times other than a predetermined number of times from entering the image sensor 14. The light reflected off the first and second reflectors by a number of times other than a predetermined number of times is, for example, light reflected off the first and second reflectors by a number of times other than once, that is, light reflected off the first and second reflectors zero or two or more times in the example shown in FIG. 12. In the example shown in FIG. 17, light reflected off the first and second reflectors by a number of times other than a predetermined number of times is the light reflected off the first and second reflectors by a number of times other than twice, that is, 0 times, once, or 3 times or more. Therefore, the stray light (ray L) reflected off neither the primary reflection mirror 12 nor the secondary reflection mirror 13 (reflected off the mirrors zero times) but passing through the aperture part 12*b* can also be effectively removed.

In the case of the camera module 1 having a multi-view configuration according to the present embodiment, in which a plurality of image sensors 14 are arranged as shown in FIG. 5(*b*) and other figures, the polarization direction of the light passing through the first polarizer 16 and the second polarizer 18 desirably coincides with the direction in which the image sensors 14 are arranged.

According to the configuration described above, the polarization direction of the light passing through the first polarizer 16 and the second polarizer 18 is unidirectional and fixed. In this case, for example, when the polarization direction of the light reflected off the second reflection surface 13*a* differs from the polarization direction of the light passing through the first polarizer 16, the image formed by the light cannot be captured. It is therefore desirable to mechanically rotate the first polarizer 16 and the second polarizer 18 to allow rotation of the polarization direction of light that can pass through the first polarizer 16 and the second polarizer 18. In this case, the first polarizer 16 and the second polarizer 18 may each be formed of a liquid crystal polarizer so that the polarization direction of light that can pass through the first polarizer 16 and the second polarizer 18 is electronically rotatable. When the camera module 1 or 10 according to the present embodiment is mounted, for example, on a drone or a vehicle, the polarization directions of the first polarizer 16 and the second polarizer 18 may be configured to be rotatable in accordance with the state of the drone or vehicle on which the camera module 1 or 10 is mounted (flight/travel direction and tilt).

Further, in the present embodiment, the first polarizer 16 only needs to be disposed in the optical path in a position shifted from the primary reflection mirror 12 toward the object side and is preferably disposed in a position shifted from the correction plate 11 toward the object side. In the present embodiment, the second polarizer 18 only needs to be disposed in the optical path in a position shifted from the secondary reflection mirror 13 toward the image side and is preferably disposed in a position shifted from the primary reflection mirror 12 toward the image side. The wavelength film 17 only needs to be disposed in the optical path between the first polarizer 16 and the second polarizer 18 and is preferably formed on the reflection surface of the primary reflection mirror 12 or the secondary reflection mirror 13.

In the first configuration, out of the light that enters the optical system(s) UL that form the camera modules 1 and 10, the light other than the light having the polarization direction allowed to pass through the first polarizer 16 does not contribute to image formation. Therefore, providing the first polarizer 16 with the solar cell function of converting light polarized in the polarization direction that is not allowed to pass through the first polarizer 16 into electric power in addition to the polarization function described above allows effective use of the light that enters the optical system(s) UL. The electric power converted from the light by the first polarizer 16 is used, for example, in a control unit 20, which will be described later, to generate an image from the image sensor 14.

The solar cell that supplies electric power to operate the camera modules 1 and 10 may not only be provided at the first polarizer 16 but may also be disposed, for example, on the object side of the correction plate 11 in a rear-side position where the secondary reflection mirror 13 is disposed. Light cannot pass through a portion of the correction plate 11 that is the portion where the secondary reflection mirror 13 is disposed (light does not contribute to image formation) as clearly seen from FIG. 1 and other figures, so that the object-side space above the correction plate 11 can be effectively used as the location where the solar cell is disposed. Similarly, the solar cell may be disposed in a portion of the object-side surface of the correction plate 11 that is the portion through which the light that does not contribute to image formation passes (a peripheral portion of the optical system UL, for example).

Second Configuration

In a second configuration for removing the stray light, the prevention unit 19 has a light blocking capability. For example, the prevention unit 19 includes a first light blocking member 19a and a second light blocking member 19b disposed between the primary reflection mirror 12 and the secondary reflection mirror 13 in the optical axis direction of the light incident on the primary reflection mirror 12, as shown in FIG. 13.

The first light blocking member 19a separates the following two optical paths from each other: the optical path for passage of the light passing through the correction plate 11, incident on the primary reflection mirror 12, further reflected off the primary reflection mirror 12, and guided to the secondary reflection mirror 13; and the optical path for passage of the light reflected off the secondary reflection mirror 13 and guided to the aperture part 12b. The first light blocking member 19a is disposed on the optical axis side of the light reflected off the primary reflection mirror 12 and so formed as to surround the optical axis of the optical system UL when viewed along the optical axis direction. The first light blocking member 19a is a cylindrical member so disposed as to surround the aperture part 12b (disposed at the inner circumferential portion of the first reflector) at the boundary between the reflection surface 12a of the primary reflection mirror 12 and the aperture part 12b (a second region so formed as to be surrounded by the first reflector), as shown in FIG. 13. The first light blocking member 19a is so formed as to protrude from the surface of the primary reflection mirror 12 in the direction toward the secondary reflection mirror 13. The first light blocking member 19a has a cross-sectional shape having an inner diameter that decreases from the side facing the primary reflection mirror 12 toward the side facing the secondary reflection mirror 13. The cross-sectional shape of the first light blocking member 19a is so shaped that an angle $\theta 1$ ($\theta 1m$) between the inner-diameter-side surface (the surface facing the optical axis) and a plane perpendicular to the optical axis is smaller than an angle $\theta 2$ ($\theta 2m$) between the outer-diameter-side surface (the surface opposite the optical axis) and the plane perpendicular to the optical axis, so that the thickness of the side portion of the first light blocking member 19a is configured to increase from the side facing the primary reflection mirror 12 toward the side facing the secondary reflection mirror 13.

The second light blocking member 19b separates the following two optical paths from each other: the optical path for the light passing through the correction plate 11 and guided to the primary reflection mirror 12; and the optical path for the light reflected off the primary reflection mirror 12, incident on the secondary reflection mirror 13, reflected off the secondary reflection mirror 13, and guided to the aperture part 12b. The second light blocking member 19b is so disposed on the side opposite the optical axis of the light reflected off the secondary reflection mirror 13 as to surround the light flux reflected off the secondary reflection mirror 13. The second light blocking member 19b is a cylindrical member so disposed as to surround the reflection surface 13a of the secondary reflection mirror 13 disposed in a first region (disposed in an outer circumferential portion of the second reflector), as shown in FIG. 13. The second light blocking member 19b is so formed as to protrude from the surface of the secondary reflection mirror 13 in the direction toward the primary reflection mirror 12. The second light blocking member 19b has a cross-sectional shape having an inner diameter that increases from the side facing the secondary reflection mirror 13 toward the side facing the primary reflection mirror 12. The cross-sectional shape of the second light blocking member 19b is so shaped that an angle $\theta 1$ ($\theta 1s$) between the inner-diameter-side surface (the surface facing the optical axis) and a plane perpendicular to the optical axis is smaller than an angle $\theta 2$ ($\theta 2s$) between the outer-diameter-side surface (the surface opposite the optical axis) and the plane perpendicular to the optical axis, so that the thickness of the side portion of the second light blocking member 19b is configured to decrease from the side facing the secondary reflection mirror 13 toward the side facing the primary reflection mirror 12.

It is desirable that the thus configured first light blocking member 19a and second light blocking member 19b satisfy Conditional Expressions (11) to (13) below, $$1.0 < \theta 2s/\theta 1s < 2.0 \tag{11}$$

$$30° < \theta 2s < 90° \tag{12}$$

$$30° < \theta 2m < 90° \tag{13}$$

where $\theta 1s$: The angle between the inner-diameter-side surface of the second light blocking member 19b and the plane perpendicular to the optical axis, $\theta 2s$: The angle between the outer-diameter-side surface of the second light blocking member 19b and the plane perpendicular to the optical axis, and $\theta 2m$: The angle between the outer-diameter-side surface of the first light blocking member 19a and the plane perpendicular to the optical axis.

Conditional Expressions (11) to (13) specify the ratio of the angle between the outer-diameter-side surface of the second light blocking member 19b and the plane perpendicular to the optical axis to the angle between the inner-diameter-side surface of the second light blocking member 19b and the plane perpendicular to the optical axis in a case where the angle θ2m between the outer-diameter-side surface of the first light blocking member 19a and the plane perpendicular to the optical axis and the angle θ2s between the outer-diameter-side surface of the second light blocking member 19b and the plane perpendicular to the optical axis satisfy the specified conditions. The stray light can be effectively removed when the first light blocking member 19a and the second light blocking member 19b satisfy Conditional Expressions (11) to (13).

To ensure the effect of Conditional Expression (11), the lower limit of Conditional Expression (11) is desirably 1.095. Further, to ensure the effect of Conditional Expression (11), the upper limit of Conditional Expression (11) is desirably 1.595.

To ensure the effect of Conditional Expression (12), the lower limit of Conditional Expression (12) is desirably 54.5°. Further, to ensure the effect of Conditional Expression (12), the upper limit of Conditional Expression (12) is desirably 84.5°.

To ensure the effect of Conditional Expression (13), the lower limit of Conditional Expression (13) is desirably 55.0°. Further, to ensure the effect of Conditional Expression (13), the upper limit of Conditional Expression (13) is desirably 85.0°.

Specifically, the shapes of the first light blocking member 19a and the second light blocking member 19b shown in FIG. 13 are specified by Table 4 shown below. In Table 4, the taper is a value resulting from division of the radius at a front end by the radius on a base end out of the outer diameter and the inner diameter. The base end is the end on the side facing the primary reflection mirror 12 (the image side) in the case of the first light blocking member 19a, and the end on the side facing the secondary reflection mirror 13 (the object side) in the case of the second light blocking member 19b. The front end is the end on the side facing the object side in the case of the first light blocking member 19a, and the end on the side facing the image side in the case of the second light blocking member 19b.

TABLE 4

| | | Shapes of first and second light blocking members | | |
|---|---|---|---|---|
| | | Taper | | |
| θ1 | θ2 | Outer diameter | Inner diameter | θ2s/θ1s |
| First light blocking member 19a | | | | |
| 80.93° | 79.92° | 1.33 | 1.40 | — |
| Second light blocking member 19b | | | | |
| 66.52° | 79.03° | 1.10 | 1.30 | 1.19 |

As described above, the first light blocking member 19a and the second light blocking member 19b shown in Table 4 satisfy Conditional Expressions (7) to (9) described above.

When the first light blocking member 19a and the second light blocking member 19b have the shapes described above, the optical systems UL according to the present embodiment can each guide rays that contribute to image formation to the image sensor 14 (ensure a light flux necessary for image formation) and effectively remove the stray light, such as light that passes through the correction plate 11 and directly enters the aperture part 12b and light that is reflected off portions other than the primary reflection mirror 12 and the secondary reflection mirror 13 and enters the aperture part 12b. The effect described above can be achieved not only by providing both the first light blocking member 19a and the second light blocking member 19b, which form the prevention unit 19, but providing at least one of the first light blocking member 19a and the second light blocking member 19b.

(Setting Position of Image Sensor in Optical Axis Direction on a Unit Block Basis)

In the camera module 1 having a multi-view configuration described above, for example, in the plurality of unit blocks 10, the optical systems UL have the same configuration, and all the image sensors 14 are arranged in the same position in the optical axis direction (for example, so that the focal plane in the state in which the point at infinity is brought into focus roughly coincides with the image surface of each of the image sensors 14), as shown in FIG. 5(b) and other figures. When the positions of the image sensors 14 are changed in the optical axis direction with respect to the optical systems UL, the in-focus state (in-focus distance) can be changed as described in the aforementioned description of focusing. In view of the fact described above, when the image sensors 14 are placed in different positions in the optical axis direction in the unit blocks 10, which form a single camera module 1 having a multi-view configuration (in other words, at least two of the unit blocks 10, which are each the image unit, are so disposed that the optical system UL and the image sensor 14 in one of the unit blocks 10 and the optical system UL and the image sensor 14 in the other unit block 10 are disposed in relatively different positions in the optical axis direction) as shown in FIG. 14, the single camera module 1 can simultaneously acquire images of the same subject at different in-focus distances.

FIG. 14 shows three unit blocks 10a, 10b, and 10c, which form the camera module 1. FIG. 14 shows a state in which an image sensor 14a of the unit block 10a is so disposed that the image surface of the image sensor 14a roughly coincides with the focal plane achieved when the optical system UL brings the point at infinity into focus, an image sensor 14c of the unit block 10c is so disposed that the image surface of the image sensor 14c roughly coincides with the focal plane achieved when the optical system UL brings the closest point into focus, and an image sensor 14b of the unit block 10b is so disposed that the image surface of the image sensor 14b roughly coincides with the focal plane achieved when the optical system UL brings a point at an intermediate focal distance between the point at infinity and the closest point into focus. The differences in position among the image sensors in the optical axis direction are preferably values according to the depth of field of the optical systems UL.

When there are four or more unit blocks 10 that form the camera module 1 having a multi-view configuration, the image sensor 14 of any one of the unit blocks 10 is placed in the position where the point at infinity is brought into focus, the image sensor 14 of any one of the remaining unit blocks 10 may be placed at the position where the closest point is brought into focus, and the image sensor 14 of the remaining unit blocks 10 may be placed in the positions resulting from equal division of the distance between the point where the point at infinity is brought into focus and the point where the closest point is brought into focus by the number of remaining unit blocks 10 or may be disposed on the upstream and downstream sides of a predetermined point brought into focus. The single camera module 1 may be provided with a plurality of unit blocks 10 in which the image sensors 14 are disposed at the same in-focus distance. The positions of the image sensors 14 in the optical axis direction with respect to the optical systems UL (the positions of at least part of the optical systems UL or image sensors 14 in the optical axis direction) may be variable.

In the single camera module 1 having a multi-view configuration, providing the unit blocks 10 in which the image sensors 14 are disposed in different positions in the optical axis direction allows images of the same subject brought into focus at different distances to be captured in a single image capturing action. Further, performing image processing on the images captured at the different in-focus distances allows generation of an image brought into focus at an arbitrary in-focus distance. The distance to the subject can also be calculated based on the differences in in-focus state among a plurality of image signals produced from the plurality of image sensors 14.

Further, performing image processing on the images brought into focus at different in-focus distances allows generation of a three-dimensional image of the subject, whereby the distance in the depth direction (height direction) of the subject can be acquired. For example, acquiring images of a building with the camera module 1 having a multi-view configuration according to the present embodiment mounted on a drone allows the height of the building to be acquired by image processing.

(Combination with Illuminator)

The camera module 1 having a multi-view configuration according to the present embodiment is formed of a plurality of unit blocks 10, and the unit blocks 10 are each formed of the same optical system UL. Therefore, when the image sensor 14 is replaced with a light source 70 formed, for example, of an LED in part of the unit blocks 10 (in the unit blocks 10a and 10c, for example) as shown in FIG. 15, the unit blocks 10 in each of which the light source 70 is disposed can be each used as an illuminator. In the following description, the unit block 10b including the image sensor 14 is referred to as an "imaging block", and the unit blocks 10a and 10c each including the light source 70 are each referred to as an "illumination block".

In the unit block 10 in which the image sensor 14 is disposed (imaging block 10b) and the unit blocks 10 in each of which the light source 70 is disposed (illumination blocks 10a and 10c), the positions of the image sensor 14 and the light sources 70 in the optical axis direction with respect to the optical system UL may be the same position or different positions. The unit block 10 in which the image sensor 14 is disposed (imaging block 10b) and the unit blocks 10 in each of which the light source 70 is disposed (illumination blocks 10a and 10c) include the same optical system UL. Further, when the optical axes of the optical systems UL with the light sources 70 disposed in the corresponding position and the optical axes of the optical system UL with the image sensor 14 disposed in the corresponding position are parallel to each other, and when the light sources 70 are disposed in the same position in the optical axis direction as the position of the image sensor 14 with respect to the optical systems UL, the field of view of the camera roughly coincides with the illumination fields of the illuminators. The configuration described above that allows size reduction therefore still allows efficient illumination of an image range (field of view) with the light from the light sources 70 for acquisition of a bright image. To address the problem of ghosts produced by the light source 70, the position of each of the light sources 70 with respect to the optical system UL may be shifted from the position of the image sensor 14 with respect to the optical system UL.

FIG. 16 shows an example of the arrangement of the camera unit block (imaging block) 10 and the illuminator unit blocks (illumination blocks) 10 in the 3×3 camera module 1. For example, FIG. 16(a) shows a case where the central unit block 10 is the camera unit block and the peripheral unit blocks 10 are the illuminator unit blocks. In the configuration shown in FIG. 16(a), since the central camera is irradiated with illumination light from the periphery, bright illumination light can be achieved, and the subject is irradiated with the illumination light in the eight directions from the periphery, whereby the number of places where shadows are produced can be reduced (shadowless illumination can be achieved). For example, when the camera module 1 having the configuration shown in FIG. 16(a) is incorporated in an endoscope, a shadowless bright image can be acquired.

FIG. 16(b) shows a case where the middle out of the rows in the widthwise direction (row direction) or the middle out of the columns in the lengthwise direction (column direction) is the camera unit block (imaging block) 10, and the unit blocks above and below or the unit blocks on the right and left of the camera unit block are the illuminator unit blocks (illumination blocks) 10. Since the image sensors 14 each have a rectangular (oblong) shape in many cases, arranging the camera unit blocks (imaging blocks) 10 in the direction of the short sides of the image sensors 14 allows reduction in the directional difference in resolution of the combined image, and radiation of the illumination light is performed from both the sides with respect to the cameras to allow acquisition of an image with a small amount of shadow.

FIG. 16(c) shows a case where four unit blocks 10 arranged in the diagonal directions or the upward-downward and rightward-leftward directions are the illuminators (illumination block), and the remaining unit blocks 10 are the cameras (imaging blocks). The configuration shown in FIG. 16(c) allows imaging with the illumination light radiated in four directions different from each other by 90 degrees, whereby a shadowless image can be acquired (shadowless illumination can be achieved). Placing a stripe pattern (pattern imparter) using a liquid crystal display apparatus or a transmissive screen on the object side of the correction plates 11 of the illuminator unit blocks (illumination blocks) 10 and turning on the four illuminators (illumination blocks) one by one to acquire images allow acquisition of a super-resolution image under structured illumination or measurement of the height of the subject.

Instead, the central unit block 10 can be the illuminator (illumination block), and the remaining unit blocks 10 can each be the camera (imaging block), as shown in FIG. 16(d).

The wavelength of the light emitted from the light source 70 of the illuminator unit block (illumination block) 10 may be changed (the color of the light may be changed), or a polarizer may be disposed on the object side of the correction plate 11 to change the polarization direction of the illumination light. Further, a switcher 80, which performs switching between the image sensor 14 and the light source 70 to places one of the image sensor 14 and the light source 70 in the optical axis of the optical system UL, may be provided, as shown in FIG. 16 (a), to allow arbitrary selection of any of the configurations shown in FIGS. 16 (a) to 16 (e). Further, the image sensor 14 and the light source 70 may be disposed in a single member (the imaging member 140 described above, for example).

(Multi-Stage Folding Configuration)

The optical system UL in the embodiment described above has the configuration in which the optical path is folded once at each of the primary reflection mirror 12 and the secondary reflection mirror 13 (single-stage folding configuration). Instead, employing a configuration in which the optical path is folded two or more times at each of the primary reflection mirror 12 and the secondary reflection mirror 13 (multi-stage folding configuration) allows further reduction in the total length (the distance in the optical axis direction from the correction plate 11 to the image surface I) and hence further reduction in the size of the camera modules 1 and 10.

FIG. 17(a) shows a case where the following reflection surface pairs are separately provided: a reflection surface pair formed of the reflection surface of a first primary reflection mirror 121, which reflects the light having passed through the correction plate 11, and the reflection surface of a first secondary reflection mirror 131, which reflects the light reflected off the first primary reflection mirror 121; and a reflection surface pair formed of the reflection surface of a second primary reflection mirror 122, which reflects the light reflected off the first secondary reflection mirror 131, and the reflection surface of a second secondary reflection mirror 132, which reflects the light reflected off the second primary reflection mirror 122. FIG. 17(b) shows a case where the first primary reflection mirror 121 and the second primary reflection mirror 122 are configured as a single member and the first secondary reflection mirror 131 and the second secondary reflection mirror 132 are configured as a single member. In FIG. 17(b), the reflection surface of the first primary reflection mirror 121 and the reflection surface of the second primary reflection mirror 122 are configured as a seamless surface, and the reflection surface of the first secondary reflection mirror 131 and the reflection surface of the second secondary reflection mirror 132 are configured as a seamless surface. One of the pairs of the reflection surfaces of the first primary reflection mirror 121 and the second primary reflection mirror 122 and the reflection surfaces of the first secondary reflection mirror 131 and the second secondary reflection mirror 132 may be configured as a seamless surface, and the other may be configured as non-seamless surfaces.

The optical system UL according to the present embodiment desirably satisfies Conditional Expression (14) below, $$2.0 < Fno < 15.0 \tag{14}$$

where Fno: f-number of the optical system UL.

Conditional Expression (14) shows an appropriate range of the f-number of the optical system UL. To ensure the effect of Conditional Expression (14), the upper limit of Conditional Expression (14) is 13.0, more desirably, 10.0. Further, to ensure the effect of Conditional Expression (14), the lower limit of Conditional Expression (14) is 3.0, more desirably, 4.0.

Increasing the number of folding actions in the optical system UL (increasing the number of reflection surfaces) as described above allows an increase in the degree of freedom in optical design. In this case, using the second configuration for stray light removal (light blocking member) described above allows stray light removal even in the multi-stage folding.

The conditions and configurations described above each provide the effects described above, and all the conditions and configurations are not necessarily satisfied. Satisfying any of the conditions or configurations or the combination of any of the conditions or configurations also allows the effects described above to be provided.

A camera that is an optical apparatus including the camera module 1 according to the present embodiment will next be described with reference to FIG. 18. A camera 60 includes the camera module 1 having a multi-view configuration described above, a control unit 20, a storage unit 30, an input unit 40, and a display unit 50. The control unit 20 is an arithmetic processing apparatus, such as a CPU. The storage unit 30 is a storage apparatus, such as a RAM, a hard disk drive, and an SSD. The input unit 40 is a release button or any other component in a case where the optical apparatus is a camera, and the display unit 50 is, for example, a liquid crystal display apparatus.

In the camera 60, light from an object (subject) that is not shown is focused by the optical system UL of each of the plurality of unit blocks 10, which form the camera module 1, to form an image of the subject on the image surface of the image sensor 14. The image of the subject is then photoelectrically converted by a photoelectric conversion element provided in the image sensor 14, and an image signal carrying an image of the subject is then outputted. The image signal is outputted to the control unit 20. The control unit 20 includes a generator that generates a single image based on the plurality of image signals outputted from the plurality of image sensors 14. The control unit 20 also displays the generated image on the display unit 50 provided in the camera 60. When the input unit 40 is operated by a photographer, the images photoelectrically converted by the image sensors 14 are acquired by the control unit 20, then combined with one another, and stored in the storage unit 30 as a combined image. The photographer can thus capture an image of the subject with the camera 60. Out of the functions of the control unit 20, the function of acquiring images from the plurality of image sensors 14 and generating a combined image may be provided in the camera module 1, or an external instrument may be provided with the function and may transmit and receive the resultant combined image as appropriate. The control unit 20 may also set different imaging conditions in accordance with which the image sensors 14 operate. The imaging conditions may include, for example, at least one of the imaging sensitivity, the exposure period, the exposure start time, and the exposure end time. The combined image can be made closer to a user's desired image by changing the image conditions.

The camera module 1 having a multiple-view configuration desirably satisfy Conditional Expression (15) below, $$0.30 < Nc/(Nd \times n) < 1.00 \tag{15}$$

where

Nd: Number of pixels of the image sensor 14, n: Number of image sensors 14 used to generate an image, and Nc: Number of pixels of the image.

Conditional Expression (15) shows an appropriate range of the ratio of the number of pixels of the image that is the combination of the images acquired with the image sensors 14 to the total number of pixels of the image sensors 14 used to generate the images (the product of the number of pixels of the image sensor 14 provided in each of the unit blocks 10 and the number of unit blocks 10 used to generate the images). To ensure the effect of Conditional Expression (15), the lower limit of Conditional Expression (15) is 0.40, more desirably, 0.50. Further, to ensure the effect of Conditional Expression (15), the upper limit of Conditional Expression (15) is 0.80 or 0.70, more desirably, 0.60.

The camera module 1 having a multiple-view configuration desirably satisfy Conditional Expression (16) below, $$0.50 < Nc/(Nd \times \sqrt{n}) < 2.00 \tag{16}$$

where

Nd: Number of pixels of the image sensor 14, n: Number of image sensors 14 used to generate the images, and Nc: Number of pixels of the combined image.

Conditional Expression (16) shows an appropriate range of the ratio of the number of pixels of the image that is the combination of the images acquired with the image sensors 14 to the total number of pixels of the image sensors 14 used to generate the combined image. To ensure the effect of Conditional Expression (16), the lower limit of Conditional Expression (16) is 0.70 or 0.80, more desirably, 1.00. Further, to ensure the effect of Conditional Expression (16), the upper limit of Conditional Expression (16) is 1.90 or 1.80, more desirably, 1.70.

An optical apparatus (camera 60) including the camera module 10 having a single-view configuration corresponds to a configuration including a single unit block 10 in FIG. 18, and in this case, the control unit 20 does not perform the combining process.

The optical apparatus described above are each not limited to a camera, and examples of the optical apparatus may also include a drone, a mobile terminal, an endoscope, and other instruments incorporating the camera module 1 or 10 shown in the present embodiment.

The overview of a method for manufacturing the camera modules 1 and 10 according to the present embodiment will be described below with reference to FIG. 19. The following components are first prepared: the first optical member 110 in which the correction plate 11 and secondary reflection mirror 13 are formed; the second optical member 120 in which the primary reflection mirror 12 is formed, the partition members 130; and the imaging member 140, in which the image sensor(s) 14 is disposed (step S100). The optical system block unit 100, which is the assembly of the first optical member 110, the second optical member 120, and the partition members 130, is placed (step S200), and the imaging member 140 is so placed that the plurality of optical systems UL of the optical system block unit 100 are aligned with the image sensors 14 (step S300). The camera modules 1 and 10 are thus manufactured.

The configuration described above allows provision of the camera modules 1 and 10 having high resolution and high optical performance and reduced in size, an optical apparatus (camera 60) including the camera module 1 or 10, and the method for manufacturing the camera modules 1 and 10.

EXAMPLES

Examples of the present application will be described below with reference to the drawings. FIGS. 20, 22, 24, and 26 are cross sectional views showing the configurations of the optical systems UL (UL1 to UL4) according to the first to fourth examples.

In first to tenth examples, an aspheric surface is expressed by Expression (b) below, in which y represents the height in the direction perpendicular to the optical axis, S(y) represents the distance along the optical axis (sag amount) from the tangent plane at the vertex of each aspheric surface at the height y to the aspheric surface, r represents the radius of curvature of a reference spherical surface (paraxial radius of curvature), K represents the conical constant, and An represents the n-th-order aspheric coefficient. In the following examples, "E-n" represents "$\times 10^{-n}$".

$$S(y)=(y^2/r)/\{1+(1-K\times y^2/r^2)^{1/2}\}+A2\times y^2+A4\times y^4+A6\times y^6+A8\times y^8 \quad (b)$$

In the table in each of the examples, the surface number of an aspheric surface is accompanied by a mark * on the right of the surface number.

First Example

FIG. 20 shows the configuration of the optical system UL1 according to the first example. The optical system UL1 has a configuration for the camera modules 1 and 10 having a focal length of 300 mm in terms of 35-mm camera.

The optical system UL1 is formed of the correction plate 11, the first reflection surface 12a of the primary reflection mirror 12, the second reflection surface 13a of the secondary reflection mirror 13, and the refractive optical system 15 having the shape of a plano-convex lens having a convex surface facing the object side, with the components described above sequentially arranged in the direction in which the rays travel from the object side. The correction surface 11a is formed at the image-side surface (second surface) of the correction plate 11.

Table 5 below lists the values of a variety of parameters of the optical system UL1. In table 5, f in the overall variety of parameters represents the overall focal length, ω represents the half angle of view, and TL represents the total length. The total length TL is the distance from the object-side surface (first surface) of the correction plate 11 to the image plane I in the direction of the optical axis that intersects the image plane I. The first field m in the lens data represents the order of the lens surfaces (surface number) counted from the object side along the direction in which the rays travel, the second field r represents the radius of curvature of each lens surface, the third field d represents the on-axis distance from each optical surface to the next optical surface (inter-surface distance), and the fourth field nd and fifth field vd represent the refractive index and Abbe number at the d-line ($\lambda$=587.6 nm). The radius of curvature ∞ represents a flat surface, and the refractive index of air, 1.00000, is omitted.

The focal length f, the radius of curvature r, the inter-surface distance d, and other lengths listed in all the following variety of parameters are typically expressed in "mm", but not limited thereto, because the optical system can be proportionally enlarged or reduced with the same optical performance maintained. The descriptions of the reference characters and tables of the variety of parameters also hold true for the following examples.

TABLE 5

First example
[Overall variety of parameters]
f = 20.58, ω = 3.61°, TL = 11.73, Fno = 2.00
[Lens data]

| m | r | d | nd | vd | Outer diameter |
|---|---|---|----|----|----------------|
| Object plane | ∞ | | | | |
| 1 | ∞ | 1.00 | 1.45844 | 67.82 | 11.52 |
| 2* | −210.204 | 8.88 | | | 11.52 |
| 3* | −35.747 | −8.81 | | | 10.60 |
| 4* | −84.576 | 8.65 | | | 6.20 |
| 5* | 13.246 | 1.00 | 1.45844 | 67.82 | 3.50 |
| 6 | ∞ | 1.00 | | | 3.50 |
| Image plane | ∞ | | | | 2.61 |

In the optical system UL1, the second, third, fourth and fifth surfaces are each formed in an aspheric shape. Table 6 below shows data on the aspheric surfaces, that is, the values of the conic constant K and the aspheric constants A2 to A8. In Table 6, m represents the surface number (the same applies to the following examples).

TABLE 6

[Data on aspheric surfaces]

| m | K | A2 | A4 | A6 | A8 |
|---|---|---|---|---|---|
| 2 | 0.000 | 6.43803E−05 | 3.22635E−07 | −8.96677E−09 | 1.27267E−10 |
| 3 | 0.000 | −1.81266E−05 | 0.00000E+00 | 0.00000E+00 | 0.00000E+00 |
| 4 | 0.000 | −6.73742E−05 | 0.00000E+00 | 0.00000E+00 | 0.00000E+00 |
| 5 | 0.000 | 2.16247E−04 | 3.90515E−04 | −1.80580E−04 | 2.77699E−05 |

Table 7 below shows values satisfying Conditional Expressions for the optical system UL1.

TABLE 7 f1 = 22.75, RL = 8.81, D2 = 6.20, fa = 458.52, D0 = 11.52, Y = 1.31, fb = 458.52, D1 = 10.60
(1) TL = 11.73
(2) ω = 3.61°
(3) f/fa = 0.04
(4) f/fb = 0.04
(5) M = 0.90
(6) f = 20.58
(7) RL/TL = 0.75
(8) D1/RL = 1.20
(9) D1/D2 = 1.71
(10) D0/Y = 8.79

The optical system UL1 thus satisfies Conditional Expressions (1) to (10) described above.

FIG. 21 is a spherical aberration diagram, an astigmatism diagram, a distortion diagram, and a coma aberration diagram for the optical system UL1. In each of the aberration diagrams, Y and ω represent the image height and the half angle of view, respectively. The vertical axis of the spherical aberration diagram represents the ratio of the aperture to the maximum aperture, the vertical axes of the astigmatism and distortion diagrams represent the image height, and the horizontal axis of the coma aberration diagram represents the aperture value of the exit pupil at each half angle of view. Symbols d and g represent the d-line (λ=587.6 nm) and the g-line (λ=435.8 nm), respectively. In the astigmatism diagram, solid lines and broken lines represent the sagittal image plane and the meridional image plane, respectively. In the aberration diagrams in the examples shown below, the same reference characters as those in the present example are used. The aberration diagrams show that the optical system UL1 according to the first example has excellent image forming performance with satisfactory correction of the variety of aberrations.

Second Example

FIG. 22 shows the configuration of an optical system UL2 according to the second example. The optical system UL2 has a configuration for the camera modules 1 and 10 having a focal length of 500 mm in terms of 35-mm camera.

The optical system UL2 is formed of the correction plate 11, the first reflection surface 12a of the primary reflection mirror 12, the second reflection surface 13a of the secondary reflection mirror 13, and the refractive optical system 15 having the shape of a plano-concave lens having a concave surface facing the object side, with the components described above sequentially arranged in the direction in which the rays travel from the object side. The correction surface 11a is formed at the image-side surface (second surface) of the correction plate 11.

Table 8 below lists the values of a variety of parameters of the optical system UL2.

TABLE 8

Second Example
[Overall variety of parameters]
f = 34.30, ω = 2.16°, TL = 12.00, Fno = 4.00
[Lens data]

| m | r | d | nd | vd | Outer diameter |
|---|---|---|---|---|---|
| Object plane | ∞ | | | | |
| 1 | ∞ | 1.00 | 1.45844 | 67.82 | 9.60 |
| 2* | −270.864 | 9.16 | | | 9.60 |
| 3* | −28.098 | −9.09 | | | 8.99 |
| 4* | −16.561 | 8.93 | | | 3.65 |
| 5 | −9.038 | 1.00 | 1.45844 | 67.82 | 2.58 |
| 6 | ∞ | 1.00 | | | 2.58 |
| Image plane | ∞ | | | | 2.60 |

In the optical system UL2, the second, third, and fourth surfaces are each formed in an aspheric shape. Table 9 below shows data on the aspheric surfaces, that is, the values of the conic constant K and the aspheric constants A2 to A8.

TABLE 9

[Data on aspheric surfaces]

| m | K | A2 | A4 | A6 | A8 |
|---|---|---|---|---|---|
| 2 | 0.000 | 7.45543E−05 | 1.65693E−07 | 0.00000E+00 | 0.00000E+00 |
| 3 | 0.000 | −1.66942E−05 | −1.05616E−08 | 0.00000E+00 | 0.00000E+00 |
| 4 | 0.000 | −1.68429E−04 | −1.36240E−06 | 0.00000E+00 | 0.00000E+00 |

Table 10 below shows values satisfying Conditional Expressions for the optical system UL2.

TABLE 10 f1 = 35.02, RL = 9.09, D2 = 3.65, fa = 590.84, D0 = 9.60, Y = 1.30, fb = 590.84, D1 = 8.99
(1) TL = 12.00
(2) ω = 2.16°
(3) f/fa = 0.06
(4) f/fb = 0.06
(5) M = 0.98
(6) f = 34.30
(7) RL/TL = 0.76
(8) D1/RL = 0.99
(9) D1/D2 = 2.46
(10) D0/Y = 7.38

The optical system UL2 thus satisfies Conditional Expressions (1) to (10) described above.

FIG. 23 is a spherical aberration diagram, an astigmatism diagram, a distortion diagram, and a coma aberration diagram for the optical system UL2. The aberration diagrams show that the optical system UL2 according to the second example has excellent image forming performance with satisfactory correction of the variety of aberrations.

Third Example

FIG. 24 shows the configuration of an optical system UL3 according to the third example. The optical system UL3 has a configuration for the camera modules 1 and 10 having a focal length of 1000 mm in terms of 35-mm camera.

The optical system UL3 is formed of the correction plate 11, the first reflection surface 12a of the primary reflection mirror 12, the second reflection surface 13a of the secondary reflection mirror 13, and the refractive optical system 15 having the shape of a plano-concave lens having a concave surface facing the object side, with the components described above sequentially arranged in the direction in which the rays travel from the object side. The correction surface 11a is formed at the image-side surface (second surface) of the correction plate 11.

Table 11 below lists the values of a variety of parameters of the optical system UL3.

TABLE 11

Third example

[Overall variety of parameters]
f = 68.60, ω = 1.09°, TL = 15.00, Fno = 8.00
[Lens data]

| m | r | d | nd | vd | Outer diameter |
|---|---|---|---|---|---|
| Object plane | ∞ | | | | |
| 1 | ∞ | 1.00 | 1.45844 | 67.82 | 10.39 |
| 2* | −513.658 | 12.16 | | | 10.39 |
| 3* | −31.375 | −12.09 | | | 10.60 |
| 4* | −9.015 | 11.93 | | | 2.60 |
| 5 | −8.005 | 1.00 | 1.45844 | 67.82 | 2.33 |
| 6 | ∞ | 1.00 | | | 2.33 |
| Image plane | ∞ | | | | 2.60 |

In the optical system UL3, the second, third, and fourth surfaces are each formed in an aspheric shape. Table 12 below shows data on the aspheric surfaces, that is, the values of the conic constant K and the aspheric constants A2 to A8.

TABLE 12

[Data on aspheric surfaces]

| m | K | A2 | A4 | A6 | A8 |
|---|---|---|---|---|---|
| 2 | 0.000 | 3.52435E−05 | 4.11085E−08 | 0.00000E+00 | 0.00000E+00 |
| 3 | 0.000 | −5.76488E−06 | −2.52534E−09 | 0.00000E+00 | 0.00000E+00 |
| 4 | 0.000 | −2.13506E−04 | −8.63973E−06 | 0.00000E+00 | 0.00000E+00 |

Table 13 below shows values satisfying Conditional Expressions for the optical system UL3.

TABLE 13 f1 = 77.73, RL = 12.09, D2 = 2.6, fa = 1120.45, D0 = 10.39,
Y = 1.30, fb = 1120.45, D1 = 10.6
(1) TL = 15.00
(2) ω = 1.09°
(3) f/fa = 0.06
(4) f/fb = 0.06
(5) M = 0.88
(6) f = 68.60
(7) RL/TL = 0.81
(8) D1/RL = 0.88
(9) D1/D2 = 4.08
(10) D0/Y = 7.99

The optical system UL3 thus satisfies Conditional Expressions (1) to (10) described above.

FIG. 25 is a spherical aberration diagram, an astigmatism diagram, a distortion diagram, and a coma aberration diagram for the optical system UL3. The aberration diagrams show that the optical system UL3 according to the third example has excellent image forming performance with satisfactory correction of the variety of aberrations.

Fourth Example

FIG. 26 shows the configuration of an optical system UL4 according to the fourth example. The optical system UL4 has a configuration for the camera modules 1 and 10 having a focal length of 300 mm in terms of 35-mm camera.

The optical system UL4 is formed of the correction plate 11, the first reflection surface 12a of the primary reflection mirror 12, and the second reflection surface 13a of the secondary reflection mirror 13, with the components described above sequentially arranged in the direction in which the light rays travel from the object side. The correction surface 11a is formed at the object-side surface (first surface) of the correction plate 11.

Table 14 below lists the values of a variety of parameters of the optical system UL4.

TABLE 14

Fourth example

[Overall variety of parameters]
f = 19.71, ω = 0.87°, TL = 6.00, Fno = 5.00
[Lens data]

| m | r | d | nd | vd | Outer diameter |
|---|---|---|---|---|---|
| Object plane | ∞ | | | | |
| 1* | 250.000 | 0.50 | 1.45844 | 67.82 | 4.11 |
| 2 | ∞ | 5.00 | | | 4.11 |
| 3 | −8.741 | −3.46 | | | 4.00 |
| 4 | −2.256 | 3.96 | | | 0.90 |
| 5 | ∞ | 0.50 | | | 0.64 |
| Image plane | ∞ | | | | 0.61 |

In the optical system UL4, the first surface is formed in an aspheric shape. Table 15 below shows data on the aspheric surfaces, that is, the values of the conic constant K and the aspheric constants A2 to A8.

TABLE 15

[Data on aspheric surfaces]

| m | K | A2 | A4 | A6 | A8 |
|---|---|---|---|---|---|
| 1 | 0.000 | −6.55865E−04 | 0.00000E+00 | 0.00000E+00 | 0.00000E+00 |

Table 16 below shows values satisfying Conditional Expressions for the optical system UL4.

TABLE 16 f1 = 22.89, RL = 3.46, D2 = 0.90, fa = 545.33, D0 = 4.11,
Y = 0.31, fb = 545.33, D1 = 4.00
(1) TL = 6.00
(2) ω = 0.87°
(3) f/fa = 0.04
(4) f/fb = 0.04
(5) M = 0.86
(6) f = 19.71
(7) RL/TL = 0.58
(8) D1/RL = 1.16
(9) D1/D2 = 4.44
(10) D0/Y = 13.26

The optical system UL4 thus satisfies Conditional Expressions (1) to (10) described above.

FIG. 27 is a spherical aberration diagram, an astigmatism diagram, a distortion diagram, and a coma aberration diagram for the optical system UL4. The aberration diagrams show that the optical system UL4 according to the fourth example has excellent image forming performance with satisfactory correction of the variety of aberrations.

The fifth to seventh examples shown below show a case where the optical system UL is formed of a compact Schmidt-Cassegrain-type optical system. FIG. 28 is a cross-sectional view of the optical system UL that forms the camera modules 1 and 10 according to the fifth to seventh examples.

Fifth Example

The fifth example shows the case where the optical system UL is formed of a compact Schmidt-Cassegrain-type optical system, and the optical system UL has a configuration for the camera modules 1 and 10 having a focal length of 500 mm in terms of 35-mm camera. The image sensor 14 is assumed to be a 2-megapixel, ⅙-inch image sensor having a size of 2.4 mm×1.8 mm.

Table 17 below shows a variety of parameters of the optical system UL in the fifth example. In Table 17, f1 represents the focal length of the primary reflection mirror 12, r1 represents the radius of curvature of the primary reflection mirror 12, f2 represents the focal length of the secondary reflection mirror 13, r2 represents the radius of curvature of the secondary reflection mirror 13, f is the overall focal length, R is the on-axis distance from the secondary reflection mirror 13 to the primary reflection mirror 12, D is the on-axis distance from a surface of the correction plate 11 that is the surface closest to the object side to the primary reflection mirror 12, TL is the total on-axis distance from a surface of the correction plate 11 that is the surface closest to the object side to the image plane I, FNo is the f-number, and M is the secondary magnification ratio.

TABLE 17

| Fifth example - Optical system UL |
|---|
| f1 = 6.12, r1 = 12.24, f2 = 0.75, r2 = 1.50, f = 34.3, R = 5.5, D = 6.0, TL = 9.4, FNO = 5.7, M = 5.60 |

Table 18 below shows a variety of parameters of the camera module 1 having a multi-view configuration formed of 3×3=9 optical systems UL described above. A combined f-number is the f-number associated with the image produced by combining images produced by the 9 optical systems UL with one another. Since the camera module 1 is formed of the 3×3 optical systems UL, the overall f-number (combined f-number) is ⅓ of the f-number of each of the optical systems UL. The size of the camera module 1 represents the lengths in the horizontal direction×the vertical direction×the depth direction (optical axis direction) measured when the camera module 1 is viewed from the object side. The variable magnification (zooming) represents the focal length in terms of 35-mm camera at the telephoto end and the wide-angle end.

TABLE 18

| Fifth example - camera module 1 | |
|---|---|
| Focal length | 34.3 [mm] |
| Combined f-number | 1.9 |
| Size | 19.0 × 12.6 × 9.4 [mm] |
| Number of pixels of combined image | 10M |
| Maximum magnification factor | 50 |
| Closest distance | 1.7 [m] |

TABLE 18-continued

| Fifth example - camera module 1 | |
|---|---|
| Extending amount required to achieve in-focus state | 0.67 [mm] |
| Variable magnification (zooming) | 500 to 167 [mm] |

As described above, using a Compact Schmidt-Cassegrain-type optical system as the optical system(s) UL of the camera modules 1 and 10, which is a telephoto optical system having a focal length of 500 mm in terms of 35-mm camera, allows the total length to be greatly shorter than the focal length. Further, a compact Schmidt-Cassegrain-type optical system can form an aplanatic optical system (optical system that produces no spherical aberration, coma aberration, or astigmatism). The thickness (the length in the optical axis direction) of the camera module 1 having a multi-view configuration can be smaller than 10 mm.

Sixth Example

The sixth example shows the case where the optical system UL is formed of a compact Schmidt-Cassegrain-type optical system, and the optical system UL has a configuration for the camera modules 1 and 10 having a focal length of 300 mm in terms of 35-mm camera. The image sensor 14 is assumed to be a 2-megapixel, ⅙-inch image sensor having the size of 2.4 mm×1.8 mm, as in the fifth example.

Table 19 below shows a variety of parameters of the optical system UL in the sixth example.

TABLE 19

| Sixth example - optical system UL |
|---|
| f1 = 3.67, r1 = 7.34, f2 = 0.45, r2 = 0.90, f = 20.6, R = 3.3, D = 3.6, TL = 5.64, FNO = 3.4, M = 5.61 |

Table 20 below shows a variety of parameters of the camera module 1 having a multi-view configuration formed of 3×3=9 optical systems UL described above.

TABLE 20

| Sixth example - camera module 1 | |
|---|---|
| Focal length | 20.6 [mm] |
| Combined f-number | 1.1 |
| Size | 19.0 × 12.6 × 5.7 [mm] |
| Number of pixels of combined image | 10M |
| Maximum magnification factor | 50 |
| Closest distance | 1.0 [m] |
| Extending amount required to achieve in-focus state | 0.40 [mm] |
| Variable magnification (zooming) | 300 to 100 [mm] |

As described above, using a Compact Schmidt-Cassegrain-type optical system as the optical system(s) UL of the camera modules 1 and 10, which is a telephoto optical system having a focal length of 300 mm in terms of 35-mm camera, allows the total length to be greatly shorter than the focal length. Further, a compact Schmidt-Cassegrain-type optical system can form an aplanatic optical system (optical system that produces no spherical aberration, coma aberration, or astigmatism). The thickness (the length in the optical axis direction) of the camera module 1 can be smaller than 10 mm.

Seventh Example

The seventh example shows the case where the optical system UL is formed of a compact Schmidt-Cassegrain-type optical system, and the optical system UL has a configuration for the camera modules 1 and 10 having a focal length of 1000 mm in terms of 35-mm camera. The image sensor 14 is assumed to be a 2-megapixel, ⅙-inch image sensor having the size of 2.4 mm×1.8 mm, as in the fifth example.

Table 21 below shows a variety of parameters of the optical system UL in the seventh example.

TABLE 21

| Seventh example - optical system UL |
|---|
| f1 = 12.24, r1 = 24.5, f2 = 1.50, r2 = 3.00, f = 68.6, R = 11.0, D = 12.0, TL = 18.8, FNO = 11.4, M = 5.60 |

Table 22 below shows a variety of parameters of the camera module 1 having a multi-view configuration formed of 3×3=9 optical systems UL described above.

TABLE 22

| Seventh example - camera module 1 | |
|---|---|
| Focal length | 68.6 [mm] |
| Combined f-number | 3.8 |
| Size | 19.0 × 12.6 × 18.8 [mm] |
| Number of pixels of combined image | 10M |
| Maximum magnification factor | 50 |
| Closest distance | 3.3 [m] |
| Extending amount required to achieve in-focus state | 1.30 [mm] |
| Variable magnification (zooming) | 1000 to 333 [mm] |

As described above, using a Compact Schmidt-Cassegrain-type optical system as each of the optical systems UL of the camera module 1, which are each a telephoto optical system having a focal length of 1000 mm in terms of 35-mm camera, allows the total length to be greatly shorter than the focal length. Further, a compact Schmidt-Cassegrain-type optical system can form an aplanatic optical system (optical system that produces no spherical aberration, coma aberration, or astigmatism). The thickness (the length in the optical axis direction) of the camera module 1 can be smaller than 20 mm.

Reference Example

As Reference Example, Table 23 below shows a variety of parameters of an optical system UL formed of a Schmidt-Cassegrain-type optical system and having a focal length of 300 mm in terms of 35-mm camera. Also in Reference Example, the image sensor 14 is assumed to be a 2-megapixel, ⅙-inch image sensor having the size of 2.4 mm×1.8 mm, as in the fifth example.

TABLE 23

| Reference Example |
|---|
| f1 = 14.3, r1 = 28.6, f2 = 14.3, r2 = 28.6, f = 24.0, R = 10.0, D = 14.3, TL = 15.9 |

When the optical system UL is formed of a Schmidt-Cassegrain-type optical system, which is a telephoto optical system having a focal length of 300 mm in terms of 35-mm camera, the total length of the optical system can be shorter than the focal length, and no image curvature is produced, that is, a Petzval sum is zero. The total length of the optical system is, however, longer than that of a compact Schmidt-Cassegrain-type optical system.

As described above, the camera modules 1 and 10 according to the present embodiment can provide a telephoto camera module having high resolution and small thickness (small size in the optical axis direction) by arranging a plurality of optical systems UL each formed of a compact Schmidt-Cassegrain-type optical system in an array.

The camera modules 1 and 10 according to the present embodiment are each completed by forming a plurality of correction plates 11, a plurality of primary reflection mirrors 12, and a plurality of secondary reflection mirrors 13 on two flat optical members (parallel plane glass plates 111 and 121) in an imprinting or mask coating process and combining the first optical member 110, the second optical member 120, and the partition members 130 with each other one by one, as described above. The camera modules 1 and 10 according to the present embodiment can therefore be manufactured in simple steps without the need to form a plurality of optical systems separately and then adjusting the positions thereof with respect to each other to form a single optical system block unit. Further, the single imaging member 140 can be formed of a plurality of image sensors 14 and combined with the optical system block unit 100, eliminating the need to adjust the positions of the optical systems and image sensors on an individual camera module basis, whereby the camera module can be manufactured in simpler steps. Moreover, errors in the positions of the plurality of image sensors 14 are unlikely to occur after the camera module 1 is manufactured, whereby the camera module 1 can combine a plurality of images with one another to form a high-resolution image.

The number of correction plates 11 and the number of secondary reflection mirrors 13 provided in the first optical member 110 are equal to each other. Further, the number of secondary reflection mirrors 13 provided in the first optical member 110 is equal to the number of primary reflection mirrors 12 provided in the second optical member 120. Moreover, the number of optical systems UL provided in the optical system block unit 100 is equal to the number of optical systems UL that can be isolated from each other by the partition members 130.

The correction plates 11 are provided in the present embodiment, but not necessarily, and the upper surface of the parallel plane glass plate 111 may not be provided with the correction plates 11 but may be left as it is. In the present embodiment, the correction plates 11 and the secondary reflection mirrors 13 may not be integrated with each other but may be separate from each other, and the positions of the correction plates 11 are not limited to the positions described above. The shape of the correction plates 11 is not limited to a specific shape and can be changed as appropriate.

In the present embodiment, the parallel plane glass plates 111 and 121 are provided with the secondary reflection mirrors 13 and the primary reflection mirrors 12, respectively, but the shape or material of the glass plates are not limited to a specific shape or material, and the glass plates do not have to each be a parallel-surface plate or a flat plate and can each be a plate member made of a resin material.

The method of forming the primary reflection mirrors 12, the secondary reflection mirrors 13, and other components can also be changed as appropriate. The first optical member 110 and the second optical member 120 are first formed and then combined with each other in the above description, and the first optical member 110, the second optical member 120, and the partition members 130 may instead be sequentially formed on the surface of a reference plate member.

The shape of the regions isolated by the partition members 130 in the plan view (the shape of the regions viewed when the optical systems UL are viewed in the direction along the optical axis that intersects the image sensors 14) preferably conforms to the shape of the image sensors 14 in the plan view. For example, when the shape of the image sensors 14 in the plan view is oblong, the shape of the regions isolated by the partition members 130 in the plan view is also preferably oblong. The shape of the primary reflection mirrors 12 in the plan view and the shape of the secondary reflection mirrors 13 in the plan view can also be changed as appropriate and preferably conform to the shape of the image sensors 14 in the plan view. The shapes of the aperture part 12b, the correction plates 11, and the refractive optical system 15 in the plan view can also be changed as appropriate and preferably conform to the shape of the image sensors 14 in the plan view.

The partition members 130 are provided as opaque members in the present embodiment and can be changed as appropriate to any members that prevent the rays traveling through an optical system UL from entering the adjacent optical system UL. For example, the partition members 130 may be diffusing members made, for example, of frosted glass. The opaque members do not need to completely suppress the entry of rays and only need to be capable of suppressing the entry of rays to the extent that the rays do not affect the image sensors 14 (20% of the incident light, for example).

The camera module 1 having a multi-view configuration according to the present embodiment has been described on the assumption that the nine optical systems UL all have the same configuration. Instead, a plurality of optical systems having different optical characteristics, such as the focal length, the imaging distance, and the f-number, may be combined with one another to form a single optical apparatus. In this case, it is preferable to include at least one compact Schmidt-Cassegrain-type optical system, such as that in the present embodiment, for telephoto imaging.

When a plurality of optical systems UL having different optical characteristics are combined with one another, the shape of part of the nine primary reflection mirrors (or secondary reflection mirrors) may be changed, the focal length of part of the nine correction plates may be changed, and refractive optical systems having different focal lengths may be disposed in the nine optical systems UL.

In the camera module 1 having a multi-view configuration, at least one of the nine optical systems UL may be an illumination optical system. In this case, the image sensors 14 of the optical systems UL in the present embodiment may be simply each replaced with an illuminator, such as an LED, and the reflection mirrors and the correction plates may be omitted in the regions on which the light from the illuminator is incident.

In the camera module 1 having a multi-view configuration, the nine optical systems UL are integrally moved, for example, during focusing and may instead be so moved that the distance between at least part of the optical systems UL and the image sensors 14 is changed.

(Configuration Having Integrated Optical System UL)

The aforementioned configuration has been described with reference to the case where the first optical member 110 and the second optical member 120 are formed as separate members, as shown in FIG. 6, and the following configuration may be conceivable: the space between the first optical member 110 and the second optical member 120 is filled with a medium that transmits light (light transmissive member having a refractive index) to form a single optical member 171; and the optical member 171 is provided with the correction surface 11a, the first reflection surface 12a, and the second reflection surface 13a to form an integrated lens 170 including an integrated optical system UL, as shown in FIG. 29. The stray light removal member (partition members 130) can be omitted in the integrated lens 170.

Specifically, the optical member 171 has the following four surfaces: a first surface 171a, which is a light incident surface on which light from an object is incident and at which the correction surface 11a is formed; a second surface 171b, where the first reflection surface 12a, on which the light having passed through the first surface 171a is incident and which reflects the light, is formed; a third surface 171c, where the second reflection surface 13a, on which the light reflected off the first reflection surface 12a is incident and which reflects the light, is formed; and a fourth surface 171d, which is a light exiting surface via which the light reflected off the second reflection surface 13a exits out of the optical member 171 toward the image sensor 14, as shown in FIG. 29.

In the optical member 171, the first surface 171a may be a flat surface or a surface having curvature, preferably, a surface that is concave toward the object side. The fourth surface 171d may be a flat surface or a surface having curvature, preferably, a surface that is convex toward the object side. The fourth surface 171d having curvature functions as the refractive optical system 15 described above.

Consider a straight line that connects an edge portion inside the inner diameter of the second surface 171b, on which the first reflection surface 12a is formed, to an edge portion outside the outer diameter of the fourth surface 171d (hereinafter referred to as a "first straight line 171e"), and it is preferable that the space on the inner diameter side of the first straight line 171e forms an air section (concave recess) 171f.

The first surface 171a, the second surface 171b, the third surface 171c, the fourth surface 171d, and the image surface I of the image sensor 14 are arranged in this order along the optical path, while the surfaces are arranged in the following order when the integrated lens 170 is viewed in the lateral direction (the direction perpendicular to the optical axis): the third surface 171c; the first surface 171a; the fourth surface 171d; the second surface 171b; and the image surface I. The first surface 171a and the fourth surface 171d are preferably disposed between the second surface 171b and the third surface 171c. Therefore, when the integrated lens 170 is viewed in the lateral direction, a convex section (third surface 171c that is a protruding portion between the second reflection surface 13a and a first surface) 171a) 171g, which is concave toward the object side and at which the second reflection surface 13a so formed as to face the image side, is so placed at the center as to be closet to the object side.

At least part of the outer edge of the air section 171f, the outer edge of the convex section 171g, and the outer edge of the integrated lens 170, which connects the first surface 171a to the second surface 171b, is preferably, for example, painted black to provide a stray light removal function. The outer edge of the integrated lens 170 may have a stray light removal function on the side thereof closest to the object side and no stray light removal function on the side thereof closest to the image (in other words, only part of the outer edge of the integrated lens 170 may be painted black).

The outer edge of the integrated lens 170 and the outer edge of the convex section 171g preferably forms a step that allows the integrated lens 170 to be molded and held. Further, at least part of the outer edge of the integrated lens 170 and the outer edge of the convex section 171g preferably has an inclining surface that inclines away from the optical axis with distance to the image surface decreasing to eliminate the stray light.

The space between the first surface 171a and the second surface 171b of the optical member 171 may be filled with a resin material. The resin material of the optical member 171 is preferably a material having zero or almost zero birefringence (for example, a material having an in-plane phase difference Re, a thickness phase difference Rth, and a photoelastic coefficient C all being zero or almost zero).

The optical system UL formed of the integrated lens 170 described above desirably satisfies Conditional Expression (17) below, $$0.5 < (h1\text{in}/d1-i)/(h4/d4-i) < 10.0 \quad (17)$$

where h1in: Inner diameter of the refraction surface located in a position closest to the object side (first surface 171a), d1−1: Distance between the center of the refraction surface located in a position closest to the object (first surface 171a), the center being the point through which the optical axis passes, and the image plane, h4: Outer diameter of the refraction surface located in a position closest to the image plane (fourth surface 171d), and d4−1: Distance between the center of the refraction surface located in a position closest to the image plane (fourth surface 171d), the center being the point through which the optical axis passes, and the image plane.

Conditional Expression (17) specifies the appropriate relationship between two surfaces of the intergrated lens 170, the first surface 171a, which is the refraction surface located in a position closest to the object side and is the light incident surface, and the fourth surface 171d, which is the refraction surface located in a position closest to the image plane and is the light exiting surface. When (h1in/d1−1)/(h4/d4−1) is smaller than the lower limit of Conditional Expression (17), the stray light that does not pass through the reflection surfaces undesirably reaches the image plane. To ensure the effect of Conditional Expression (17), the lower limit of Conditional Expression (17) is 0.6, more desirably, 0.7. When (h1in/d1−1)/(h4/d4−1) is greater than the upper limit of Conditional Expression (17), vignetting of the periphery of the signal light increases, undesirably resulting in a decrease in resolution. To ensure the effect of Conditional Expression (17), the upper limit of Conditional Expression (17) is 7.0, more desirably, 5.0.

The integrated lens 170 desirably satisfies Conditional Expression (18) below, $$50.0 < vd \quad (18)$$

where vd: Abbe number of the medium of the integrated lens 170 (medium of the optical member 171) at the d-line.

Conditional Expression (18) specifies an appropriate value of the Abbe number of the medium of the optical member 171, which forms the integrated lens 170, at the d-line. When vd is smaller than the lower limit of Conditional Expression (18), the chromatic aberrations produced by the integrated lens 170 undesirably worsen. To ensure the effect of Conditional Expression (18), the lower limit of Conditional Expression (18) is 54.0, more desirably, 60.0.

The optical system UL formed of the integrated lens 170 desirably satisfies Conditional Expression (19) below, $$0.1 < r4/TL3 < 10.0 \quad (19)$$

where r4: Radius of curvature of the refraction surface located in a position closest to the image plane (fourth surface 171d), and TL3: Distance between the reflection surface located in a position closest to the object side (third surface 171c) and the image plane.

Conditional Expression (19) specifies the ratio of the radius of curvature of the refraction surface located in a position closest to the image plane (fourth surface 171d) to the total length of the integrated lens 170 (the distance between the reflection surface located in a position closest to the object side (third surface 171c) and the image plane). When r4/TL3 is smaller than the lower limit of Conditional Expression (19), the chromatic aberrations and Petzval sum undesirably worsen. To ensure the effect of Conditional Expression (19), the lower limit of Conditional Expression (19) is 0.15, more desirably, 0.2. When r4/TL3 is greater than the upper limit of Conditional Expression (19), it is undesirably difficult to correct off-axis aberrations. To ensure the effect of Conditional Expression (19), the upper limit of Conditional Expression (19) is 7.0, more desirably, 5.0.

EXAMPLES

The following eighth to tenth examples are examples of the integrated lens 170. FIGS. 30, 32, and 34 show the optical system UL (UL8 to UL10) formed of the integrated lens 170 in the eighth to tenth examples. In comparison with the optical member 171 in FIG. 29, reference numeral 1 denotes the first surface 171a, reference numeral 2 denotes the first reflection surface 12a (second surface 171b), reference numeral 3 denotes the second reflection surface 13a (third surface 171c), and reference numeral 4 denotes the fourth surface 171d.

In each of the examples, an aspheric surface is expressed by Expression (b) described above. In each of the examples, the second-order aspheric coefficient A 2 is zero. In the table in each of the examples, the surface number of an aspheric surface is accompanied by a mark * on the right of the surface number.

Eighth Example

FIG. 30 shows an optical system UL8 formed of the integrated lens 170 in the eighth example. Table 24 below lists the values of a variety of parameters of the optical system UL8. In Table 24, which shows the overall variety of parameters, f represents the overall focal length, ω represents the half angle of view, FNO represents the f-number, Y represents the maximum image height, Bf represents the back focal length, and TL3 represents the total length. The total length TL3 represents the on-axis distance from the third surface to the image plane I, as described above. The back focal length Bf is the on-axis distance from the optical surface closest to the image side (second surface in FIG. 29) to the image plane I.

TABLE 24

Eighth example

[Overall variety of parameters]
f = 21.970, ω (°) = 4.087, FNO = 2.0, Y = 1.6, BF = 2.4000,
TL3 = 9.0000
[Lens data]

| m | r | d | nd | νd |
|---|---|---|---|---|
| Object plane | ∞ | | | |
| 1* | −162.8000 | 5.40 | 1.4908 | 57.07 |
| 2* | −20.6000 | −6.60 | 1.4908 | 57.07 |
| 3* | −12.3400 | 3.20 | 1.4908 | 57.07 |
| 4* | 19.0000 | 5.80 | | |
| Image plane | ∞ | | | |

In the optical system UL8, the first, second, third, and fourth optical surfaces are each formed in an aspheric shape. Table 25 below shows data on the aspheric surfaces, that is, the values of the conic constant K and the aspheric constants A4 to A6 for each surface m.

TABLE 25

[Data on aspheric surfaces]

| m | K | A4 | A6 |
|---|---|---|---|
| 1 | 0.00 | 3.930E−06 | 1.099E−07 |
| 2 | −1.00 | 1.449E−05 | 8.495E−08 |
| 3 | 0.00 | 1.392E−03 | −2.626E−05 |
| 4 | 0.00 | 7.707E−03 | 2.485E−04 |

Table 26 below shows values satisfying Conditional Expressions for the optical system UL8.

TABLE 26 h1in = 3.19, d1 − i = 7.80, h4 = 1.75, d4 − i = 5.80,
(17) (h1in/d1 − i)/(h4/d4 − i) = 1.355
(18) νd = 57.07
(19) r4/TL3 = 2.111

The optical system UL8 thus satisfies all Conditional Expressions (17) to (19) described above.

FIG. 31 is a spherical aberration diagram, an astigmatism diagram, a distortion diagram, and a coma aberration diagram for the optical system UL8 formed of the integrated lens 170 according to the eighth example. The aberration diagrams show that the optical system UL8 has excellent image forming performance with satisfactory correction of the variety of aberrations.

Ninth Example

FIG. 32 shows an optical system UL9 formed of the integrated lens 170 in a ninth example. Table 27 below lists the values of a variety of parameters of the optical system UL9.

TABLE 27

Ninth Example

[Overall variety of parameters]
f = 40.000, ω (°) = 2.259, FNO = 3.5, Y = 1.6, BF = 3.0500,
TL3 = 11.0000
[Lens data]

| m | r | d | nd | νd |
|---|---|---|---|---|
| Object plane | ∞ | | | |
| 1* | 587.4050 | 5.00 | 1.5311 | 55.75 |
| 2* | −22.4352 | −8.00 | 1.5311 | 55.75 |
| 3* | −9.0164 | 2.95 | 1.5311 | 55.75 |
| 4* | 6.4946 | 8.05 | | |
| Image plane | ∞ | | | |

In the optical system UL9, the first, second, third, and fourth optical surfaces are each formed in an aspheric shape. Table 28 below shows data on the aspheric surfaces, that is, the values of the conic constant K and the aspheric constants A4 to A6 for each surface m.

TABLE 28

[Data on aspheric surfaces]

| m | K | A4 | A6 |
|---|---|---|---|
| 1 | 0.00 | 1.176E−06 | 1.855E−07 |
| 2 | −1.00 | 5.572E−06 | 4.739E−08 |
| 3 | 0.00 | 1.776E−03 | −4.302E−05 |
| 4 | 0.00 | 8.199E−03 | 1.274E−04 |

Table 29 below shows values satisfying Conditional Expressions for the optical system UL9.

TABLE 29 h1in = 3.50, d1 − i = 8.00, h4 = 1.75, d4 − i = 8.05
(17) (h1in/d1 − i)/(h4/d4 − i) = 2.013
(18) νd = 57.75
(19) r4/TL3 = 0.590

The optical system UL9 thus satisfies all Conditional Expressions (17) to (19) described above.

FIG. 33 is a spherical aberration diagram, an astigmatism diagram, a distortion diagram, and a coma aberration diagram for the optical system UL9 formed of the integrated lens 170 according to the ninth example. The aberration diagrams show that the optical system UL9 has excellent image forming performance with satisfactory correction of the variety of aberrations.

Tenth Example

FIG. 34 shows an optical system UL10 formed of the integrated lens 170 in a tenth example. Table 30 below lists the values of a variety of parameters of the optical system UL10.

TABLE 30

Tenth example

[Overall variety of parameters]
f = 60.000, ω (°) = 1.489, FNO = 6.0, Y = 1.6, BF = 5.0000, TL3 = 13.0000
[Lens data]

| m | r | d | nd | vd |
|---|---|---|---|---|
| Object plane | ∞ | | | |
| 1* | 807.7134 | 8.00 | 1.5168 | 64.13 |
| 2* | −21.1119 | −8.00 | 1.5168 | 64.13 |
| 3* | −6.3322 | 7.00 | 1.5168 | 64.13 |
| 4* | 3.9252 | 6.00 | | |
| Image plane | ∞ | | | |

In the optical system UL10, the first, second, third, and fourth optical surfaces are each formed in an aspheric shape. Table 31 below shows data on the aspheric surfaces, that is, the values of the conic constant K and the aspheric constants A4 to A6 for each surface m.

TABLE 31

[Data on aspheric surfaces]

| m | K | A4 | A6 |
|---|---|---|---|
| 1 | 0.00 | −5.582E −06 | 5.506E −08 |
| 2 | −1.00 | 3.563E −07 | 1.023E −08 |
| 3 | 0.00 | 1.515E −03 | −9.937E −06 |
| 4 | 0.00 | 6.167E −03 | 2.252E −04 |

Table 32 below shows values satisfying Conditional Expressions for the optical system UL10.

TABLE 32 h1in = 2.00, d1 − i = 1.30, h4 = 1.10, d4 − i = 6.00
(17) (h1in/d1 − i)/(h4/d4 − i) = 0.839
(18) vd = 64.13
(19) r4/TL3 = 0.302

The optical system UL10 thus satisfies all Conditional Expressions (17) to (19) described above.

FIG. 35 is a spherical aberration diagram, an astigmatism diagram, a distortion diagram, and a coma aberration diagram for the optical system UL10 formed of the integrated lens 170 according to the tenth example. The aberration diagrams show that the optical system UL10 has excellent image forming performance with satisfactory correction of the variety of aberrations.

REFERENCE SIGNS LIST

10 Camera module
UL Optical system
11 Correction plate (correction member)
11a Correction surface
12 Primary reflection mirror (first reflector)
12a First reflection surface
13 Secondary reflection mirror (second reflector)
13a Second reflection surface
14 Image sensor
60 Camera (optical apparatus)
100 Optical system block unit
110 First optical member
120 Second optical member
130 Partition member
140 Image unit

The invention claimed is:

1. An optical system that forms an image of an object, the optical system comprising:
   a light incident surface on which light from an object side is incident;
   a first reflector that reflects the light having passed through the light incident surface; and
   a second reflector that reflects the light reflected off the first reflector,
   wherein the following conditional expression is satisfied:

$TL<15.0$ mm where TL: distance from a surface closest to the object side in the optical system to an image plane in a direction of an optical axis that intersects the image plane.

2. The optical system according to claim 1, wherein the following conditional expression is satisfied:

$10.00°<\omega$ where ω: half angle of view of the optical system.

3. The optical system according to claim 1,
   wherein a medium in an optical path between the first reflector and the second reflector is a light transmissive member having a refractive index,
   the light incident surface is formed at an object-side, light incident surface of the light transmissive member,
   a reflection surface as the first reflector is formed at an image-side surface of the light transmissive member that is a surface on which the light having passed through the light incident surface is incident,
   a reflection surface as the second reflector is formed at the object-side surface of the light transmissive member that is a surface on which the light reflected off the first reflector is incident, and
   a light exiting surface which is the image-side surface of the light transmissive member, on which the light reflected off the second reflector is incident, and via which the light exits out of the light transmissive member is formed.

4. The optical system according to claim 3, wherein the following conditional expression is satisfied:

$0.5<(h1\text{in}/d1-i)/(h4/d4-i)<10.0$ where
   h1in: inner diameter of the light incident surface,
   d1−1: distance between a center of the light incident surface, the center being a point through which the optical axis passes, and the image plane,
   h4: outer diameter of the light exiting surface, and
   d4−1: distance between a center of the light exiting surface, the center being a point through which the optical axis passes, and the image plane.

5. The optical system according to claim 3, wherein the following conditional expression is satisfied:

$0.1<r4/TL3<10.0$ where
   r4: radius of curvature of the light exiting surface, and
   TL3: distance between the reflection surface of the second reflector and the image plane.

6. The optical system according to claim 3, wherein the following conditional expression is satisfied:

$50.0<vd$ where vd: Abbe number at a d-line of the medium contained in the light transmissive member.

7. The optical system according to claim 3, wherein the light transmissive member includes a portion formed of a first light transmissive member and a portion formed of a second light transmissive member different from the first light transmissive member.

8. The optical system according to claim 7, wherein the first light transmissive member and the second light transmissive member differ from each other in terms of at least one of an Abbe number and a refractive index.

9. The optical system according to claim 1, further comprising sequentially from the object side:
a first optical member that transmits light; and
a second optical member that transmits light and differs from the first optical member,
wherein the light incident surface is formed at an object-side surface of the first optical member,
a reflection surface as the second reflector is formed at an image-side surface of the first optical member, and
a reflection surface as the first reflector is formed at an object-side surface of the second optical member.

10. The optical system according to claim 9, wherein a medium in an optical path between the first reflector and the second reflector is air.

11. The optical system according to claim 1, wherein the first reflector and the second reflector are each formed of a single reflection surface.

12. The optical system according to claim 1, wherein the following conditional expression is satisfied:

$-0.1 < f/fx < 0.1$ where
f: overall focal length of the optical system, and
fx: focal length of the light incident surface or an optical member on which the light incident surface is formed.

13. The optical system according to claim 1,
wherein the reflection surface of the first reflector and the reflection surface of the second reflector are each a spherical surface.

14. The optical system according to claim 1, wherein the following conditional expression is satisfied:

$3.0 < M < 8.0$ where $M = f/f1$, f: overall focal length of the optical system, and
f1: focal length of the first reflector.

15. The optical system according to claim 1, wherein the following conditional expression is satisfied:

$f < 500$ mm where f: overall focal length of the optical system.

16. The optical system according to claim 1,
wherein an optical axis of the reflection surface of the first reflector coincides with an optical axis of the reflection surface of the second reflector.

17. The optical system according to claim 1, wherein the following conditional expression is satisfied:

$2.0 < Fno < 15.0$ where Fno: f-number of the optical system.

18. The optical system according to claim 1, wherein the following conditional expression is satisfied:

$1.0 < D1/D2 < 6.0$ where
D1: outer diameter of a reflection surface of the first reflector, and
D2: outer diameter of a reflection surface of the second reflector.

19. The optical system according to claim 1, wherein the following conditional expression is satisfied:

$0.4 < RL/TL < 1.2$ where
RL: distance between a reflection surface of the first reflector and a reflection surface of the second reflector in the direction of the optical axis of the optical system.

20. The optical system according to claim 1, wherein the following conditional expression is satisfied:

$0.5 < D1/RL < 2.0$ where
D1: outer diameter of a reflection surface of the first reflector, and
RL: distance between a reflection surface of the first reflector and a reflection surface of the second reflector in the direction of the optical axis of the optical system.

21. An optical apparatus comprising:
the optical system according to claim 1; and
an image sensor that captures an image formed by the optical system.

22. The optical apparatus according to claim 21, wherein the following conditional expression is satisfied:

$5.0 < D0/Y < 15.0$ where
D0: outer diameter of a light incident surface closest to the object side in the optical system, and
Y: maximum image height on the image sensor.

23. The optical apparatus according to claim 21,
wherein the imaging apparatus includes the optical system as a plurality of optical systems and the image sensor as a plurality of image sensors,
the imaging apparatus further includes a generator that generates a single image based on a plurality of image signals outputted from the plurality of image sensors, and
the following conditional expression is satisfied:

$0.30 < Nc/(Nd \times n) < 1.00$ where
Nd: number of pixels of the image sensor,
n: number of the image sensors used to generate the image, and
Nc: number of pixels in the image.

24. The optical apparatus according to claim 21,
wherein the imaging apparatus includes the optical system as a plurality of optical systems and the image sensor as a plurality of image sensors,
the imaging apparatus further includes a generator that generates a single image based on a plurality of image signals outputted from the plurality of image sensors, and
the following conditional expression is satisfied:

$0.50 < Nc/(Nd \times \sqrt{n}) < 2.00$ where
Nd: number of pixels of the image sensor,
n: number of the image sensors used to generate the image, and
Nc: number of pixels in the image.

25. The optical apparatus according to claim 21, further comprising:
a first holder that integrally holds the plurality of image sensors; and a second holder that integrally holds the plurality of optical systems.

26. An optical system that forms an image of an object, the optical system comprising:
a light incident surface on which light from an object side is incident;
a first reflector that reflects the light having passed through the light incident surface; and
a second reflector that reflects the light reflected off the first reflector,
wherein the following conditional expression is satisfied:

$$10.00° < \omega$$

where ω: half angle of view of the optical system.

27. An optical system that forms an image of an object, the optical system comprising:
a light incident surface on which light from an object side is incident;
a first reflector that reflects the light having passed through the light incident surface; and
a second reflector that reflects the light reflected off the first reflector,
wherein the space in an optical path between the first reflector and the second reflector is filled with a light transmissive member having a refractive index,
the light incident surface is formed at an object-side, light incident surface of the light transmissive member,
a reflection surface as the first reflector is formed at an image-side surface of the light transmissive member that is a surface on which the light having passed through the light incident surface is incident,
a reflection surface as the second reflector is formed at the object-side surface of the light transmissive member that is a surface on which the light reflected off the first reflector is incident,
a light exiting surface which is the image-side surface of the light transmissive member, on which the light reflected off the second reflector is incident, and via which the light exits out of the light transmissive member is formed, and
the reflection surface of the second reflector is disposed in a position closer to the object side than the light incident surface when viewed in a direction perpendicular to an optical axis of the optical system.

28. The optical system according to claim 27, wherein the reflection surface of the first reflector is disposed in a position closer to the image plane than the light exiting surface when viewed in the direction perpendicular to the optical axis of the optical system.

29. An optical system comprising:
a first reflector having a reflection surface that reflects light incident thereon; and
a second reflector having a reflection surface that reflects the light reflected off the first reflector reflection surface,
wherein light from an object is incident on and reflected off the first reflector reflection surface, the light reflected off the first reflector reflection surface is incident on and reflected off the second reflector reflection surface and is then reflected again off the first reflector reflection surface, and the light reflected off the first reflector reflection surface is then incident again on the second reflector reflection surface, then exits out of the optical system, and forms an image of the object.

30. The optical system according to claim 29, wherein the light reflected off the first reflector reflection surface is incident on and reflected off the second reflector reflection surface and then reflected again off the first reflector reflection surface with the incidence and the reflection repeated multiple times.

31. The optical system according to claim 29, wherein the first reflector has two reflection surfaces,
the second reflector has two reflection surfaces,
the light from the object is incident on and reflected off one of the two reflection surfaces of the first reflector,
the light reflected off the one of the two reflection surfaces of the first reflector is incident on and reflected off one of the two reflection surfaces of the second reflector,
the light reflected off the one of the two reflection surfaces of the second reflector is incident on and reflected off the other reflection surface of the two reflection surfaces of the first reflector, and
the light reflected off the other reflection surface of the two reflection surfaces of the first reflector is incident on and reflected off the other reflection surface of the two reflection surfaces of the second reflector.

32. The optical system according to claim 29, wherein the first reflector has one reflection surface,
the second reflector has one reflection surface,
the light from the object is incident on and reflected off the one reflection surface of the first reflector,
the light reflected off the one reflection surface of the first reflector is incident on and reflected off the one reflection surface of the second reflector,
the light reflected off the one reflection surface of the second reflector is incident on and reflected off for a second time the one reflection surface of the first reflector, and
the light reflected off for a second time the one reflection surface of the first reflector is incident on and reflected off for a second time the one reflection surface of the second reflector.

33. The optical system according to claim 29, further comprising a correction member shifted from the first reflector toward the object side and having an optical correction function.

34. A method for manufacturing an optical system that forms an image of an object, the optical system including a light incident surface on which light from an object side is incident, a first reflector that reflects the light having passed through the light incident surface, and a second reflector that reflects the light reflected off the first reflector,
wherein the optical system is so disposed that the following conditional expression is satisfied:

$$TL < 15.0 \text{ mm}$$

where TL: distance from a surface closest to the object side in the optical system to an image plane in a direction of an optical axis that intersects the image plane.

* * * * *